US008284226B2

(12) United States Patent
Hasegawa et al.

(10) Patent No.: US 8,284,226 B2
(45) Date of Patent: Oct. 9, 2012

(54) CONTROL DEVICE, LASER IRRADIATION DEVICE, OPTIMIZATION FONT DATA DATABASE, RECORDING METHOD, AND COMPUTER-READABLE STORAGE MEDIUM

(75) Inventors: Fumihiro Hasegawa, Tokyo (JP); Tomomi Ishimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 483 days.

(21) Appl. No.: 12/537,460

(22) Filed: Aug. 7, 2009

(65) Prior Publication Data

US 2010/0039916 A1 Feb. 18, 2010

(30) Foreign Application Priority Data

Aug. 13, 2008 (JP) .................... 2008-208631
Jun. 26, 2009 (JP) .................... 2009-152734
Jul. 31, 2009 (JP) .................... 2009-178744

(51) Int. Cl.
*B41J 2/435* (2006.01)

(52) U.S. Cl. ...................... 347/224

(58) Field of Classification Search ............ 347/224, 347/225, 232, 236, 237, 240, 246, 247, 251, 347/252
See application file for complete search history.

(56) References Cited

U.S. PATENT DOCUMENTS 8,106,934 B2 * 1/2012 Ishimi et al. ............ 347/224

FOREIGN PATENT DOCUMENTS

| JP | 5-314268 | 11/1993 |
|---|---|---|
| JP | 2003-320694 | 11/2003 |
| JP | 2004-90026 | 3/2004 |
| JP | 2004-341373 | 12/2004 |
| JP | 2004-345273 | 12/2004 |
| JP | 3629196 | 12/2004 |
| JP | 2006-306063 | 11/2006 |
| JP | 3990891 | 7/2007 |
| JP | 2008-62506 | 3/2008 |
| JP | 2008-179135 | 8/2008 |

* cited by examiner

*Primary Examiner* — Hai C Pham
(74) *Attorney, Agent, or Firm* — Oblon, Spivak, McClelland, Maier & Neustadt, L.L.P.

(57) ABSTRACT

A control device controls a laser irradiation device to record visible information on a medium by irradiation of a laser beam. The control device includes a drawing information storage unit which stores drawing information of line segments contained in line images of characters, numbers, and symbols. A drawing information acquiring unit acquires drawing information of a line image as an object to be drawn. A thickness information acquiring unit acquires thickness information which specifies a thickness of each line segment. An overlapping line segment detecting unit detects a pair of line segments drawing ranges of which, inclusive of the line segment thickness, overlap each other, based on the thickness information and the drawing information. A line dividing/shortening unit divides or shortens at least one of the pair of line segments so that the drawing ranges of the pair of line segments do not overlap each other.

9 Claims, 41 Drawing Sheets

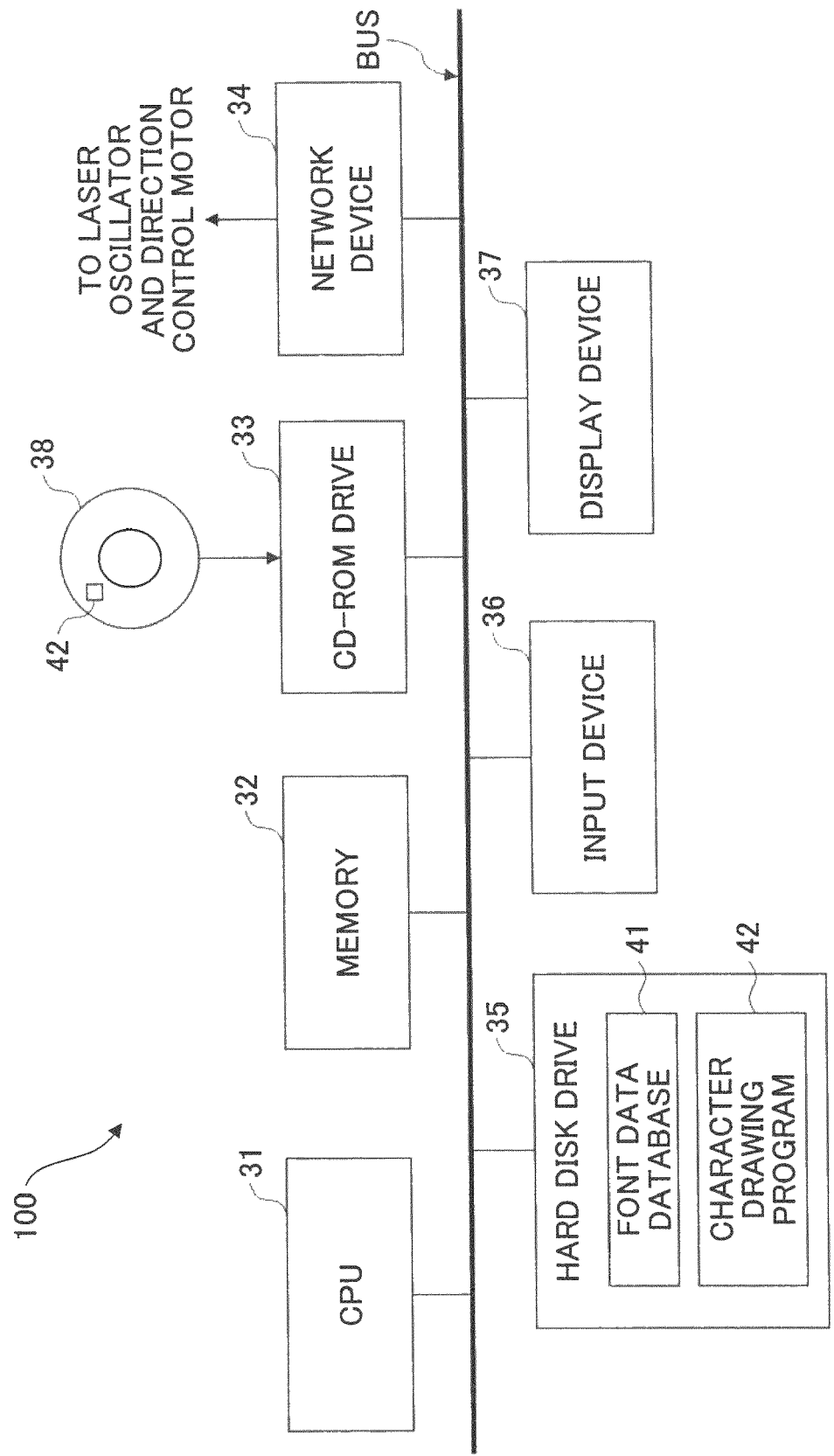

| m | 24 | 24 |
| d | 88 | 24 |
| m | 56 | 24 |
| d | 56 | 224 |
| d | 24 | 176 |

| [0] | 48 | 48 | 176 | 48 |
| [1] | 112 | 48 | 112 | 448 |
| [2] | 112 | 448 | 48 | 352 |

CROSSING ANGLE BETWEEN LINE SEGMENTS

```
[0]   160    32   272   480
[1]    16   352   240   352
[2]   304   352   448   352
```

```
[+0]  160    32   272   480
[+1]   16   352   240   352
[+2]  304   352   448   352
```

```
[+1]  160   352   240   352
[+2]  304   352   448   352
[+0]  160    32   272   480
```

```
[+1]   16   352   240   352
[+2]  304   352   448   352
[-0]  272   480   160    32
```

```
[0]   48   48  176   48
[1]  112   48  112  448
[2]  112  448   48  352
```

```
[0]   48   48   80   48
[1]  112   48  112  448
[2]   80  400   48  352
[3]  144   48  176   48
```

```
t    32
m    48    48
w    50
d    80    48
m   112    48
w    50
d   112   448
m    80   400
w    50
d    48   352
m   144    48
w    50
d   176    48
```

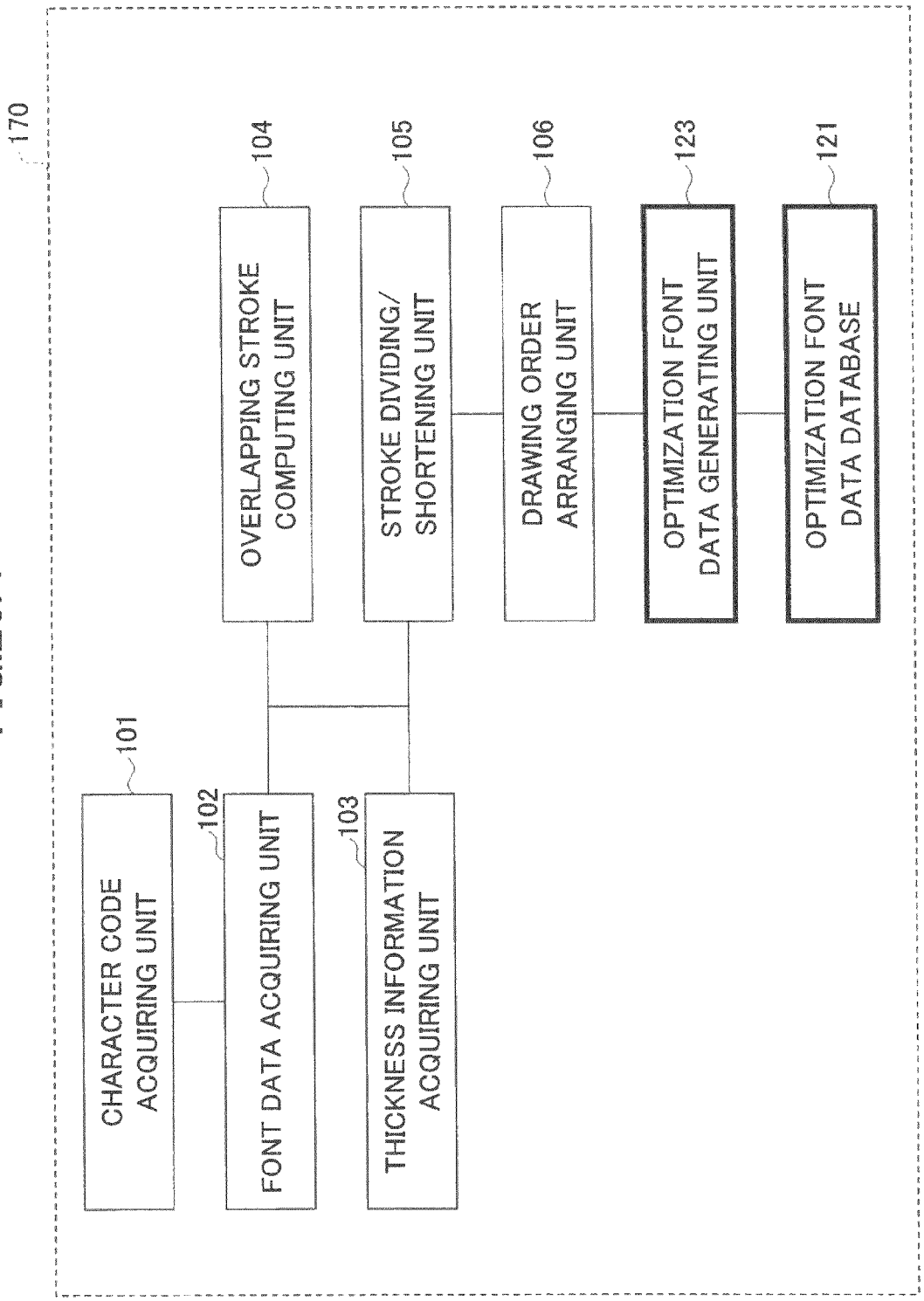

FIG.26A

| | | |
|---|---:|---:|
| m | 48 | 48 |
| d | 80 | 48 |
| m | 112 | 48 |
| d | 112 | 448 |
| m | 80 | 400 |
| d | 48 | 352 |
| m | 144 | 48 |
| d | 176 | 48 |

FIG.26B

| | | |
|---|---:|---:|
| t | 32 | |
| m | 48 | 48 |
| w | 50 | |
| d | 80 | 48 |
| m | 112 | 48 |
| w | 50 | |
| d | 112 | 448 |
| m | 80 | 400 |
| w | 50 | |
| d | 48 | 352 |
| m | 144 | 48 |
| w | 50 | |
| d | 176 | 48 |

CONTROL DEVICE, LASER IRRADIATION DEVICE, OPTIMIZATION FONT DATA DATABASE, RECORDING METHOD, AND COMPUTER-READABLE STORAGE MEDIUM

BACKGROUND OF THE INVENTION

1. Field of the Invention

This invention relates to a control device which controls a laser irradiation device to record visible information, such as characters, on a medium by irradiation of a laser beam. More particularly, this invention relates to a laser irradiation device control device which is adapted to minimize damages of a recording surface of a rewritable or write-once medium after visible information, such as characters, is recorded on the medium by irradiation of a laser beam.

2. Description of the Related Art

In recent years, a laser irradiation device (or a laser marker) is marketed and this laser irradiation device employs the technology which records characters, numbers, symbols, etc. on a medium by irradiating the medium with a laser beam. By irradiation of a laser beam, the medium absorbs the laser beam and is thereby heated, so that visible information, including characters, numbers, and symbols, is recorded on the medium.

The laser irradiation device includes a laser light source, such as a gas laser, a solid state laser, a liquid laser, a semiconductor laser, etc. By selecting an oscillation wavelength of a laser beam of the laser light source, the laser irradiation device can record the visible information on the medium, such as a metal, a plastic, a thermal paper, a thermal rewritable medium, etc.

When a metal or plastic is used as the medium, the metal or plastic is heated by irradiation of the laser beam to burn or eliminate the metal or plastic so that the visible information is printed on the metal or plastic. On the other hand, when a thermal paper or thermal rewritable medium is used as the medium, the thermal paper or thermal rewritable medium is heated by irradiation of the laser beam to color a recording layer of the thermal paper or thermal rewritable medium so that the visible information is printed on the thermal paper or thermal rewritable medium.

A thermal paper may be selected as a medium on which a delivery address or a name of an article of goods is printed. For example, such a thermal-paper type medium is stuck on a container made of a plastic used at a factory. The thermal-paper type medium is colored when the medium is heated. By using a thermal head or the like, characters or symbols can be recorded on the thermal-paper type medium.

In recent years, a thermal rewritable medium has been proposed which enables repeated writing and erasing of information. When using the medium in the field of logistics, it is desirable that writing and erasing of information is allowed for the medium stuck on the container. For this reason, the method of drawing characters on the medium by irradiating the medium with a laser beam and heating the medium in a non-contact manner has been proposed. For example, refers to Japanese Laid-Open Patent Publication No. 2004-090026. Japanese Laid-Open Patent Publication No. 2004-090026 discloses a relay lens system which is composed of a plurality of lenses connected by a plurality of flexible joints, and which transmits an image by a laser beam entered from one end to the other end.

Conventionally, the image formation by laser irradiation is known. For example, refer to Japanese Laid-Open Patent Publication No. 2004-341373. Japanese Laid-Open Patent Publication No. 2004-341373 discloses a method of forming an image in which image data of an original image is divided into a plurality of lines and a photoconductor drum is irradiated with a laser beam for each line so as to form an image on the photoconductor drum.

The thermal rewritable medium has the characteristic in which coloring of the medium is erased with the heating at a certain temperature and coloring of the medium appears again if the heating of the medium is applied further. However, if excessive heating is applied, the thermal rewritable medium will be deteriorated, which will shorten the life of the medium or will degrade the medium so as to disable erasing of information completely.

A description will be given of drawing of a character on a thermal rewritable medium. The thermal rewritable medium is heated by tracing strokes of a character by a laser beam, and an image of the character appears on the medium. FIG. 1 illustrates an example of a character drawn on a thermal rewritable medium by laser irradiation. The character illustrated in FIG. 1 is a modified numeral character "7", and the strokes cross each other at an intersection 210. Because the laser irradiation to draw the following stroke is applied to the intersection 210 while the heat of the previously drawn stroke still remains, the intersection 210 is heated excessively and an undesired influence appears on the thermal rewritable medium.

Moreover, in the numeral character "7" illustrated in FIG. 1, a turn-back part 220 exists. Because of the influence of the inertia of the mirror for controlling the irradiation direction of a laser beam, the laser irradiation is applied near the turn-back part 220 for a comparatively long time, and the thermal rewritable medium is heated excessively at the turn-back part 220, and the thermal rewritable medium may be damaged at this point.

To avoid the problem, the method for preventing overlapping of laser irradiation has been proposed. For example, refer to Japanese Laid-Open Patent Publication No. 2006-306063, Japanese Patent No. 3990891, and Japanese Laid-Open Patent Publication No. 2008-179135.

Japanese Laid-Open Patent Publication No. 2006-306063 discloses a recording method in which scanning of a laser beam is performed so that at an intersection where two scanning lines cross each other, after the previous scanning line is passed, the following scanning line is drawn.

Japanese Patent No. 3990891 discloses a recording/erasing device which controls the laser irradiation part so that, when two laser drawing lines cross each other at an intersection, at least one of the laser irradiation power and the laser irradiation time to irradiate the intersection is reduced.

Japanese Laid-Open Patent Publication No. 2008-179135 discloses a recording method in which at an intersection where one drawing line among drawing lines of a character overlaps with another drawing line, the laser irradiation of the one drawing line at the intersection is inhibited in order to eliminate the intersection.

However, there is no disclosure in Japanese Laid-Open Patent Publication No. 2006-306063, Japanese Patent No. 3990891, and Japanese Laid-Open Patent Publication No. 2008-179135 of how to detect an overlapping portion or a turn-back portion in a character being drawn. The irradiation of a laser beam causes printing of strokes of a character with a certain amount of width on the medium, not printing of a point, and the strokes printed on the medium also have a limited thickness. For this reason, whether an overlap between strokes appears or not depends on the thickness of the strokes which are drawn by the laser irradiation.

FIGS. 2A-2C are diagrams illustrating examples of an overlap between strokes and a gap between strokes, which are influenced by the thickness of strokes and the size of characters.

FIG. 2A and FIG. 2B illustrate examples of a character in which the coordinates of points which constitute strokes are the same. In the example of FIG. 2A, the thickness of the strokes is small. In the example of FIG. 2B, the thickness of the strokes is large, and an overlap 230 between the strokes exists.

FIG. 2C illustrates examples of a character drawn by the method according to the related art in which the degree of overlap between strokes varies depending on the size of the character. In the original size of the character, by the method according to the related art, one of the line segments is divided into line segment parts to prevent overlapping of the line segments. However, the size of the character is not taken into consideration, and the manner of dividing is predetermined.

As illustrated in FIG. 2C, in the case of the enlarged character, the thickness of each stroke is unchanged from that in the case of the original size, the passing length of one line segment is enlarged, and a gap between the strokes appears.

On the contrary, in the case of the reduced character, the passing length of one line segment is reduced but the thickness of each stroke is unchanged, and an overlap between the strokes remains.

As described above, a line segment drawn by laser irradiation has a certain width, and therefore it is difficult for the methods and devices according to Japanese Laid-Open Patent Publication No. 2006-306063, Japanese Laid-Open Patent Publication No. 2004-341373 and Japanese Laid-Open Patent Publication No. 2008-179135 to certainly prevent occurrence of a gap or overlap between strokes at a crossing point, a turn-back point or the like of a character being drawn, which is influenced by the size of characters and the thickness of strokes.

SUMMARY OF THE INVENTION

In one aspect of the invention, the present disclosure provides a control device for controlling a laser irradiation device, which is able to eliminate the influences on a rewritable or write-once medium by excessive heating of the medium by laser irradiation due to a gap or overlap between strokes, by taking into consideration the thickness of strokes and the size of characters.

In an embodiment of the invention which solves or reduces one or more of the above-mentioned problems, the present disclosure provides a control device which controls a laser irradiation device to record visible information on a medium by irradiation of a laser beam, the control device comprising: a drawing information storage unit configured to store drawing information of line segments contained in line images of characters, numbers, and symbols; a drawing information acquiring unit configured to acquire, from the drawing information storage unit, drawing information of a line image as an object to be drawn; a thickness information acquiring unit configured to acquire thickness information which specifies a thickness of each line segment; an overlapping line segment detecting unit configured to detect a pair of line segments drawing ranges of which, inclusive of the line segment thickness, overlap each other, based on the thickness information and the drawing information; and a line dividing/shortening unit configured to divide or shorten at least one of the pair of line segments so that the drawing ranges of the pair of line segments do not overlap each other.

Other objects, features and advantages of the present invention will become more apparent from the following detailed description when read in conjunction with the accompanying drawings.

BRIEF DESCRIPTION OF THE DRAWINGS

FIG. 6 is a block diagram illustrating the hardware composition of the control device of the laser irradiation device of the present embodiment.

FIG. 25A and FIG. 25B are block diagrams illustrating the functional composition of a laser irradiation device of the embodiment 2 of the invention.

FIG. 26A and FIG. 26B are diagrams illustrating an example of optimization font data, and an example of a drawing command generated from the optimization font data, respectively.

DETAILED DESCRIPTION OF THE PREFERRED EMBODIMENTS

A description will be given of embodiments of the invention with reference to the accompanying drawings.

In the following, a part of a character (e.g., "hen" or "tsukuri" of a kanji character) may be also referred to as a character without distinguishing the part of the character from the character itself. A stroke of a character which is drawn by one scanning of a laser beam from its starting point to its ending point may be referred to as a one-stroke component. This means that a character is composed of one or more one-stroke components. A one-stroke component is composed of one or more line segments, which will be described later.

Although a one-stroke component (stroke) in an embodiment of the invention corresponds to a stroke of the stroke font according to the related art, a one-stroke component (stroke) in an embodiment of the invention may be optimized by drawing of a character by a laser irradiation device 200 of this embodiment, and the one-stroke component of this embodiment may be the same as or may be different from a stroke which is defined by the public institutions (for example, Japanese Standards Association, ISO, etc.). The laser irradiation device 200 of this embodiment makes a medium to be colored by irradiation of a laser beam, so that a one-stroke component is drawn on the medium, and arranged in an appropriate form.

Figure 3A:
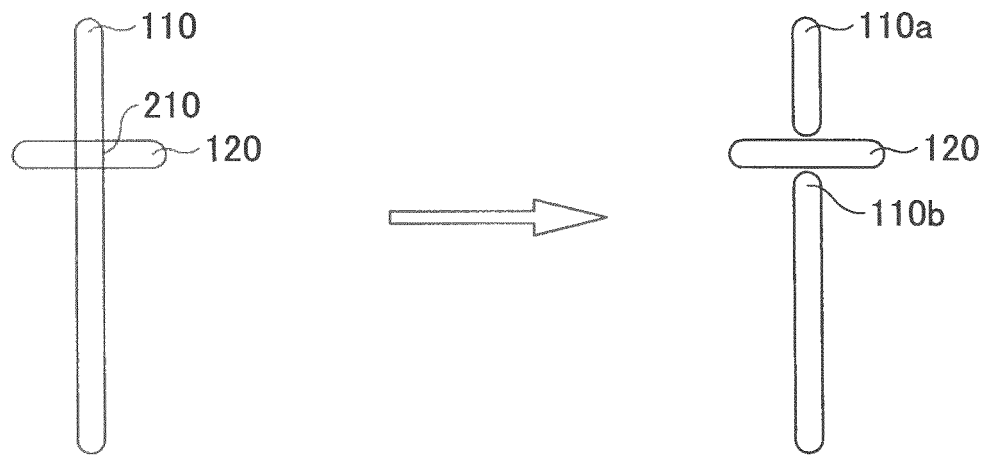
FIG. 3A, FIG. 3B, and FIG. 3C are diagrams illustrating examples of characters which are drawn by a control device of a laser irradiation device of an embodiment of the invention.
Figure 3B:
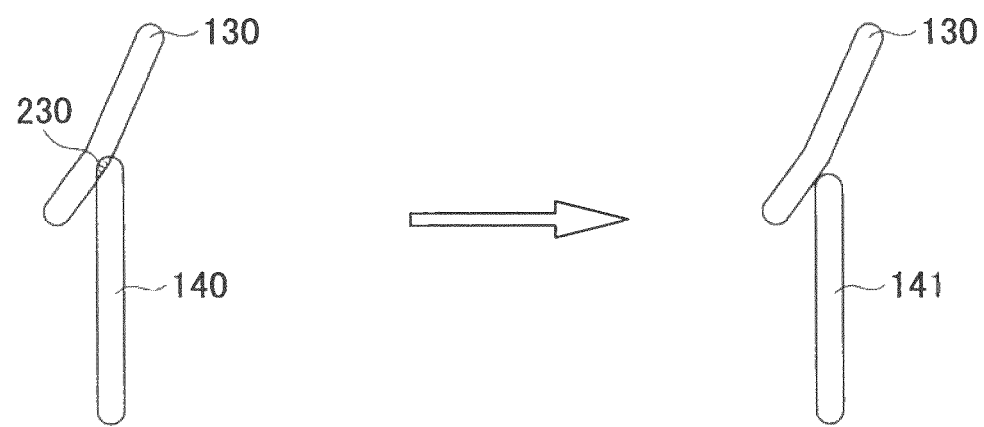
Figure 3C:
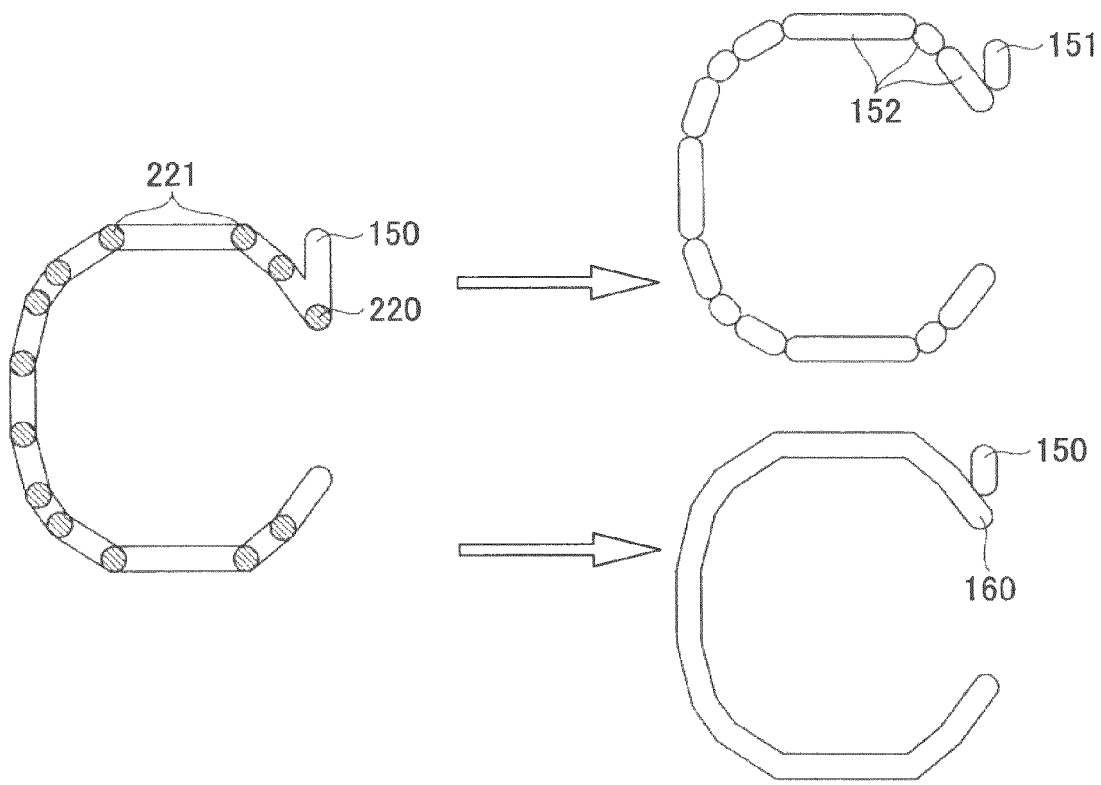

FIGS. 3A-3C illustrate examples of characters which are drawn by a control device 100 of a laser irradiation device 200 of an embodiment of the invention.

In a case of a character having an intersection 210 as illustrated in FIG. 3A, one of one-stroke components of the character is divided by the laser irradiation device 200 so that the intersection 210 may not appear. In the case of FIG. 3A, the intersection 210 is canceled by dividing a vertical one-stroke component 110 into two one-stroke components 110a and 110b.

In a case of a character having an overlap 230 caused by the thickness of the character as illustrated in FIG. 3B, the laser irradiation device 200 divides a one-stroke component 130 so that the overlap 230 may not appear, or shortens a one-stroke component 140. In the case of FIG. 3B, the overlap 230 is canceled by shortening the one-stroke component 140 into a one-stroke component 141.

In a case of a character in which a turn-back point 220 and two or more turning up points 221 exist as illustrated in FIG. 3C, two ways of cancelling the turn-back points 220 and 221 can be considered. One is a method of canceling all the turn-back points 220 and 221 by forming a one-stroke component 151 and two or more one-stroke components 152 from a one-stroke component 150 as illustrated at the upper right part of FIG. 3C. The other is a method of forming the character by taking into consideration the angle of each of the turn-back points 220 and 221 as illustrated at the lower right part of FIG. 3C. As for the turn-back points 221 in which the turn-back angles are shallow, respective overlaps are not canceled. When the turn-back angle is shallow, the degradation of a rewritable medium 20 is not significant. It is possible to easily maintain a fine sight of the character by drawing the character using the latter method.

In the following, when intersections, overlapping parts or turn-back parts are not distinguished, they will be merely referred to as an overlap of a character (or one-stroke component). In this way, the laser irradiation device 200 of this embodiment is able to prevent appropriately occurrence of an overlap which may appear in a character in any form, by taking into consideration the thickness of the character.

Figure 4:
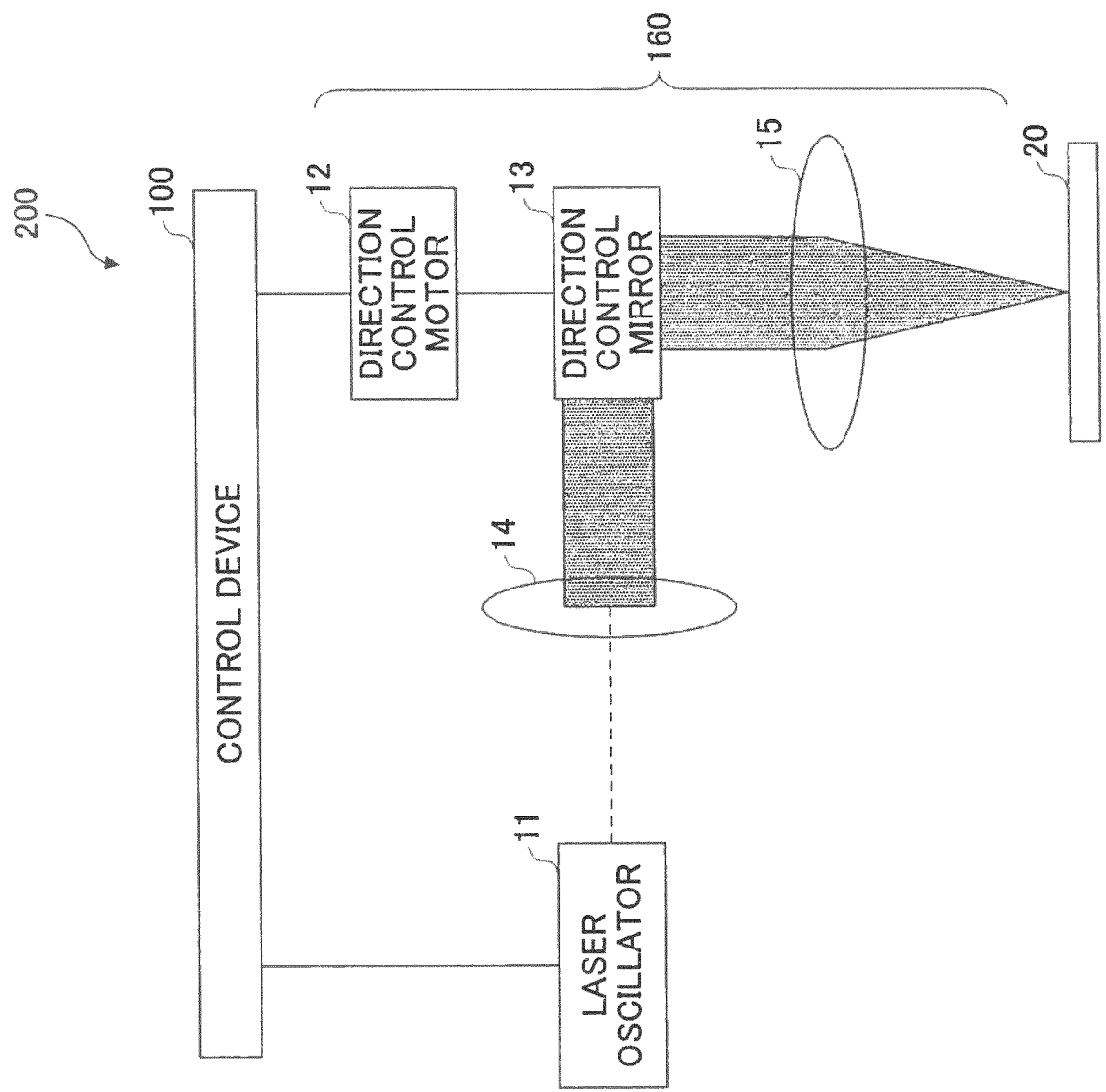
FIG. 4 is a block diagram illustrating the hardware composition of a laser irradiation device of the embodiment 1 of the invention.

A description will be given of the embodiment 1 of the invention. FIG. 4 illustrates the hardware composition of the laser irradiation device 200 of this embodiment.

As illustrated in FIG. 4, the laser irradiation device 200 of this embodiment includes a control device 100 which controls the whole laser irradiation device 200, and a laser irradiation part 160 which emits a laser beam. The laser irradiation part 160 includes a laser oscillator 11 which emits a laser beam, a direction control mirror 13 which changes a direction of radiation of the laser beam, a direction control motor 12 which drives the direction control mirror 13, an optical lens 14, and a focusing lens 15.

The laser oscillator 11 may be any of a semiconductor laser (e.g. LD (laser diode)), a gas laser, a solid state laser, a liquid laser, etc. The direction control motor 12 controls the direction of the reflection surface of the direction control mirror 13 with respect to the two axial directions. The direction control motor 12 is, for example, a servo motor. The direction control motor 12 and the direction control mirror 13 constitute a galvanometer mirror. The optical lens 14 is a lens used to enlarge the diameter of spot of a laser beam, and the focusing lens 15 is a lens used to convert the incoming laser beam into a converging laser beam.

The rewritable medium 20 illustrated in FIG. 4 is a thermal rewritable medium which is colored when it is heated to the temperature of 180 degrees C. or higher and then cooled, and this thermal rewritable medium is discolored when it is heated again in the range of temperatures of 130-170 degrees C. A normal thermal paper or a normal thermal rewritable medium does not absorb a laser beam having a wavelength in a near-infrared area. When it is desired to use a laser light source which emits a laser beam having a wavelength in a near-infrared area (a semiconductor laser, a solid state laser, a YAG laser, etc.), it is necessary to add, to a thermal paper or thermal rewritable medium, an additional material or additional layer of a material for absorbing such a laser beam.

In this embodiment, a gap or overlap between strokes which may appear in the visible information of characters or symbols can be eliminated without depending on the size of characters and the thickness of strokes. In the case of the rewritable medium 20, it is possible to avoid collapsing of characters by preventing the line thickening by the overheating of the medium at the intersection, the overlapping point, or the turn-back point due to the overlap between strokes, and it is possible to avoid deteriorating of the image quality of characters due to the gap between strokes. Moreover, because the overheating of the medium at the intersection, the overlapping point, or the turn-back point due to the overlap between strokes is prevented, it is possible to eliminate the remaining of non-erased parts and the falling of the optical intensity of colored parts, due to repeated rewriting of the medium. Rewriting is to record visible information on the medium by heating the medium by irradiation of a laser beam, and erase the visible information on the medium by heating the medium by application of a laser beam, warm air, a hot stamp, etc.

In this embodiment, a write-one medium which does not enable rewriting, such as a thermal paper, a plastic, or a metal, is also applicable. Also in the case of the write-once medium, it is possible to avoid collapsing of characters by preventing the line thickening by the overheating of the medium at the intersection, the overlapping point, or the turn-back point due to the overlap between strokes, and it is possible to avoid deteriorating of the image quality of characters due to the gap between strokes. Specifically, a thermal paper which does not allow rewriting is a thermal paper which is difficult to perform discoloring of the medium by heating.

Figure 5A:
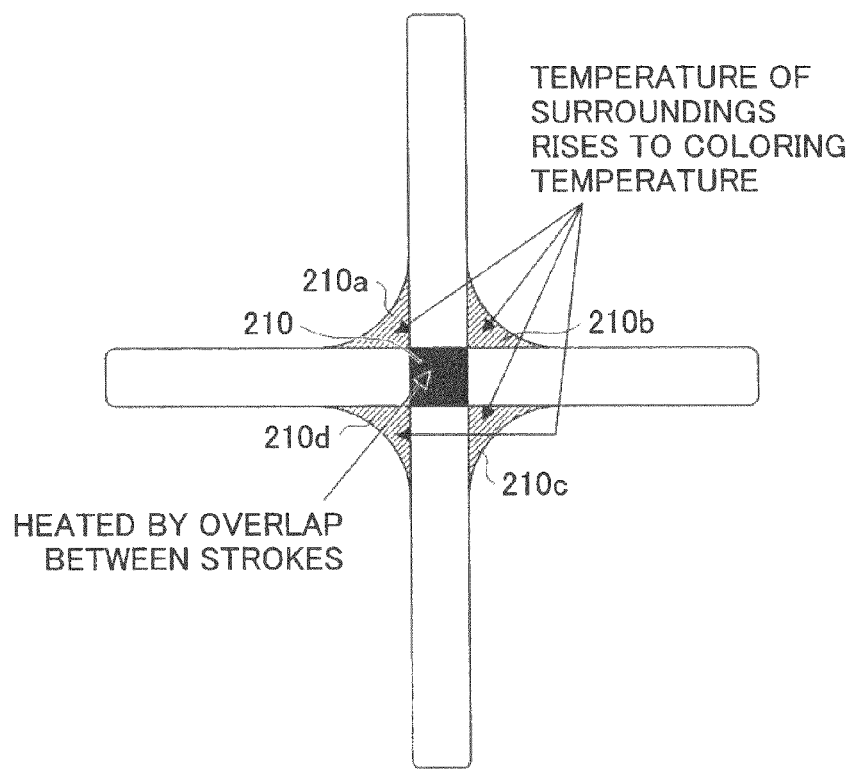
FIG. 5A and FIG. 5B are diagrams illustrating examples of a rewritable medium on which line segments of a character are drawn by irradiation of a laser beam.
Figure 5B:
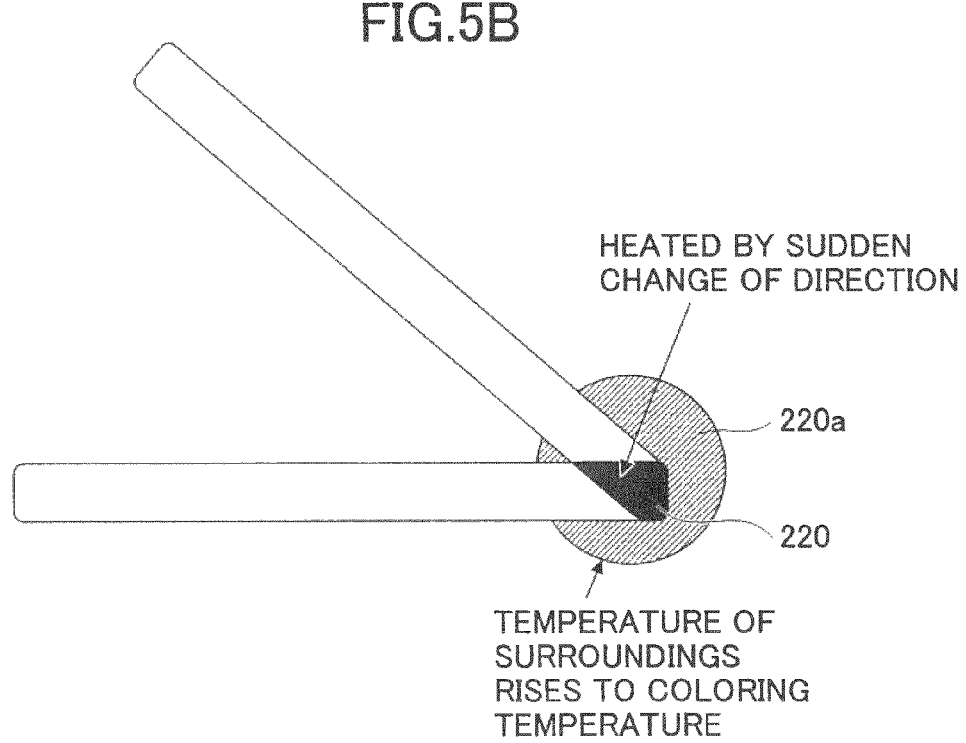

FIG. 5A and FIG. 5B illustrate examples of a rewritable medium on which line segments of a character are drawn by irradiation of a laser beam.

FIG. 5A illustrates an example of two crossing line segments. Because a square portion 210 of the medium is twice irradiated by the laser beam in a short time, the portion 210 is heated to a temperature higher than a temperature in other portions of the medium. Because the surroundings of the intersection part 210 with the high temperature are also heated to a coloring temperature of the medium, the surrounding portions 210a-210d indicated by the shaded lines in FIG. 5A are colored. Hence, the intersection part 210 becomes ambiguous, and if the size of the character is small, a gap between strokes which originally exists in the line image of the character (which gap is not printed) will disappear, and collapsing of the character will take place.

FIG. 5B illustrates an example of two line segments which are drawn continuously. Because the direction of the two line segments changes suddenly at a turn-back part 220, the turn-back part 220 of the medium is heated to an elevated temperature. Because the turn-back part 220 is irradiated by the laser beam for a comparatively long time, the surroundings of the turn-back part 220 with the high temperature are also heated to a coloring temperature of the medium, and the surrounding portion 220a indicated by the shaded lines in FIG. 5B is colored. For this reason, it will color also into the part 220a indicated by the shaded lines in FIG. 5B. Hence, the outline of the character will collapse and the surrounding part 220a will turn into a dot-line form.

Figure 1:
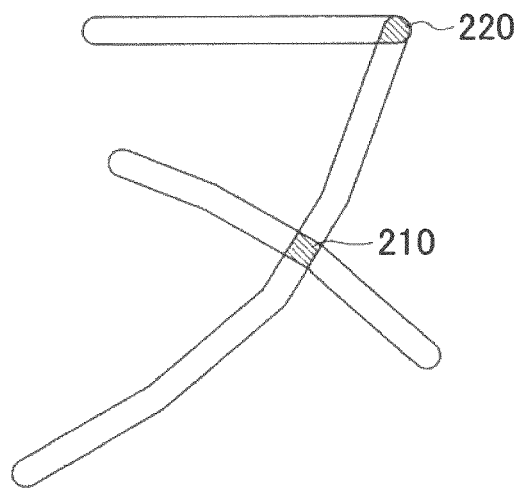
FIG. 1 is a diagram illustrating an example of a character which is drawn on a thermal rewritable label by laser irradiation.
Figure 2A:
FIG. 2A, FIG. 2B, and FIG. 2C are diagrams illustrating examples of an overlap between strokes and a gap between strokes which are influenced by the thickness of strokes and the size of characters.
Figure 2B:
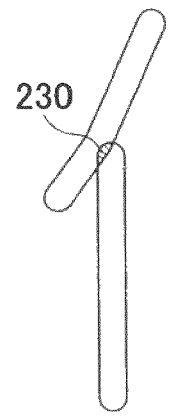
Figure 2C:
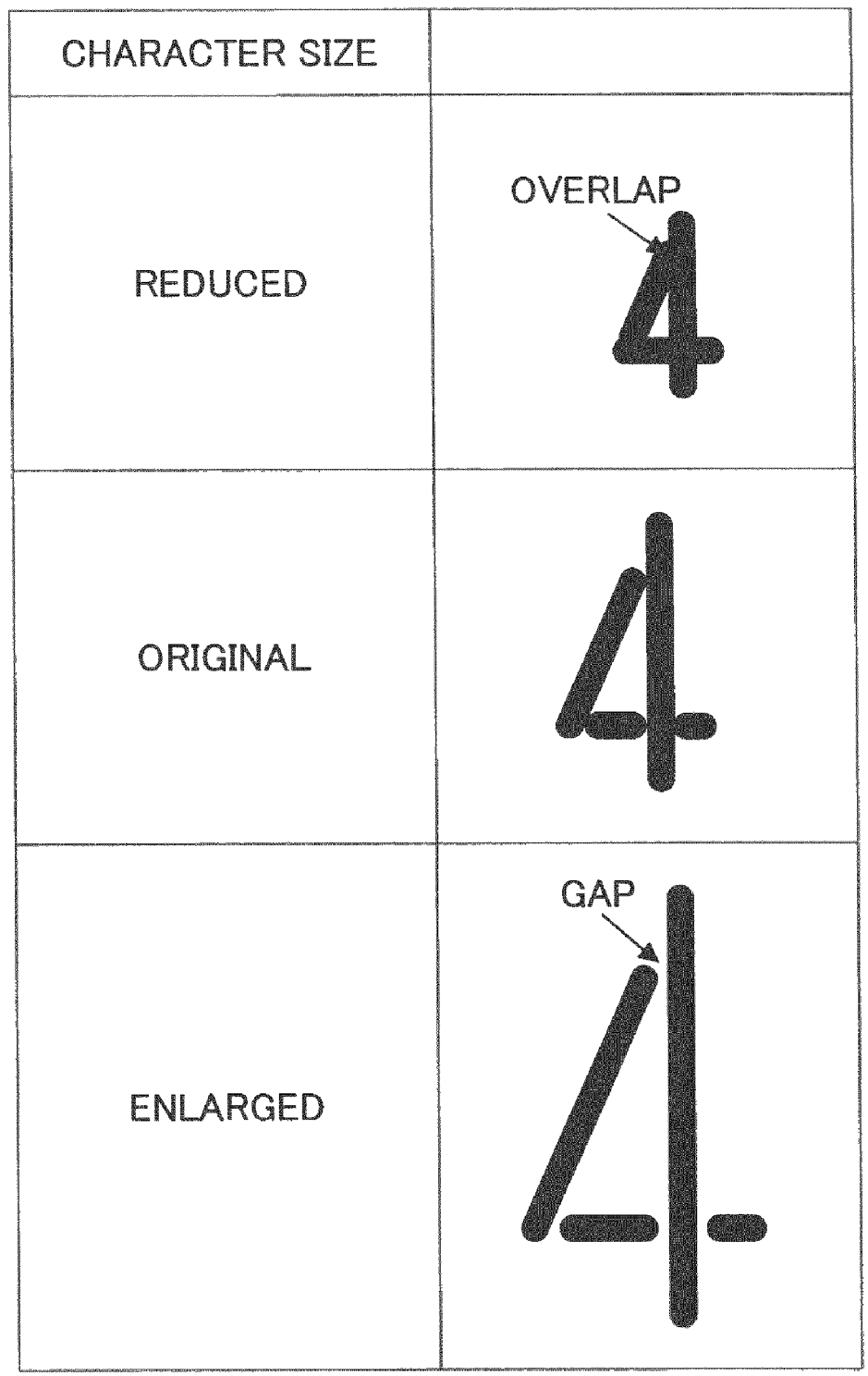

The phenomena as illustrated in FIG. 5A and FIG. 5B may arise also in the case of a write-once medium, such as a thermal paper, a plastic, a metal, etc. which does not allow rewriting. The laser irradiation device 200 of this embodiment eliminates the intersection part 210 and the turn-back part 220 also in the case of the write-once medium, such as a thermal paper, a plastic, a metal, etc. Because the overheating of the surroundings of the intersection part 210 and the turn-back part 220 can also be prevented, the phenomena as in FIG. 5A and FIG. 5B do not arise. Moreover, occurrence of a gap between strokes when the size of a character is enlarged as illustrated in FIG. 2C can be prevented, and as a result the image quality of the character being drawn can be raised.

Referring back to FIG. 4, the laser beam which is generated by the laser oscillator 11 passes through the optical lens 14, and the diameter of a spot formed by the laser beam is enlarged. After the direction of the laser beam is adjusted by the galvanometer mirror according to the configuration of the character, the laser beam is focused on the rewritable medium 20 at a predetermined focal length by the focusing lens 15. When the laser beam is emitted to the rewritable medium 20, the rewritable medium 20 is heated to the coloring temperature, so that a character can be drawn on the rewritable medium 20. In this case, the erasing power is retarded.

The control device 100 performs adjustment of the irradiation position of the laser beam by driving the direction control motor 12 to move the direction control mirror 13. The control device 100 controls the emission ON/OFF and irradiation power of the laser oscillator 11. The line width or thickness of a line segment to be drawn can also be changed by the control device 100 through the control of the irradiation power, and the adjustment of the lens position of the optical lens 14, the focal length of the focusing lens 15 and the position of the rewritable medium.

FIG. 6 illustrates the hardware composition of the control device 100 of the laser irradiation device 200 of this embodiment. It is assumed that the control device 100 mainly uses a computer and is implemented in the laser irradiation device 200 with the software, and the hardware composition of the control device 100 in such a case is illustrated in FIG. 6. Alternatively, when the control device 100 does not use a computer in order to implement the control device 100, the control device 100 may be constructed by using an ASIC (application-specific integrated circuit).

As illustrated in FIG. 6, the control device 100 of this embodiment includes a CPU 31, a memory 32, a hard disk drive 35, an input device 36, a CD-ROM drive 33, a display device 37, and a network device 34. The hard disk drive 35 includes a font data database 41 in which the font data of a series of characters of stroke fonts are stored. In the hard disk drive 35, a character drawing program 42 which generates a drawing command for eliminating the overlap between strokes from the font data and controls the laser irradiation part 160 according to the drawing command is also stored.

The CPU 31 reads the character drawing program 42 from the hard disk drive 35, executes the character drawing program 42 on the memory 32, and carries out a character drawing process to draw a character on the rewritable medium 20. The memory 32 is a volatile memory, such as DRAM, and serves as the work area used when the CPU 31 executes the character drawing program 42. The input device 36 is a device, such as a mouse and a keyboard, which is used by a user to input the instructions for controlling the laser irradiation part 160. The display device 37 serves as a user interface which displays a GUI (graphical user interface) screen at a predetermined resolution and a predetermined number of colors, which are based on the screen information specified by the character drawing program 42. For example, the GUI screen containing the input column to input the character to be drawn on the rewritable medium 20 is displayed on the display device 37.

The CD-ROM drive 33 is arranged so that a CD-ROM 38 is detachably attached to the CD-ROM drive 33, and data is read from the CD-ROM 38 or data is written to a recordable storage medium. The character drawing program 42 and the font data database 41 are stored in the CD-ROM 38 and distributed with the CD-ROM 38. When the CD-ROM 38 is inserted to the CD-ROM drive 33, the character drawing program 42 and the font data database 41 are read from the CD-ROM 38 and installed in the hard disk drive 35. Alternatively, the CD-ROM 38 may be substituted for by an nonvolatile memory, such as a DVD, a Blu-ray Disc, a SD card, a Memory Sticks, a multimedia card, xD card, etc.

The network device 34 is an interface for connecting the control device 100 to a network, such as an LAN or the Internet. The network device 34 is for example, an Ethernet® card. The network device 34 performs the process in accordance with the protocols specified for the physical layer and the data link layer of the OSI basic reference model, and allows the control device 100 to transmit a drawing command according to the character code to the laser irradiation part 160. By using the network device 34, the character drawing program 42 and the font data database 41 may be downloaded from a predetermined server connected via the network.

Alternatively, the laser irradiation part 160 may be connected directly to the control device 100 by the interface, such as USB (universal serial bus), IEEE 1394, wireless USB, Bluetooth, etc, without using the network device 34.

Characters which are to be drawn on the rewritable medium 20 may be stored beforehand in a list format in the hard disk drive 35, or input from the input device 36. A character is specified by a character code, such as the UNICODE or the JIS code. The control device 100 reads the font data of the character corresponding to the character code from the font data database 41, generates a drawing command based on the font data, and controls the laser irradiation part 160 in accordance with the drawing command.

Figure 7:
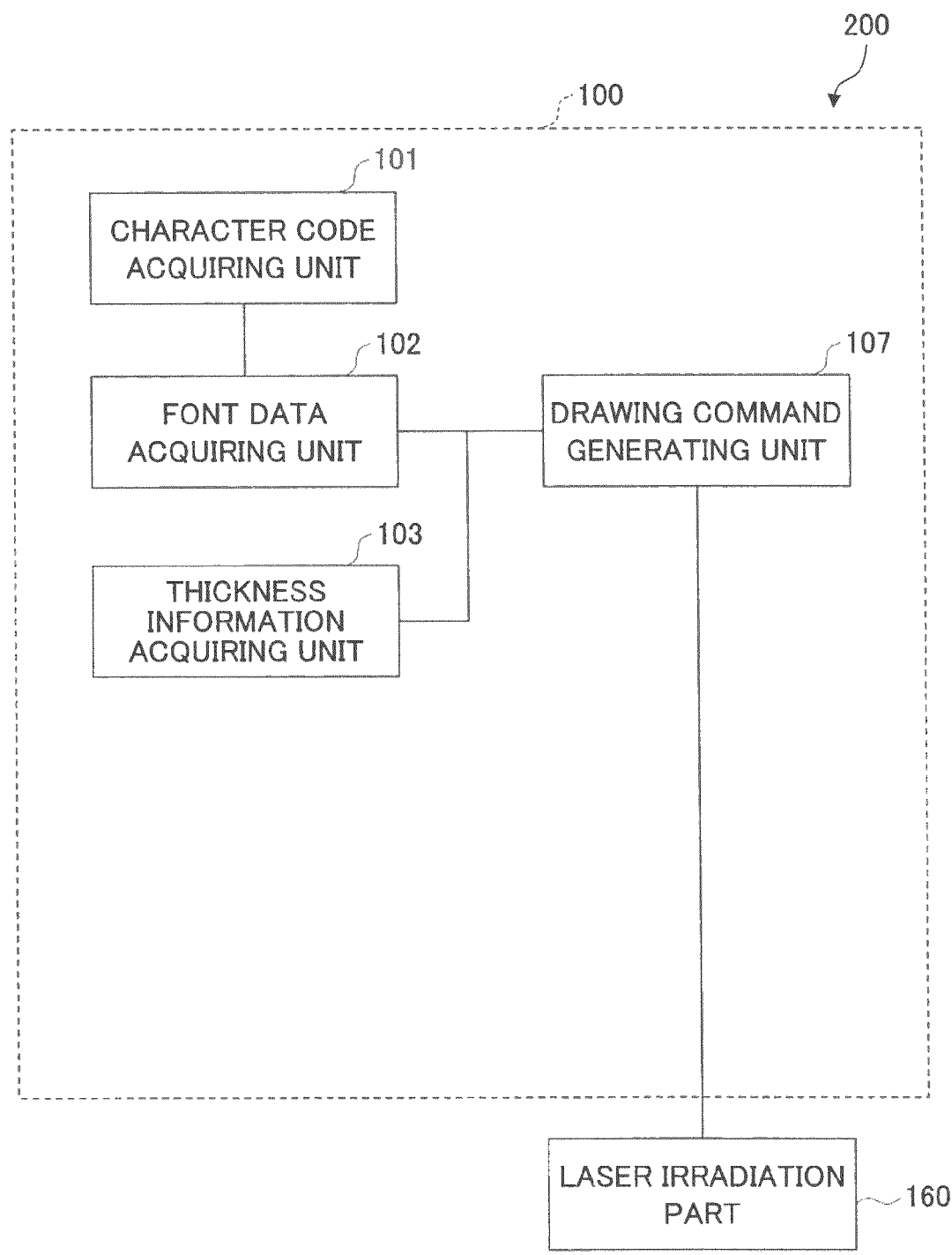
FIG. 7 is a block diagram illustrating the functional composition of a laser irradiation device according to the related art.

A description will be given of a laser irradiation device 200 according to the related art. FIG. 7 illustrates the functional composition of the laser irradiation device 200 according to the related art. When respective functions of the laser irradiation device 200 according to the related art are constructed by the software, the respective functions are realized by the CPU 31 which executes a character drawing program 42 according to the related art.

Figure 8:
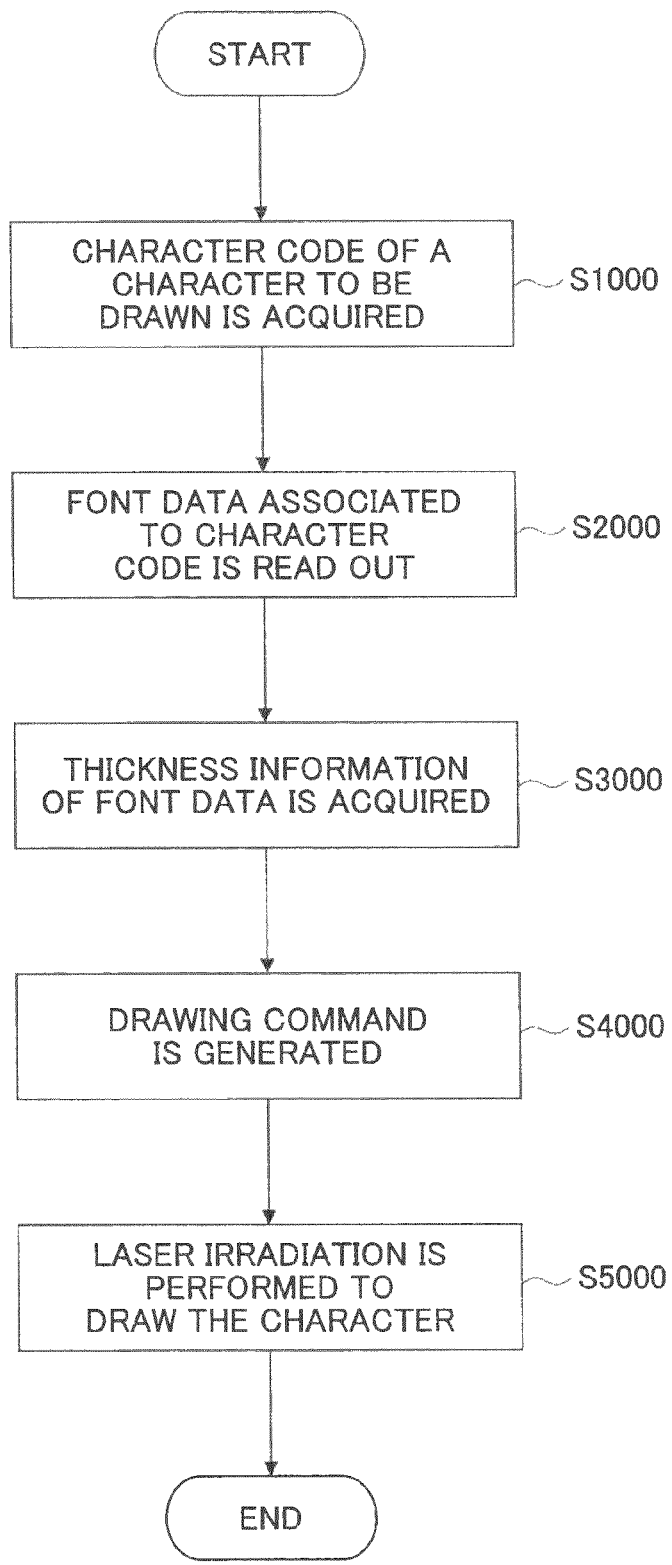
FIG. 8 is a flowchart for explaining a stroke font drawing process performed by the laser irradiation device according to the related art.

FIG. 8 is a flowchart for explaining a stroke font drawing process performed by the laser irradiation device 200 according to the related art.

As illustrated in FIG. 8, a character code acquiring unit 101 acquires a character code of a character to be drawn (S1000).

The character code of the character to be drawn may be input from the input device 36, or may be stored beforehand in the hard disk drive 35 (which includes the case in which the character code is input via the network). When the character code is input from the input device 36, the character code corresponding to the key code input by the user by depressing the keys of the keyboard, or the character code which is converted from the key code by the IME (input method editor) if the IME is running, is input to the character code acquiring unit 101.

When the character code is stored beforehand in the hard disk drive 35, a string of characters, such as a delivery address, is stored in the list format. Hence, the character code which specifies each character of the character string is read from the hard disk drive 35, and the character code is input to the character code acquiring unit 101.

Subsequently, a font data acquiring unit 102 makes reference to the font data database 41 based on the character code, and reads out the font data which is associated with the character code (S2000).

Figures 9A, 9B, 9C:
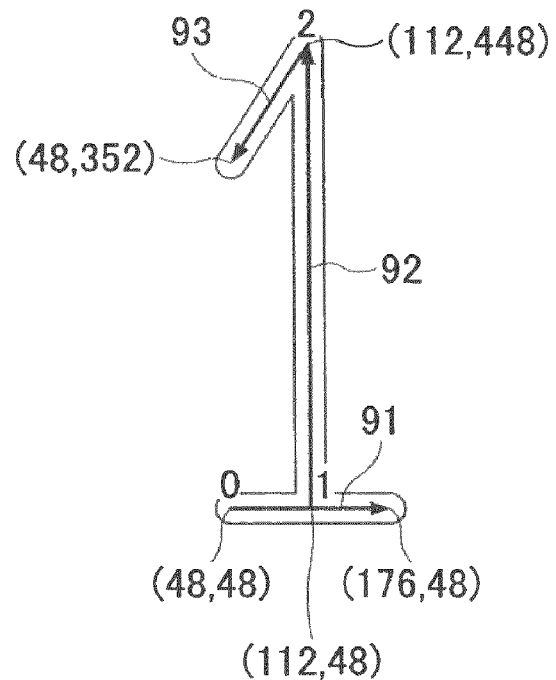
FIG. 9A, FIG. 9B, and FIG. 9C are diagrams illustrating an example of font data.

FIG. 9A illustrates an example of font data. The example of FIG. 9A is the font data associated with the character "1", and indicates an example of a character defined by a line segment (which may be either a straight line or a curve). As illustrated in FIG. 9A, the font data includes the coordinates of endpoints of the line segment and the order of drawing. A predetermined pixel of a bitmap when the character is arranged in the bitmap is specified as the origin of the coordinates.

When a stroke font is drawn by irradiation of a laser beam, how the laser irradiation is performed cannot be specified by only the coordinates. For this reason, it is necessary that the font data of the stroke font includes a laser drawing start position with a move command associated thereto, and a laser drawing end position with a move command associated thereto.

In FIG. 9A, the "m" row denotes a laser drawing start position and a move command to the coordinates thereof, and the "d" row denotes a laser drawing end position and a move command to the coordinates thereof. Namely, "m" indicates an OFF state of laser irradiation and movement to the coordinates, and "d" indicates an ON state of laser irradiation and movement to the coordinates. Therefore, the font data specifies the configuration of the character according to the coordinates, the order of drawing, and the direction of drawing (as indicated by the arrow in FIG. 9A), and the "d" and "m" in the font data specify the ON and OFF states of laser irradiation. For example, a straight line expressed by a font data including one or plural successive coordinates associated with "d" results in a one-stroke component drawn on the medium.

Specifically, in the case of the font data illustrated in FIG. 9A, a line segment is drawn from coordinates (24, 24) to coordinates (88, 24), a movement from coordinates (88, 24) to coordinates (56, 24) is performed without drawing any line segment, a line segment is drawn from coordinates (56, 24) to coordinates (56, 224), and a line segment is drawn from coordinates (56, 224) to coordinates (24, 176).

On the other hand, the configuration of a character to be drawn can be specified by only a corresponding number of line segments each of which is specified by a pair of coordinates of the two endpoints of the line segment.

FIG. 9B illustrates an example of the coordinates of each of respective line segments which constitute a character being drawn. In this embodiment, occurrence of an overlap between strokes is determined based on the coordinates of a line segment being drawn and the thickness of a character being drawn, which will be described later.

In the example of FIG. 9B, the size of the character is enlarged to twice as large as that of the example of FIG. 9A based on the font data. Similar to an outline font, the stroke font is a kind of a scalable font, and the size of the character at the time of drawing of the character on the rewritable medium 20 may be specified.

Some methods of adjustment of the size of the character of the stroke font are known. For the sake of convenience, the coordinates of the font data are simply doubled respectively. Alternatively, the coordinates of a line segment may be adjusted according to its distance from the center of a character.

The character "1" is drawn with three line segments as illustrated in FIG. 9C, and the font data contains three pairs of the coordinates of the endpoints of the line segments. The number in parentheses [ ] denotes the order of drawing, the former two points of the four subsequent numbers denote the coordinates of the starting point of a line segment, and the latter two points of the four subsequent numbers denote the coordinates of the final point of the line segment.

Referring back to FIG. 8, a thickness information acquiring unit 103 acquires the thickness information on the thickness of font data (S3000). The thickness information is registered in the font data database 41, or it is input by the user from the input device 36. Because the thickness of a character depends on the diameter of the laser beam by which the rewritable medium 20 is irradiated, the output of the laser oscillator 11, the lens position or the focal length of each of the optical lens 14 and the focusing lens 15, and the position of the rewritable medium 20 are controlled based on the thickness information.

Subsequently, a drawing command generating unit 107 generates a drawing command based on the font data (S4000). Although a drawing command will be mentioned later, the drawing command generated at this time includes the thickness of a character, the coordinates of two points of movement in the ON state of laser irradiation, the coordinates of two points of movement in the OFF state of laser irradiation, etc.

If the drawing command is received, a laser irradiation part 160 adjusts the output of laser oscillator 11, the focal length of the optical lens 14 and the focusing lens 15, and the position of the rewritable medium 20, if needed, based on the thickness information. The laser irradiation part 160 is caused to emit a laser beam to the rewritable medium 20 from the specified coordinates to the specified coordinates (S5000). The rewritable medium 20 is thereby heated and colored so that a character is drawn on the rewritable medium 20.

FIG. 9C illustrates an example of the character drawn by the laser beam according to the font data. In this example, an overlap between strokes is not eliminated yet. Line segments 91-93 correspond to the locus which the center of the laser beam has passed, and the arrow denotes the direction of drawing. The numbers within the character indicate the order of drawing of each of the line segments 91-93. The character "1" with the thickness obtained according to the irradiation power of the laser beam, the lens position or the focal length of the optical lens 14 and the focusing lens 15, and the position of the rewritable medium 20 is drawn.

Figure 10:
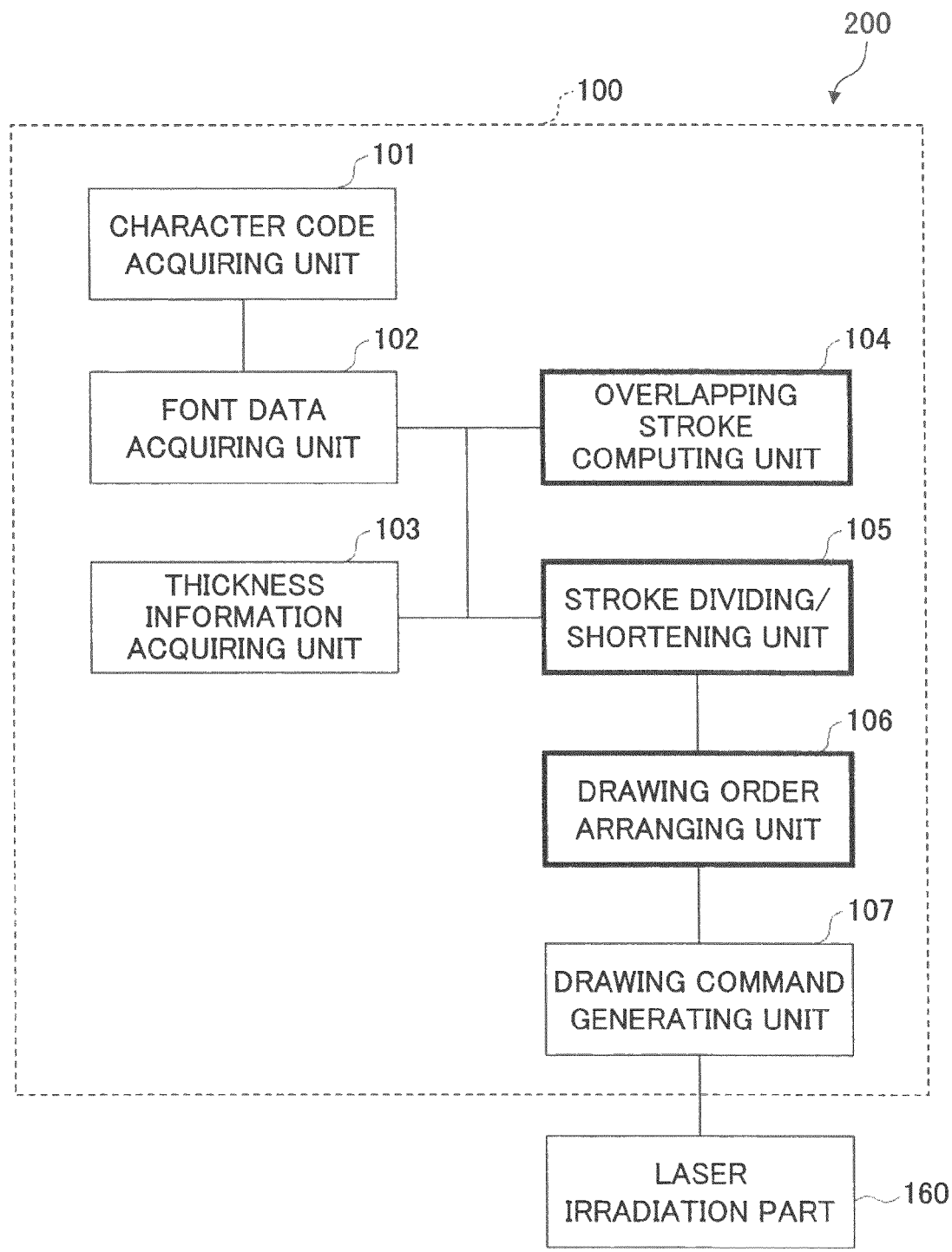
FIG. 10 is a block diagram illustrating the functional composition of a laser irradiation device of the embodiment 1 of the invention.

FIG. 10 illustrates the functional composition of the laser irradiation device 200 of this embodiment. When the software realizes each block, each block is realized by the CPU 31 which executes the character drawing program 42.

In FIG. 10, the elements which are the same as corresponding elements in FIG. 7 are designated by the same reference numerals, and a description thereof will be omitted.

The laser irradiation device 200 of FIG. 10 includes an overlapping stroke computing unit 104, a stroke dividing/ shortening unit 105, and a drawing order arranging unit 106, in addition to the elements of FIG. 7.

The laser irradiation device 200 of this embodiment will be described. The overlapping stroke computing unit 104 detects a pair of line segments which may overlap each other due to the positions and the thickness of the line segments, based on the font data.

Figure 11:
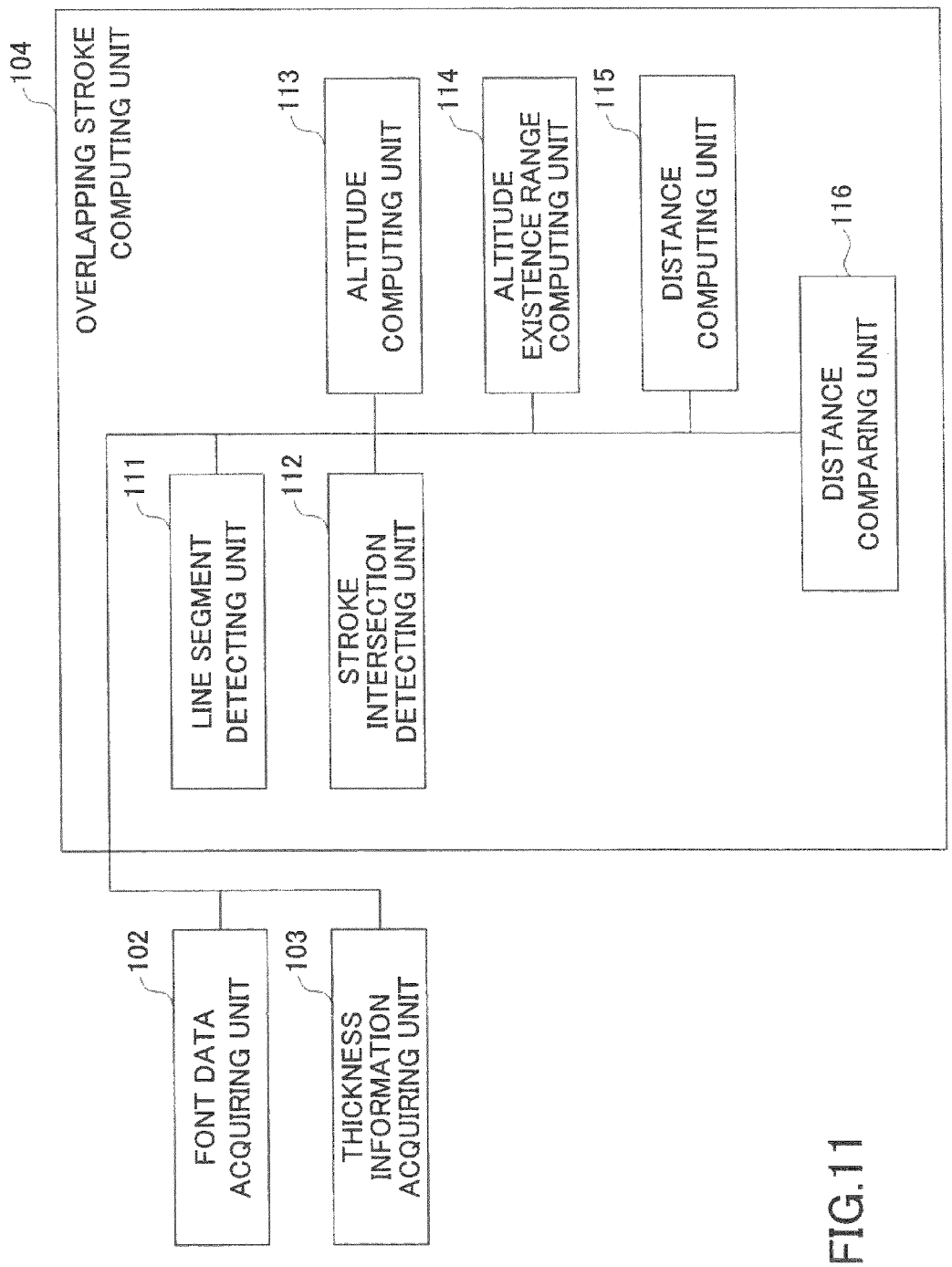
FIG. 11 is a block diagram illustrating the functional composition of an overlapping stroke computing unit.

Next, the detection of an overlap between strokes will be described. FIG. 11 is a block diagram illustrating the functional composition of the overlapping stroke computing unit 104. Based on the font data, the line segment detecting unit 111 determines the coordinates of line segments, as illustrated in FIG. 9B. Based on the coordinates of the line segments, it is determined whether an overlap between strokes arises in the character.

Like the number "1", when the character is formed by line segments only, the coordinates of line segments can be extracted easily. However, in the case of an outline font, the character is drawn with a curve like a Bezier curve, so that the curve is scalable. The computation of the distances between line segments becomes complicated if the character is drawn with the curve. Hence, it is preferred that even in a case of the character containing the curve, the curve is converted into straight lines and the character is drawn with the straight lines.

For this reason, if the font data contains the curve, the line segment detecting unit 111 converts the curve part into straight lines, and detects the coordinates of the line segment of each straight line. Because a control data for controlling the curve is contained in the font data when the character contains the curve, it is judged whether the character contains the curve, based on the font data.

Figures 12A, 12B:
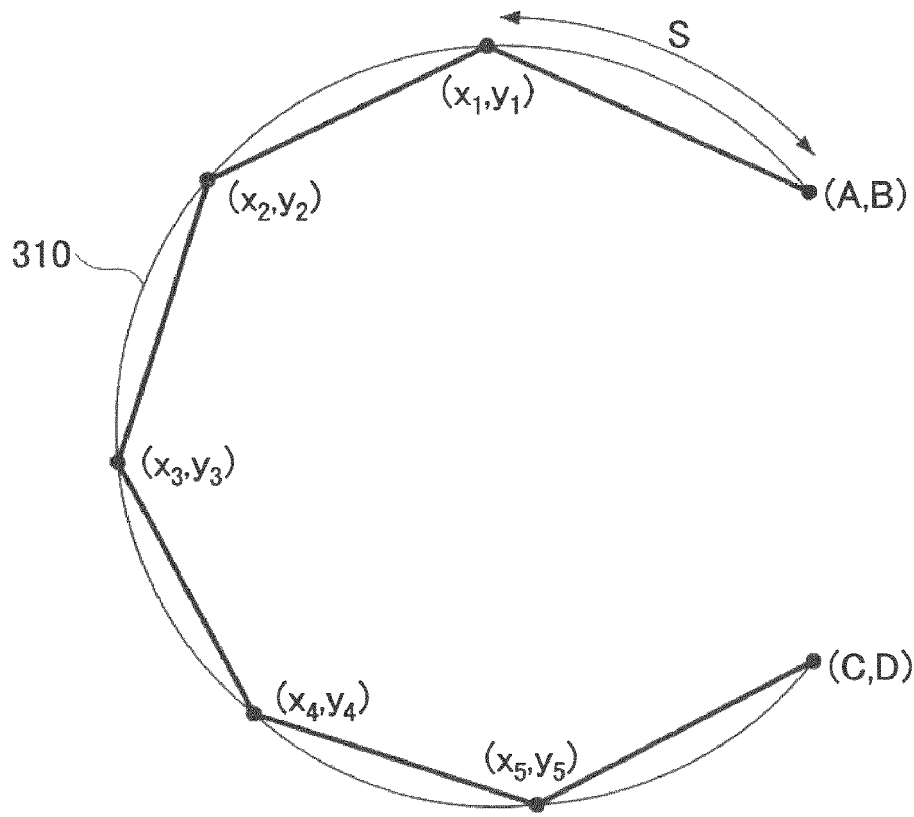
FIG. 12A and FIG. 12B are diagrams for explaining the process to convert a circle-shaped character into line segments.

FIG. 12A illustrates an example in which the line segment generated from a circle-shaped character. The control of the curve is performed to the coordinates (A, B) of the starting point and the coordinates (C, D) of the final point, and a circle-shaped one-stroke component 310 is obtained. In the case of this character, the line segment detecting unit 111 detects the coordinates of a line segment of the one-stroke component 310 for each predetermined distance s. The coordinates of the line segment being drawn are the coordinates after the scaling of the character is done.

The line segment detecting unit 111 stores a distance for each small interval and acquires the coordinates of each distance. In the example of FIG. 12A, five sets of coordinates are acquired. Based on these coordinates, the coordinates of the line segment drawn as illustrated in FIG. 9B are determined. FIG. 12B illustrates an example of the coordinates of the line segments after the curve is converted into straight lines.

Referring back to FIG. 11, the distance computing unit 115 finds the shortest distance of line segments. The method of finding the shortest distance is carries out in the following manner.

When there is an intersection between line segments, the distance of the line segments is considered as being equal to zero.

When there is no intersection, the distance of the line segments is determined by either the distance between the endpoints of one pair of line segments or the length of an altitude from the endpoint of one line segment perpendicular to the other line segment of the pair. That is, when there is no intersection, the distance is determined by the two methods, and presence of an overlap between strokes is determined based on the shortest distance.

Figure 13A:
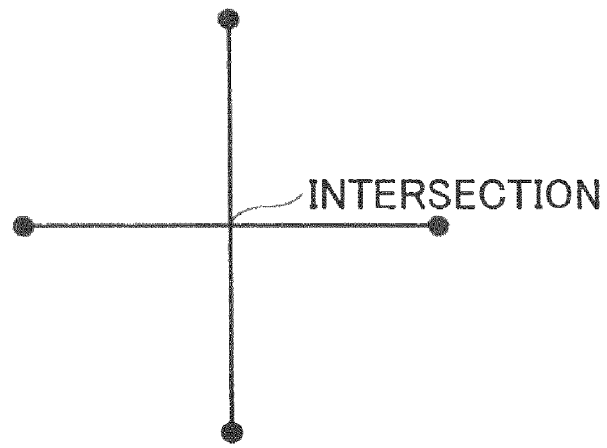
FIG. 13A, FIG. 13B, and FIG. 13C are diagrams for explaining an example of detection of the shortest distance between line segments.
Figure 13B:
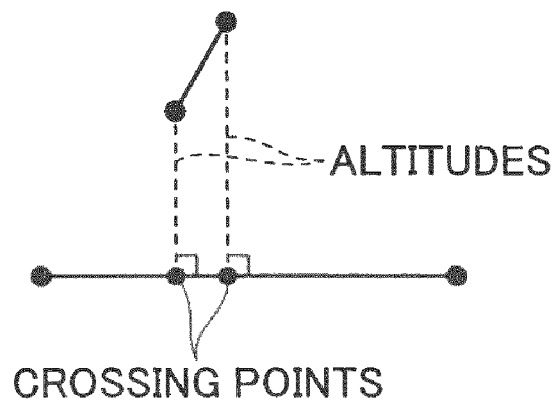
Figure 13C:
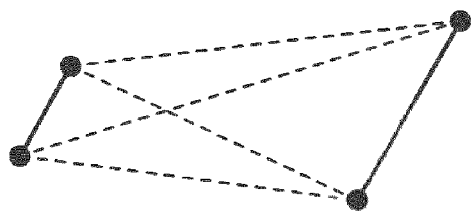

FIGS. 13A-13C are diagrams for explaining an example of the detection of the shortest distance between line segments.

FIG. 13A illustrates an example of two line segments having an intersection. If the line segments are expressed by two linear equations, the intersection of the line segments can be determined by solving the following equations: $y=a_1x+b_1$, $y=a_2x+b_2$.

Assuming that the intersection is set to $(x_p, y_p)$, $(x_p, y_p)=((b_2-b_1)/(a_1-a_2), a_1x_p+b_1)$. Unless two straight lines are parallel, an intersection of the straight lines can be obtained. In this embodiment, only when the intersection $(x_p, y_p)$ is included in a line segment, it is determined that the intersection exists.

FIG. 13B is a diagram for explaining computation of the length of the altitude taken from the endpoint of one line segment. The altitude computing unit 113 of FIG. 11 computes the length of the altitude as illustrated in FIG. 13B. The altitude is a line segment which is perpendicular to the other line segment of the pair of line segments, and which passes along the endpoint of one line segment. Therefore, the altitude computing unit 113 computes the formula of the altitude which passes the endpoint of one line segment of a straight line whose inclination is perpendicular to that of the other line segment. If the straight line: $y=cx+d$ intersects the other line segment of the pair, the altitude can be taken from the endpoint of one line segment to the other line segment of the pair.

Similar to FIG. 13A, the altitude existence range computing unit 114 determines the crossing point of the altitude and the other line segment of the pair. If the crossing point exists within the line segment, it is determined that the altitude can be taken. In this case, the distance computing unit 115 computes the lengths of the altitudes taken from the two endpoints of one line segment to the other line segment. The length of each altitude can be determined as a distance between the endpoint and the intersection.

There is a case in which any altitude cannot be drawn, which depends on the relation of two line segments. FIG. 13C is a diagram for explaining computation of a distance between two endpoints of a line segment. In this example, the distance computing unit 115 computes the distances between the two endpoints of one line segment and one endpoint of the other line segment, and the distances between the two endpoints of the other line segment and one endpoint of one line segment, respectively (namely, the four distances). The distance computing unit 115 may be arranged to compute the distances between the endpoints only when it is determined by the altitude computing unit 113 that an altitude cannot be computed. Alternatively, the distance computing unit 115 may be arranged to compute the distances between the endpoints regardless of the computation of an altitude.

When there is a very small distance among the detected distances, which is smaller than the thickness of the character, an overlap between the line segments will arise. That is, if the shortest distance is not shorter than the thickness of the character, no overlap between the line segments will arise.

The distance comparing unit 116 compares the shortest distance with the thickness indicated by the information of the thickness acquired by the thickness information acquiring unit 103. If the shortest distance is smaller than the thickness, one pair of line segments from which the shortest distance is detected is extracted. Hence, the overlapping stroke computing unit 104 determines that an overlap between the line segments arises in the pair of the line segments of the character concerned. In this case, the overlapping stroke computing unit 104 detects the amount of overlap by a difference between the character thickness and the shortest distance.

Referring back to FIG. 10, the line dividing/shortening process will be described. The stroke dividing/shortening unit 105 divides or shortens one line segment of a pair of line segments with which the distance between the pair of line segments is determined as being zero, and with which the distance between the endpoint and the line segment or the shortest distance between the endpoints is smaller than the thickness of a character. By dividing/shortening one line segment of the pair of line segments, an overlap between the line segments can be canceled.

Which of the line segments is to be divided or shortened is determined in accordance with the following rules.

R1: if one stroke disappears completely by dividing/shortening the stroke, the other stroke is divided or shortened.

R2: if neither of the line segments disappears completely, or if both of the line segments disappear completely, the line segment with the smaller length which will disappear as a result of the dividing/shortening process is selected as the candidate for the dividing/shortening process. This is based on the assumption that the amount of information which will be lost is smaller if the shorter line segment is made to disappear.

Figure 14A:
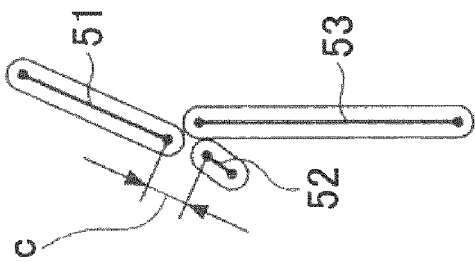
FIG. 14A, FIG. 14B, and FIG. 14C are diagrams for explaining an example of line segments in which a line dividing/shortening process is performed.
Figure 14B:
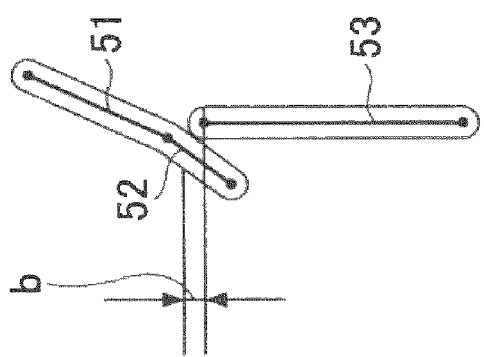
Figure 14C:
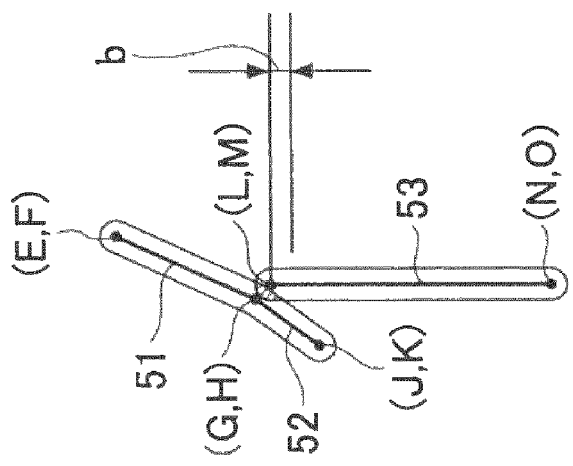

FIGS. 14A-14C are diagrams for explaining an example of line segments in which the line dividing/shortening process is performed. FIG. 14A illustrates a character which is drawn by line segments before the line dividing/shortening process is performed. The endpoints of a line segment 51 are (E, F) and (G, H), the endpoints of a line segment 52 are (G, H) and (J, K), and the endpoints of a line segment 53 are (L, M) and (N, O).

The overlapping stroke computing unit 104 detects that both the distance between the endpoint (G, H) of line segment 51 and the endpoint (L, M) of line segment 53 and the distance between the endpoint (G, H) of line segment 52 and the endpoint (L, M) of line segment 53 are smaller than the thickness of the character.

Strictly speaking, because the endpoints (G, H) of line segments 51 and 52 are the same, it is detected that an overlap between line segments 51 and 52 exists. However, the overlap in which the crossing angle is comparatively small can be disregarded, which will be described later.

Because it is detected that there is no intersection and one of the line segments does not disappear completely whichever of the line segments is shortened, the stroke division and shortening 105 determines that the rule R2 is applied to this case. For this reason, the stroke dividing/shortening unit 105 compares the amount of shortening when both the line segments 51 and 52 are shortened with the amount of shortening when the line segment 53 is shortened.

FIG. 14B illustrates an example of a character which is drawn by shortening the line segment 53. FIG. 14C illustrates an example of a character which is drawn by shortening the line segments 51 and 52.

The overlapping stroke computing unit 104 selects one of the line segments 51 and 52 with the smaller length which will disappear as a result of the dividing/shortening process.

The stroke dividing/shortening unit 105 computes an amount of shortening "b" when the line segment 53 is shortened, and an amount of shortening "c" when both the line segments 51 and 52 are shortened, and determines which of the line segments 51-53 with the smaller length is to be shortened. In this case, the amount of overlap between the line segment 51 and the line segment 53 and the amount of overlap between the line segment 52 and the line segment 53 are equal to each other. The amount of shortening when the line segments 51 and 52 are shortened is equal to twice of "the amount of overlap", and the amount of shortening when the line segment 53 is shortened is equal to "the amount of overlap". Hence, if the line segment 53 is shortened, the length of the line segment which will disappear as a result of the shortening process is shorter.

Based on the above computation, the stroke dividing/shortening unit 105 determines that the line segment 53 is to be shortened. The amount of shortening in this case is equal to the amount of overlap. Thus, the stroke dividing/shortening unit 105 shortens the line segment 53 by the amount of shortening and determines the coordinates of the endpoint (L, M) of the line segment 53 after the line segment 53 is shortened.

Figure 15A:
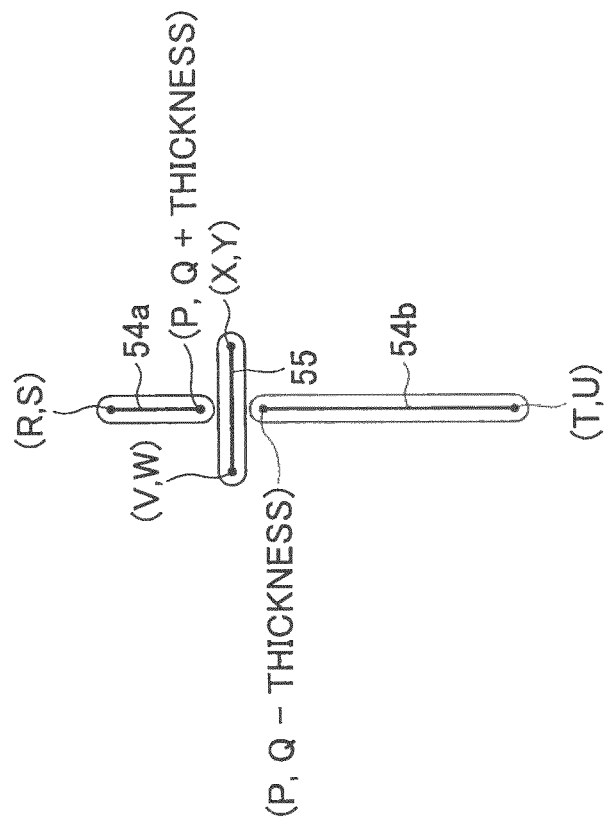
FIG. 15A, FIG. 15B, and FIG. 15C are diagrams for explaining another example of line segments in which a line dividing/shortening process is performed.
Figure 15B:
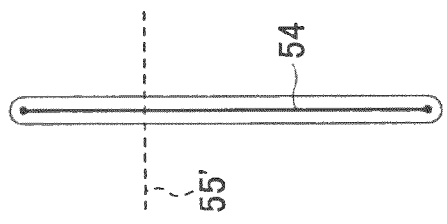
Figure 15C:
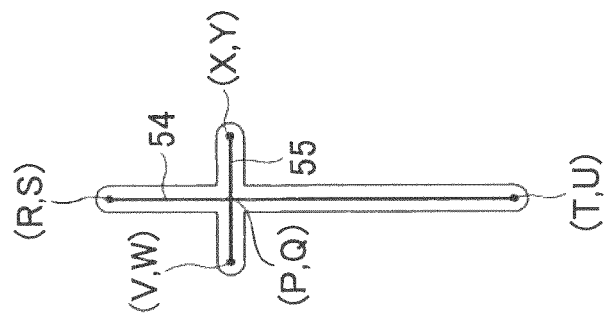

FIGS. 15A-15C are diagrams for explaining another example of line segments in which the line dividing/shortening process is performed.

FIG. 15A illustrates an example of a character drawn by the line segments before the line dividing/shortening process is performed. The overlapping stroke computing unit 104 detects that there is an intersection between line segment 54 and line segment 55. For this reason, the stroke dividing/shortening unit 105 divides or shortens one of the line segment 54 and the line segment 55. When an intersection exists, the line dividing process is performed for the selected line segment.

The stroke dividing/shortening unit 105 determines whether one of the strokes disappears completely by temporarily dividing each of the line segments and shortening the divided line segment portions by the amount of overlap between the line segments. FIG. 15B illustrates an example of a character drawn by dividing the line segment 55 and shortening the divided line segment portions by the amount of overlap. FIG. 15C illustrates an example of a character drawn by dividing the line segment 54 and shortening the divided line segment portions by the amount of overlap.

As illustrated in FIG. 15B, if the line segment 55 is divided and shortened so as not to overlap with the line segment 54, the line segment 55 will disappear completely. Therefore, the rule R1 is applied to the case of the character of FIG. 15A, and the overlapping stroke computing unit 104 determines that the line segment 54 is to be divided.

It is detected that the line segment 55 will disappear completely as a result of the line dividing/shortening process, from the fact that the distance between the endpoint (V, W) of line segment 55 and the intersection (P, Q) is smaller than the thickness of the character.

When there is an intersection, the stroke dividing/shortening unit 105 considers the intersection as an endpoint of one line segment, and divides the line segment 54 into a line segment portion 54a with the endpoints (R, S), (P, Q) and a line segment portion 54b with the endpoints (P, Q), (T, U). The stroke dividing/shortening unit 105 computes the amount of overlap of each line segment portion with the line segment 55.

When there is an intersection, the amount of overlap in which the endpoint (P, Q) overlaps with the line segment 55 is equal to half of the thickness of the character. The amount of overlap can be detected without computing the same. The amount of shortening is equal to the thickness of the character in consideration of the spread of the endpoint which is shortened and moved.

Therefore, the stroke dividing/shortening unit 105 determines the coordinates (R, S), (P, Q+thickness) of two endpoints of the line segment portion 54a which is produced from the line segment 54. Similarly, the stroke dividing/shortening unit 105 determines the coordinates (P, Q−thickness), (T, U) of two endpoints of the line segment portion 54b which is produced from the line segment 54. Accordingly, the character in which the intersection is eliminated can be drawn as illustrated in FIG. 15C.

In this manner, the line dividing/shortening process is performed, and an overlap between the line segments can be eliminated. It is possible for this embodiment to avoid deteriorating of the character quality by preventing excessive heating of the rewritable medium by laser irradiation due to line thickening caused by an intersection, overlapping point, or turn-back point, and it is possible for this embodiment to avoid collapsing of the character image due to a gap between strokes. Furthermore, it is possible for this embodiment to avoid excessive heating of a rewritable medium by laser irradiation due to an intersection, overlapping point, or turn-back point by preventing an overlap between strokes, and thereby prevent remaining of non-erased portions and falling of the optical density of colored portions due to degradation of the rewritable medium by repeated rewriting.

Next, a case in which an overlap between line segments exists but the line segments are not divided or shortened in order to secure the quality of the character being drawn will be described.

Figure 16A:
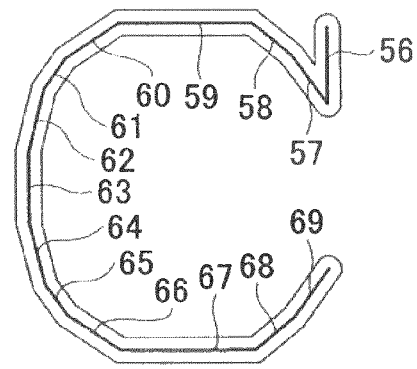
FIG. 16A, FIG. 16B, FIG. 16C, and FIG. 16D are diagrams for explaining an example of line segments in which a line dividing/shortening process is performed, and an example of line segments in which the line dividing/shortening process is not performed.

FIGS. 16A-16D are diagrams for explaining the case where line segments are divided or shortened and the case where the line segments are not divided or shortened. FIG. 16A illustrates an example of a character drawn by line segments before the line dividing/shortening process is performed.

In the case of the font data with which the character "C" of FIG. 16A contains a curve, the coordinates of each line segment determined by the line segment detecting unit 111 for each distance s are used.

Figure 16B:
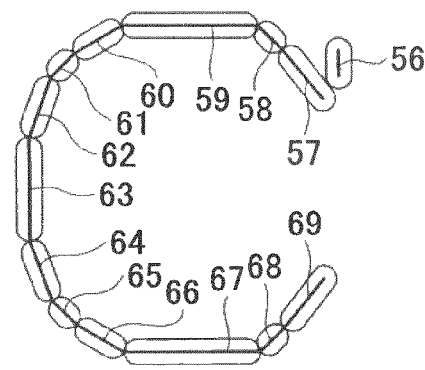

One of the endpoints of two of line segments 56-69 are common to each other in the example of FIG. 16A. The overlapping stroke computing unit 104 detects that an intersection between two line segments exists and the distance between the endpoints is smaller than the thickness of the character. If the above rule R2 is applied, the character as illustrated in FIG. 16B is drawn by the line segments in which all the line segments 56-69 are shortened.

However, if the character is collapsed in this way, it causes the difficulty for the user to recognize the character. In order to draw the character in this case, the stroke dividing/shortening unit 105 operates in accordance with the following rule R3.

R3: if two line segments are continued and the crossing angle between the line segments is comparatively small, the dividing/shortening process is not performed.

Figure 16C:
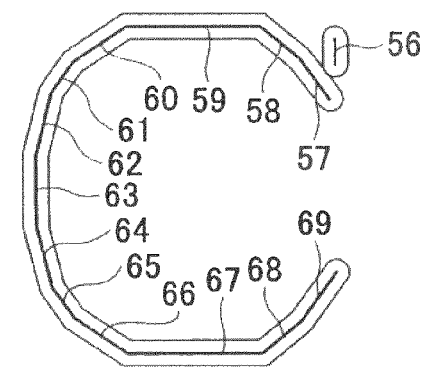
Figure 16D:
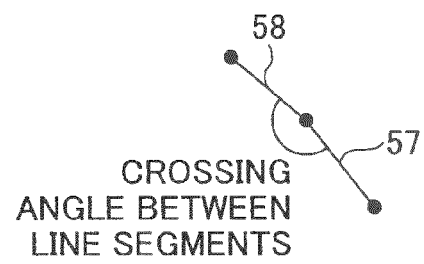

FIG. 16D is a diagram for explaining the crossing angle between line segments. For example, the crossing angle between line segments 57 and 58 illustrated is comparatively large. When the crossing angle between line segments is large, the influence of the inertia of the direction control motor 12 or the direction control mirror 13 is little, and it is unlikely that the portion of the medium to which the laser irradiation is applied twice is excessively heated to a high temperature.

The stroke dividing/shortening unit 105 computes the crossing angle between line segments where one line segment is continued to the other. Only when the crossing angle between the line segments is smaller than a predetermined value (for example, 45 degrees), the line segment portions are shortened.

The crossing angle between two line segments is obtained by expressing the two line segments by vectors v1 and v2 (the origin is optional) and dividing the inner product of the vectors by the magnitudes of the vectors as follows.

$$\cos\theta = (v1 \cdot v2)/(|v1||v2|)$$

If the rule R3 is applied to the character of FIG. 16A, it is determined that shortening of the line segment portions at the overlapping parts other than the line segments 56 and 57 should not be performed.

The character as illustrated in FIG. 16C is drawn by the line segments in which the stroke dividing/shortening unit 105 shortens the line segment 56 of the line segments 56 and 57.

In accordance with the rule R3, if the crossing angle is large, the influence of the inertia of the direction control motor 12 or the direction control mirror 13 is negligible, and in this case the line dividing/shortening process is not performed. Hence, it is possible to prevent deteriorating of the quality of the character image as illustrated in FIG. 16B.

After the coordinates of the endpoints of each line segment are determined such that an overlap between line segments does not arise, the drawing command generating unit 107 generates a drawing command to draw a character. The drawing speed at this time can be increased by optimizing the order of drawing.

Referring back to FIG. 10, the drawing order arranging unit 106 optimizes the order of drawing of each line segment based on the coordinates of the line segment. For example, optimization means to minimize the movement distance of the direction control mirror 13 to draw a character.

Figure 17A:
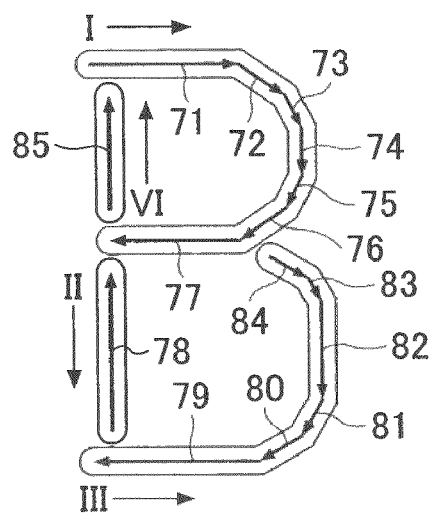
FIG. 17A and FIG. 17B are diagrams for explaining an example of optimization of the drawing order.

FIG. 17A illustrates an example of a drawing result of the line segments of a character "B" after the line dividing/shortening process is completed. The character "B" is constituted by line segments 71-85. In this state, if a new line segment is added by division or curved linearization, the information on how to draw the new line segment is not included. For this reason, the order of drawing is arranged to each line segment.

The drawing order arranging unit 106 optimizes the order of drawing by the following steps.

Step 1: Searching the endpoint of a predetermined line segment (which is any line segment) and the endpoint of another line segment which have the same coordinates are searched in a row, they are rearranged in order of arrangement, one line segment group is determined.

For example, in the example of FIG. 17A, the endpoint of line segment 71 is the same as the endpoint of line segment 72, the endpoint of line segment 72 is the same as the endpoint of line segment 73, the endpoint of line segment 73 is the same as the endpoint of line segment 74, the endpoint of line segment 74 is the same as the endpoint of line segment 75, the endpoint of line segment 75 is the same as the endpoint of line segment 76, and the endpoint of line segment 76 is the same the endpoint of line segment 77. Therefore, the line segments 71-77 are determined as one line segment group. Similarly, the line segments 79-84 are determined as one line segment group.

Step 2: When other line segments having the same endpoint cannot be found, only the line segment is considered as one line segment group.

For example, in the example of FIG. 17A, each of the line segments 78 and 85 is determined as one line segment group.

Step 3: All the line segments are made to belong to one of the line segment groups.

In the example of FIG. 17A, four line segment groups are determined. Therefore, the line segment groups are equivalent to a one-stroke component.

Step 4: After the grouping of the line segments is completed, the order of drawing of the line segment groups is determined. Other line segment groups' starting point and final point nearest to the final point of a predetermined line segment group are searched sequentially, and the order of drawing of the line segment groups is rearranged into that order.

In this case, because the original order of drawing remains, the rearrangement is performed. Alternatively, the order of drawing may be determined after the original order of drawing is initialized.

For example, starting with the line segment group I, the line segment group II is found out (otherwise the line segment group VI is found out), and the endpoint of the line segment group III is near the other endpoint of the line segment group II. Therefore, the order of drawing of the line segment groups is rearranged to the order of line segment groups I, II, III and VI.

Step 5: If it is determined that the final point of the line segment group of concern is close to the final point of the following line segment group, the drawing order and direction of the line segments in the following line segment group are reversed.

Based on the original order of drawing, the drawing direction of a line segment group is already defined that the drawing direction in a line segment group should just be a direction uniform to a line segment for each line segment group.

In the example of FIG. 17A, the arrows indicate the drawing direction of line segment groups. As a result of rearranging the order of drawing, the drawing direction based on the original order of drawing may not be suitable. Hence, the drawing direction is optimized.

For example, in the example of FIG. 17A, the line segment groups with the starting point and the final point nearest to the final point of the line segment group I are the line segment groups VI and II. The drawing direction of the line segment group VI whose endpoint is the starting point is not reversed. However, the drawing direction of the line segment group II whose endpoint is the final point is reversed.

Next, the line segment group with the starting point and the final point nearest to the final point of the line segment group II with which the drawing direction is reversed is the line segment group III. Because the endpoint of the line segment group III is the final point, the drawing order and direction of line segments in the line segment group III are rearranged.

Figure 17B:
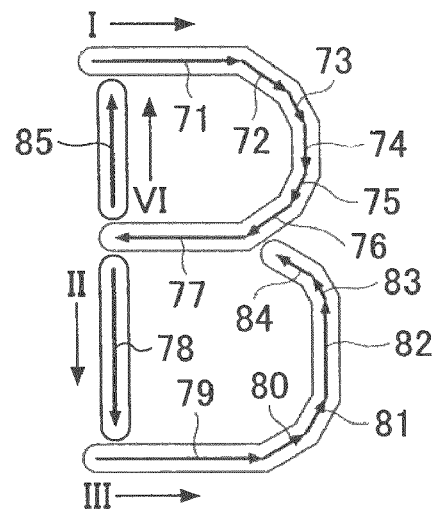

FIG. 17B illustrates an example of the drawing direction where the drawing direction was changed.

Step 6: The drawing order of the line segment groups and the drawing direction of line segments in the line segment group are updated.

By the above process, the drawing order of the line segment groups contained in the font data and the drawing direction of line segments in each line segment group are changed, and the font data is updated to the new drawing order and direction.

Figures 18A, 18B, 18C, 18D, 18E:
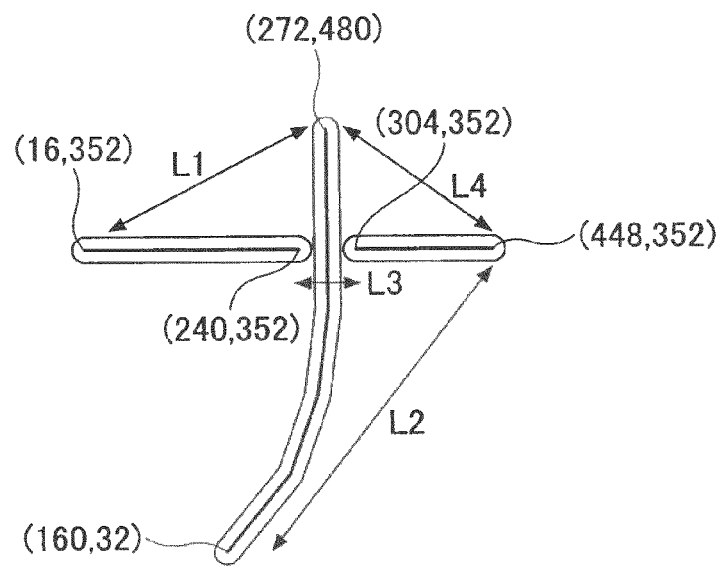
FIG. 18A, FIG. 18B, FIG. 18C, FIG. 18D, and FIG. 18E are diagrams for explaining an example of determination of the drawing order of line segment groups.

FIGS. 18A-18E are diagrams for explaining an example of the determination of the drawing order of line segment groups. FIG. 18A illustrates the katakana character "ナ". To eliminate an overlap between strokes, the first line segment is divided into two line segments, and the character is composed of three one-stroke components. For the sake of convenience, "n" denotes the number of one-stroke components, and the i-th one-stroke component is expressed by Si where i is an integer ($0 \leq i \leq n-1$).

If there are "n" one-stroke components, the number of combinations of the drawing order is represented by "n!". However, the drawing order from the starting point to the final point may be reversed for each one-stroke component. If this is taken into consideration, there are "$2^{(n-1)}$" combinations of the drawing order for each set of the drawing order.

Therefore, if the drawing order from the starting point to the final point is taken into consideration, the number of ways of the drawing order of a character which is composed of "n" one-stroke components is represented by "$n! \times 2^{(n-1)}$". For example, in the case of "ナ", n=3 and there are 24 ways of the drawing order.

In FIGS. 18A-18E, three ways of the arrangement of the drawing order are illustrated. Because the number of line segments immediately after an overlap between strokes is eliminated is three, the coordinates of each line segment are as illustrated in FIG. 18B. The order of drawing is optimized based on these coordinates.

FIG. 18C illustrates the state in which rearranging is not performed. FIG. 18D illustrates the state in which rearranging is performed. FIG. 18E illustrates the state in which rearranging is performed by including the starting point and the final point which are reversed.

"+" in parentheses [ ] of the first column of FIGS. 18C-18E indicates that the starting point and the final point are not reversed, and "−" in parentheses [ ] of the first column of FIGS. 18C-18E indicates that the starting point and the final point are reversed.

The drawing order arranging unit 106 determines the sum of the respective distances between line segment groups for each way of arrangement. That is, the sum of the distances at the time of merely moving the drawing position without drawing the character is determined.

In the example of FIG. 18C, the drawing position is moved in order of (160, 32) to (272, 480), (16, 352) to (240, 352), and (304, 352) to (448, 352). Therefore, the sum of the distances at the time of moving the drawing position without performing drawing is as follows.

The sum of distances=$L1+L3$=root$\{(272-16)^2+(480-352)^2\}$+root$\{(240-304)^2+(352-352)^2\}$=350.2

In the example of FIG. 18D, the drawing position is moved in order of (16, 352) to (240, 352), (304, 352) to (448, 352), and (160, 32) to (272, 480). Therefore, the sum of distances at the time of moving the drawing position without performing drawing is as follows.

The sum of distances=$L3+L2$=root$\{(240-304)2+(352-352)2\}$+root$\{(448-160)2+(352-32)2\}$=494.5

In the example of FIG. 18E, the drawing position is moved in order of (16, 352) to (240, 352), (304, 352) to (448, 352), and (270, 480) to (160, 32). Therefore, the sum of the distance at the time of moving the drawing position without performing drawing is as follows.

The sum of distances=$L3+L4$=root$\{(240-304)^2+(352-352)^2\}$+root$\{(448-272)^2+(352-480)^2\}$=281.6

The drawing order arranging unit 106 chooses the order of drawing with the smallest sum of distances. In the example of FIGS. 18A-18E, the order of drawing of FIG. 18E which has the smallest sum of distances is selected from among 24 ways of the drawing order including those illustrated and those not illustrated.

The example of FIGS. 18A-18E is an example of the optimization of only one character. When drawing two or more characters continuously, the drawing position is moved without performing drawing from the final point of the preceding character to the start point of the following character. Therefore, although processing time increases by performing the process of FIGS. 18A-18E for a string of characters to be drawn on the whole rewritable medium 20 of one sheet, instead of each one character, the time to perform drawing itself can be shortened.

Referring back to FIG. 10, a drawing command will be described.

Figures 19A, 19B, 19C, 19D:
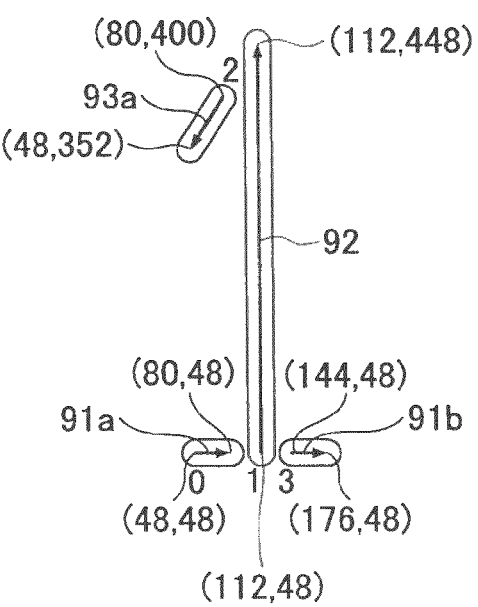
FIG. 19A, FIG. 19B, FIG. 19C, and FIG. 19D are diagrams illustrating an example of a drawn character in which an overlap between strokes is eliminated, and an example of a drawing command of the character.

FIGS. 19A-19D are diagrams illustrating an example of a drawing command of a character in which an overlap between strokes is eliminated. This character "1" is composed of three line segments, as illustrated in FIG. 19C, but line segment 91 is divided at the intersection (112, 48) into line segments 91a and 91b, and line segment 93 is shortened at the turn-back point (112, 448) to line segment 93a. Therefore, the number of line segments is four as a result of eliminating an overlap between strokes.

FIG. 19A is the same as FIG. 9B, and FIG. 19B illustrates the coordinates of line segments which are the target of a drawing command to be generated. FIG. 19C illustrates the example of drawing. It is assumed that the optimization of the drawing order is already completed.

Thus, if the coordinates and the drawing order of line segments are determined, the drawing command can be generated by associating the control codes "m" and "d" as in FIG. 9A with the coordinates.

FIG. 19D illustrates an example of a drawing command. In FIG. 19D, "m" and "d" are the same control codes as FIG. 9A, "t" denotes the thickness of a character, and "w" denotes the latency time until the drawing is restarted (which is a control code for waiting for a predetermined time until the moving direction control mirror 13 stops completely, in order to stabilize the drawing).

A fixed value that is appropriate for the laser irradiation part 160 is assigned beforehand to the control code "w". The value of "w" is set to a predetermined number of milliseconds or microseconds, that is a unit time specific to the laser irradiation part 160.

According to FIG. 19B, the drawing position is moved to coordinates (48, 48) without drawing, and waited for the predetermined time "w 50". The correspond portion of the drawing command is set to "m 48 48" and "w 50".

Next, the laser irradiation is set to ON state, the drawing position is moved from coordinates (48, 48) to (80, 48) to draw a stroke, then the drawing position is moved to coordinates (112, 48) without drawing, and waited for the predetermined time "w 50". The corresponding portion of the command is set to "d 80 48", "m 112 48", and "w 50".

Next, the laser irradiation is set to ON state, the drawing position is moved from coordinates (112, 48) to coordinates (112, 448) to draw a stroke, then the drawing position is moved to coordinates (80,400) without drawing, and waited for the predetermined time "w 50". The corresponding portion of the command is set to "d 112 448", "m 80 400", and "w 50".

Next, the laser irradiation is set to ON state, the drawing position is moved from coordinates (80,400) to coordinates (48, 352) to draw a stroke, then the drawing position is moved to coordinates (144, 48) without drawing, and waited for the predetermined time "w 50". The corresponding portion of the command is set to "d 48 352", "m 144 48", and "w 50".

Next, the laser irradiation is set to ON state, the drawing position is moved from coordinates (144, 48) to coordinates (176, 48) to draw a stroke, and, at this final point, the drawing is finished. The corresponding portion of the command is set to "d 176 48". In accordance with such drawing command, the character in which an overlap between strokes is eliminated can be drawn as illustrated in FIG. 19C.

Figure 20:
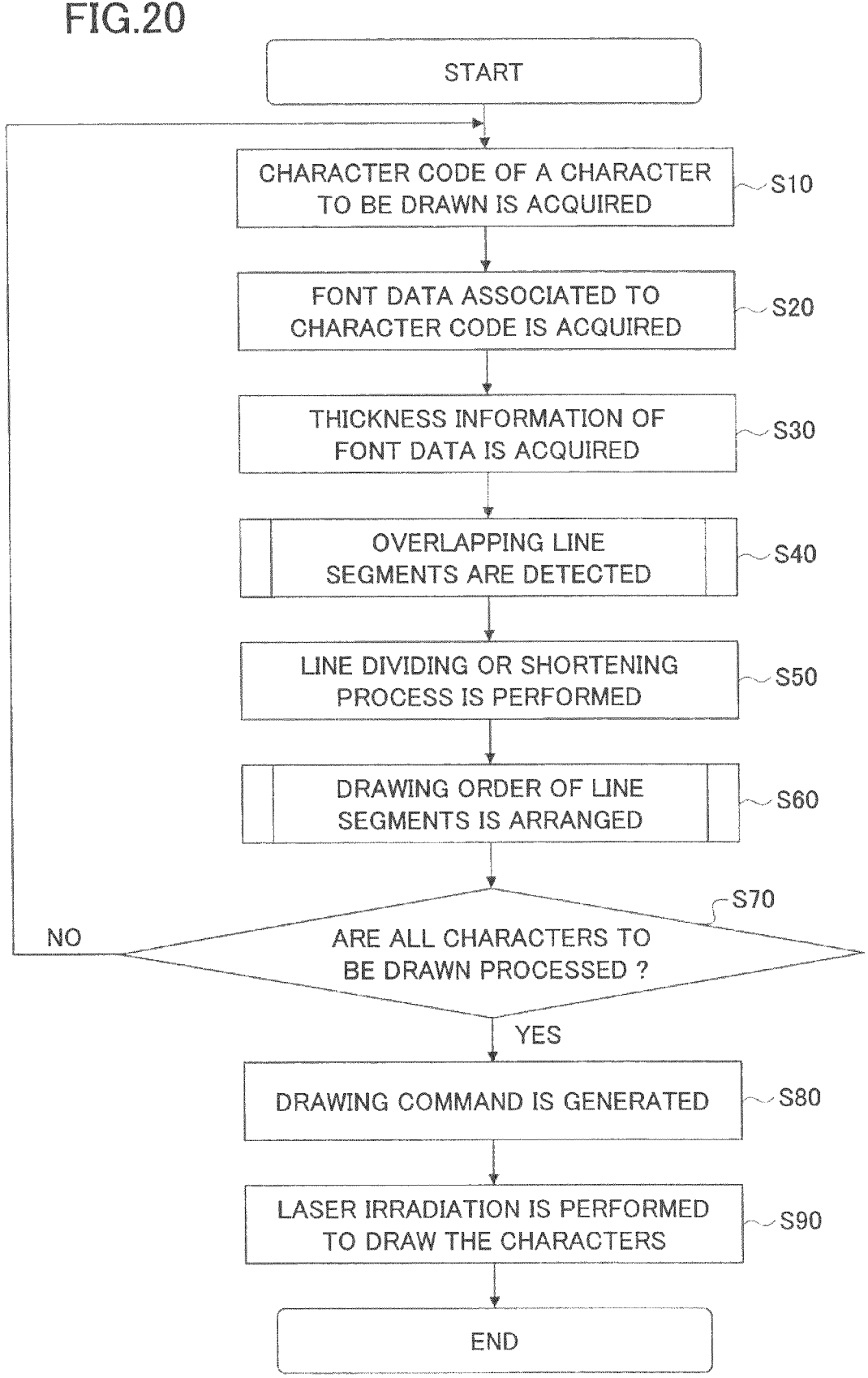
FIG. 20 is a flowchart for explaining the whole process to draw characters on a rewritable medium using laser irradiation.
Figure 21:
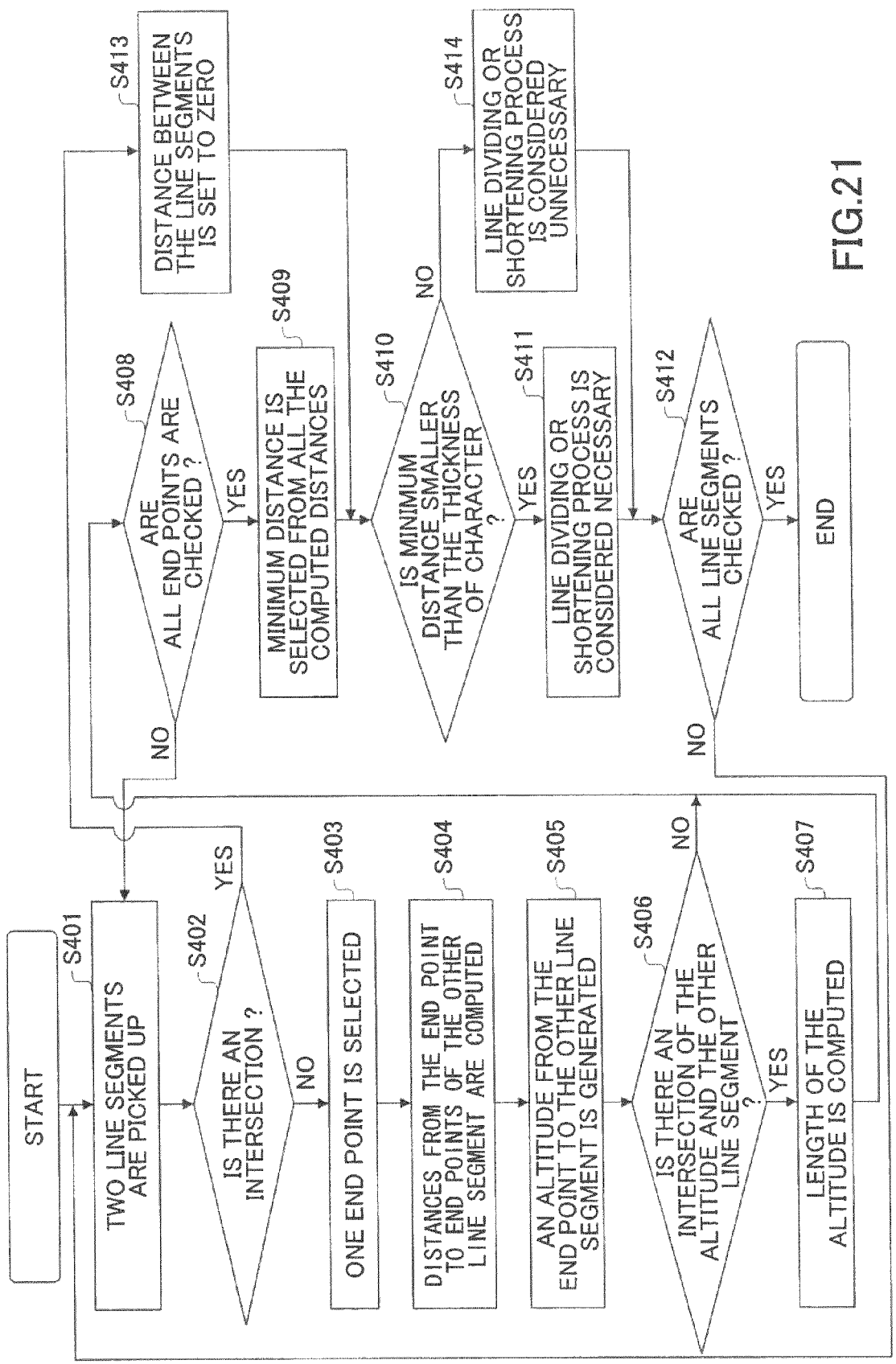
FIG. 21 is a flowchart for explaining the process to detect an overlapping line segment.
Figure 22:
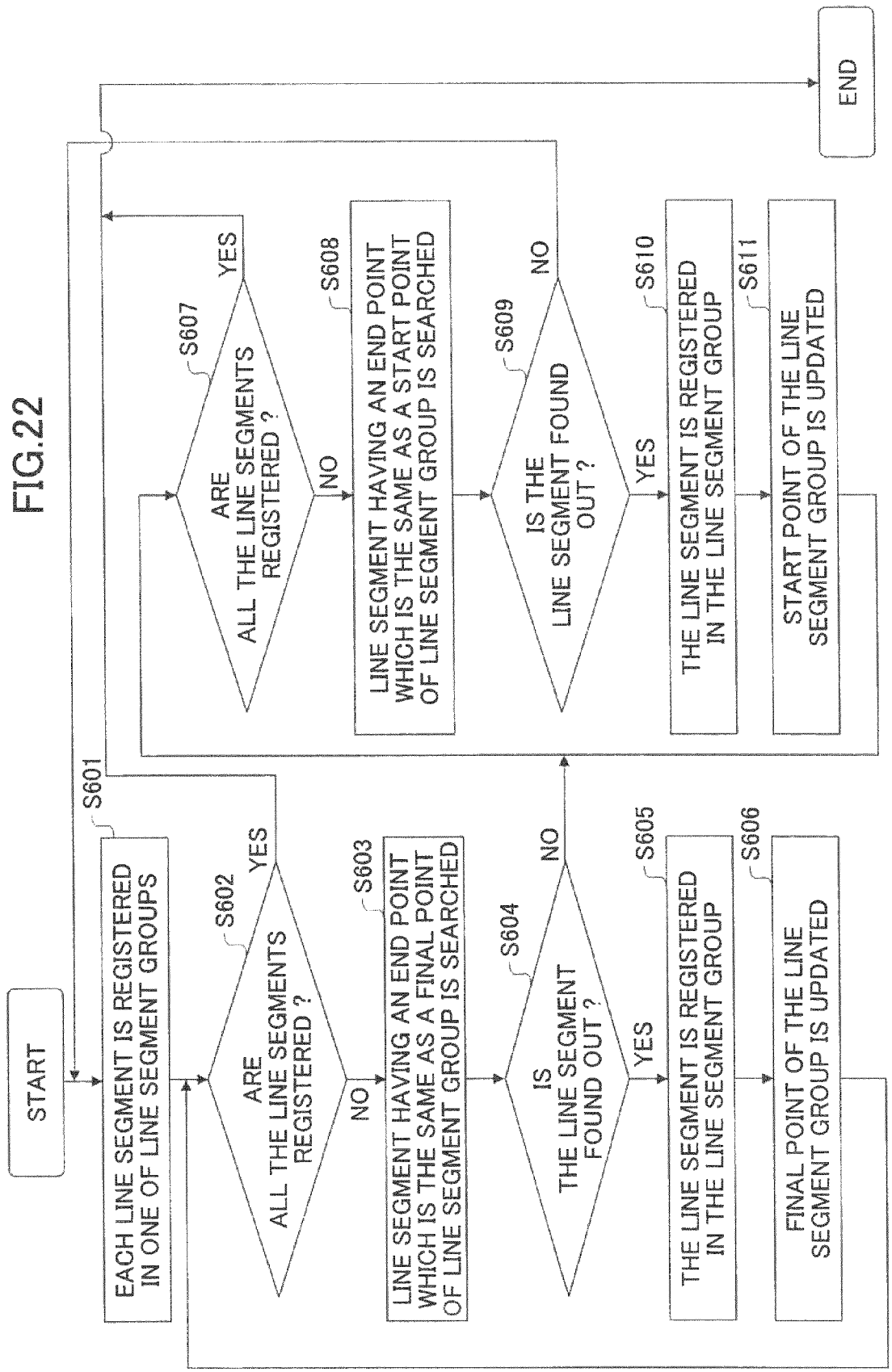
FIG. 22 is a flowchart for explaining the first half of the process to arrange the drawing order.
Figure 23:
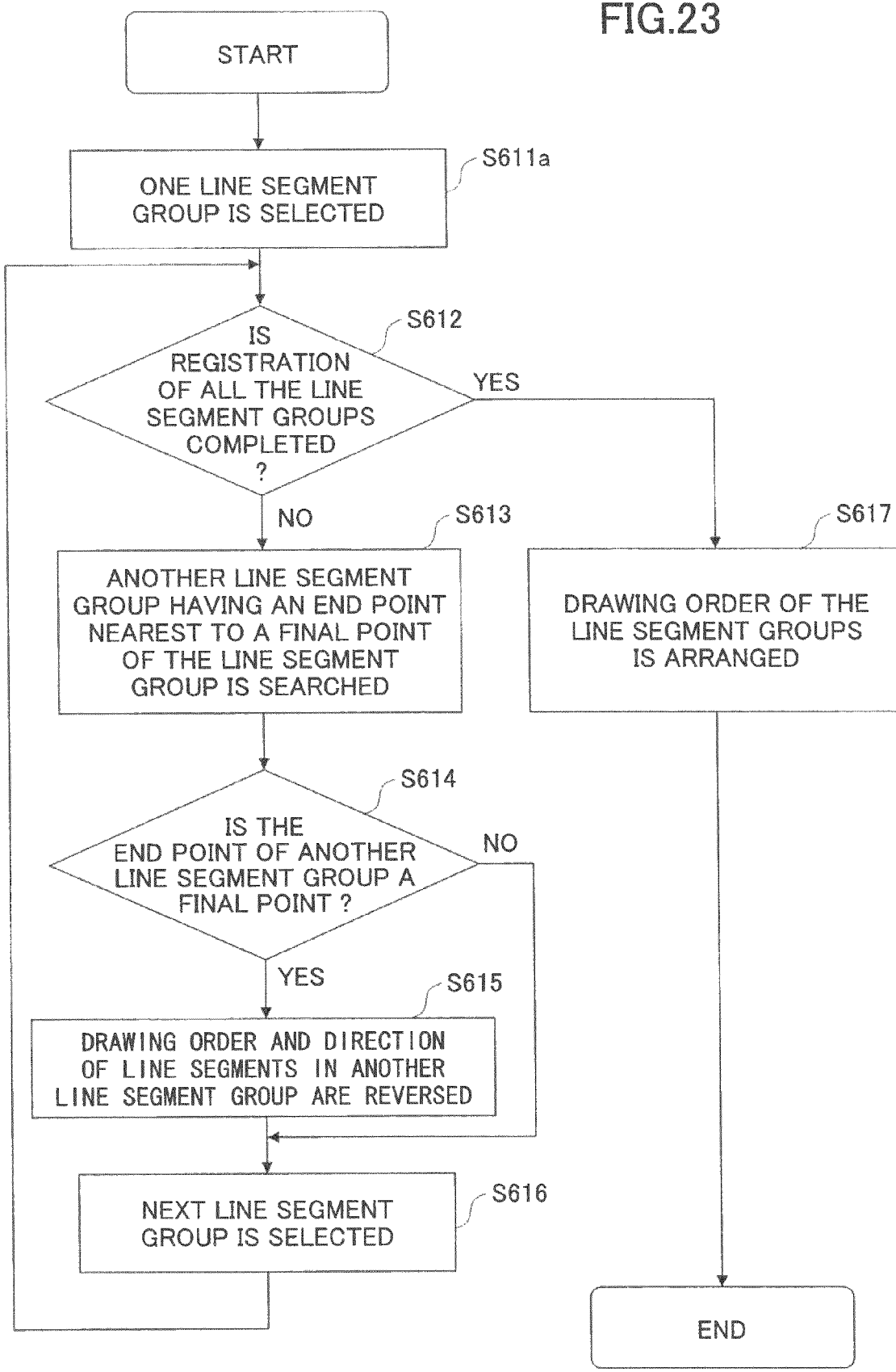
FIG. 23 is a flowchart for explaining the second half of the process to arrange the drawing order.

FIG. 20 illustrates the whole process by the laser irradiation device 200 of this embodiment, FIG. 21 illustrates the process to detect an overlapping line segment, and FIG. 22 and FIG. 23 illustrate the process to arrange the drawing order.

In FIG. 20, steps S10-S30 are the same as corresponding steps of the process according to the related art. The character code acquiring unit 101 acquires the character code of the character for drawing from the character string of the list format stored beforehand in the hard disk drive 35 or input from the input device 36 (S10).

Subsequently, the font data acquiring unit 102 reads the font data matched with the character code with reference to font data database 41 based on the character code (S20). The font data is illustrated in FIG. 9A.

Subsequently, the thickness information acquiring unit 103 acquires the information of the thickness of the font data (S30). A user inputs information as to whether the thickness information is registered in the font data database 41. The thickness of the character depends on the beam diameter when the rewritable medium 20 is irradiated by the laser beam.

Subsequently, the overlapping stroke computing unit 104 detects a pair of overlapping line segments (S40). The detailed process of step S40 will be described with reference to FIG. 21.

First, the line segment detecting unit 111 extracts the coordinates of a line segment from the font data of one character, and reads two arbitrary line segments (S401).

The stroke intersection detecting unit 112 determines whether there is an intersection of two line segments (S402).

When there is no intersection (No of S402), in order to detect the distance between the endpoints, one endpoint is chosen among four endpoints of two line segments (S403).

The distance computing unit 115 detects the distance with the endpoint of the line segment of another side (which does not have the endpoint currently observed) (S404).

Next, the altitude computing unit 113 takes an altitude to the line segment of another side (S405). Because an altitude may not intersect the line segment of another side, the altitude existence range computing unit 114 determines whether the altitude intersects the line segment of another side (S406).

When it is determined that the altitude intersects the line segment of another side (Yes of S406) is detected, the distance detecting unit detects the length of the altitude between the endpoint and the line segment of another side (S407). When it is determined that the altitude does not intersect the line segment of another side (No of S406), the control is shifted to the next endpoint.

When the detection of the lengths between the endpoints and the lengths of the altitudes for the four endpoints of the two line segments is completed (Yes of S408), the minimum distance is determined from among the distances determined for the four endpoints (S409). By this, the minimum distance of the two line segments having no intersection can be determined.

When it is determined at step S402 that there is an intersection, the distance between line segments is judged to be zero (S413).

Subsequently, the distance comparing unit 116 determines whether the distance is below the thickness of the character (S410).

When the distance is not below the thickness (No of S410), the overlapping stroke computing unit 104 determines the dividing/shortening process of the two line segments as being unnecessary (S414).

When the distance is below the thickness (Yes of S410), the overlapping stroke computing unit 104 determines the dividing/shortening processing of the two line segments as being necessary (S411).

Subsequently, the overlapping stroke computing unit 104 determines whether the two combinations of all the line segments are checked (S412). If they are checked, the process of FIG. 21 is terminated.

Next, the control is returned to step S50 of FIG. 20. Subsequently, the line segment of one of these is divided or shortened about two line segments judged as the stroke dividing/shortening unit 105 needing division and shortening (S50).

The method of selection of line segments to be divided or shortened is in accordance with the rules R1 and R2, and the detection of the need of division or shortening is in accordance with the rule R3. The amount of shortening of a line segment may be the same as the amount of overlap of the line segment.

Next, the drawing order arranging unit 106 arranges the order of drawing of each line segment (S60). The processing of step S60 will be described with reference to FIG. 22 and FIG. 23.

FIG. 22 is a flowchart for explaining the first half of the process to arrange the drawing order, and FIG. 23 is a flowchart for explaining the second half of the process to arrange the drawing order.

First, the drawing order arranging unit 106 registers one line segment at a time into the line segment group (S601).

Because all the line segments are registered into one of line segment groups, the drawing order arranging unit 106 determines whether there is a non-registered line segment (S602).

When there is a non-registered line segment (No of S602), the line segment whose final point (a line segment group's final point is not necessarily true final point at this time) and endpoint of a line segment group correspond is looked for (S603).

When a line segment group's final point and endpoint are in agreement (Yes of S604), the line segment whose endpoint corresponds is registered into the line segment group (S605).

Because this means that a new line segment was added to the line segment group by this, the drawing order arranging unit 106 updates a line segment group's final point (S606). The process is repeated until all the line segments are registered.

Then, the processing of the starting point of the line segment group is performed. Because all the line segments are registered into one of line segment groups, the drawing order arranging unit 106 determined whether there is a non-registered line segment (S607).

When there is a non-registered line segment (No of S602), a line segment group having a corresponding endpoint which matches the starting point of the line segment (a line segment group's starting point is not necessarily true starting point at this time) is searched (S607).

When the line segment group's starting point and the endpoint match each other (Yes of S607), the line segment having the corresponding endpoint is registered into the line segment group (S609).

Because a new line segment is added to the line segment group, the drawing order arranging unit 106 updates the line segment group's starting point (S610). The process is repeated until all the line segments are registered.

By the above processing, all the line segments are registered into one of the line segment groups. Then, the processing which defines a line segment group's order of drawing and defines the order of drawing of the line segment which belongs further will be described with reference to FIG. 23.

First, the drawing order arranging unit 106 chooses one line segment group (S611a). The line segment group which is selected first is a line segment group beforehand set to be the 1st drawing to font data, for example.

When no registration of line segment groups is completed (No of S612), another line segment group having the endpoint nearest to a line segment group's final point is searched (S613).

When two or more endpoints are in the equal distance, all those endpoints are extracted.

It is determined whether the other line segment group's endpoint is the final point (S614). If it is not the final point (No of S614), no processing is performed. If it is the final point (Yes of S614), the drawing order and drawing direction of line segments in the line segment group having the final point as the endpoint are reversed (S615).

In the example of FIG. 17B, the drawing order and direction of line segments in the line segment group II are reversed, and the drawing order and direction of line segments in the line segment group VI are not reversed.

And the drawing order arranging unit 106 chooses the following one line segment group, and repeats the processing of steps S612-S615 (S616). The line segment group which is selected is the line segment group with which it is determined whether the endpoint is the final point. When there are two or more target line segments like the line segment groups II-VI of the character "B" of FIG. 17A, one of the extracted endpoints is sequentially selected and the same procedure is performed for each selected endpoint.

When registration of all the line segment groups is completed (Yes of S612), a line segment group's order of drawing is rearranged (S617). That is, the drawing order of the line segment group is determined in order of the line segment group with which it is determined whether the endpoint is the final point.

By the above process, the drawing order of line segments in the line segment group can be optimized. Alternatively, based on the distance between the endpoints in FIG. 18, the order of drawing may be optimized instead of the process of FIG. 23.

Figure 24:
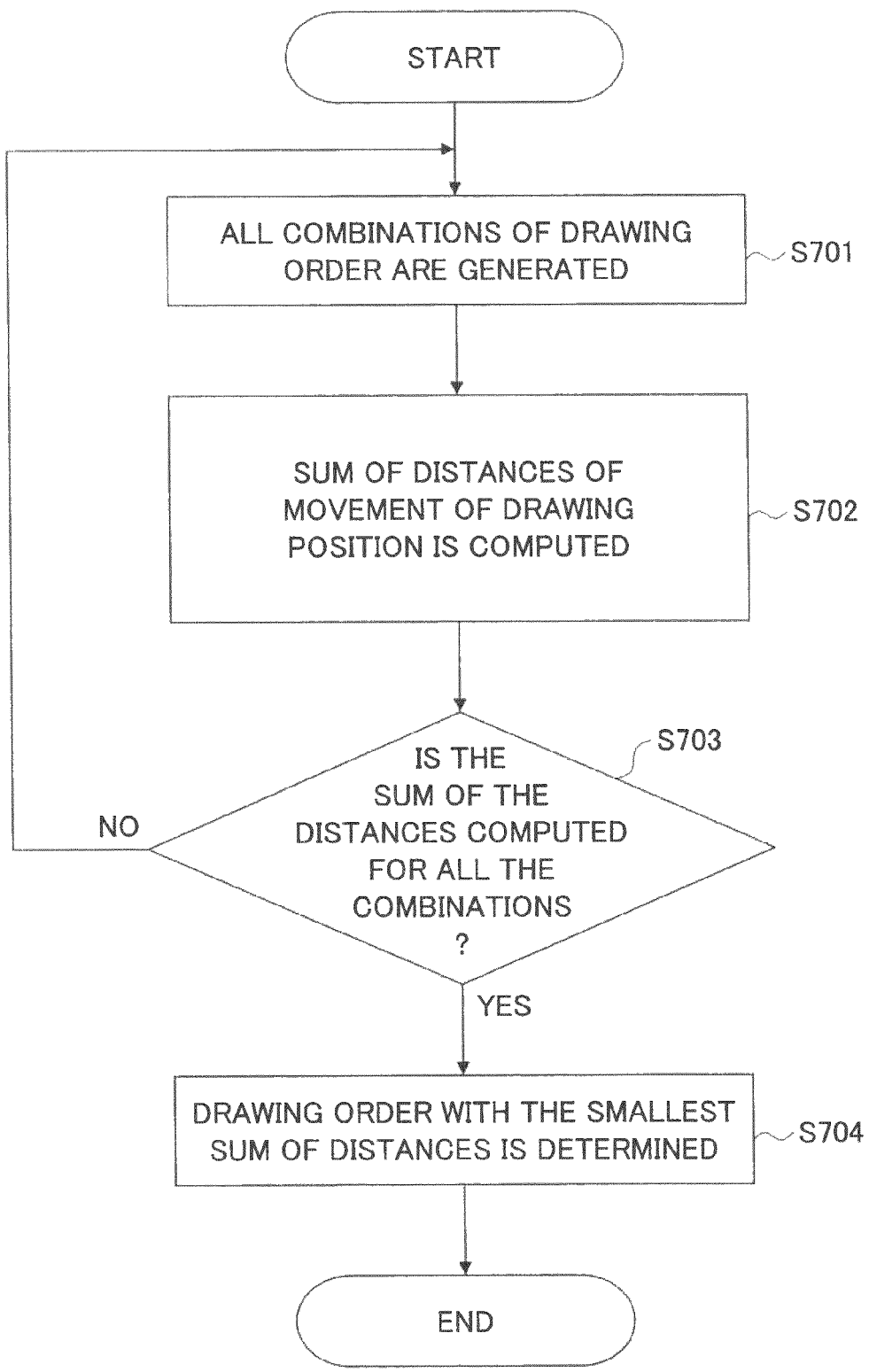
FIG. 24 is a flowchart for explaining the process to determine the drawing order based on the sum of distances of movement of the drawing position.

FIG. 24 is a flowchart for explaining the process of determining the order of drawing based on the sum of movement distances when the position for drawing is moved without performing the drawing.

First, the drawing order arranging unit 106 generates all the combinations of the drawing order based on the number of one-stroke components (S701). The number of combinations is represented by "$n! \times 2^{(n-1)}$".

Subsequently, the drawing order arranging unit 106 computes the sum of the distances of movement of the drawing position in which the line image is not performed for each combination of the drawing order (S702).

Subsequently, it is determined whether the sum of the distances is computed for all the combinations of the drawing order (S703). After the sum of the distances is computed for all the combinations of the drawing order, the drawing order with the smallest sum of the distances is determined as the optimum drawing order (S704).

The order of drawing with the smallest distance at the time of the position for drawing merely moving by this, without drawing can be determined.

The laser irradiation device 200 of this embodiment can control the overlap which may be produced to the character of all form by being divided or shortened, when an overlap arises in consideration of the thickness of a character. Because the quantity of the overlap removal is determined after performing variable power even when the character size which should draw changes, neither a gap nor an overlap arises.

Because the order of drawing is optimized, division and time which drawing of a character takes even if shortened can be shortened. It is possible to prevent degradation by a rewritable medium, prevent adding superfluous heat with an intersection, an overlap, and a turn-back point by preventing the overlap of a stroke, and according to repetition rewriting, the concentration fall of a coloring part can be controlled.

In the above embodiment, the drawing of characters has been described. However, the invention is not restricted to the above embodiment. For example, the drawing of line images or the like may be performed so that an overlap between strokes is eliminated, if they can be expressed with the combinations of line segments. The characters may include numbers, symbols, such as "!, $, %, &, ?", and may further include pictorial symbols or others.

In the above embodiment, the drawing of a character is performed using a laser beam has been described. However, the invention is not restricted to the above embodiment. For example, using an electron ray or radiation beam, the drawing of a character may be performed on the medium that reacts to the electron ray or radiation beam. In addition, in the above embodiment, the medium can be irradiated by a laser beam in a non-contact manner. Alternatively, a probe or stylus, etc. may be contacted to the rewritable medium 20 directly to perform the drawing of a character thereon.

A description will be given of the embodiment 2 of the invention. In the embodiment 1, when the drawing is performed on the rewritable medium 20 using the laser irradiation part 160, the overlap between strokes is eliminated from the font data, the order of drawing is optimized, and the drawing command is generated. Taking into consideration that the configuration of a character is fixed, the font data (henceforth optimization font data) in which the overlap between strokes is eliminated and the order of drawing is optimized may be stored beforehand. By storing the optimization font data beforehand, the processing load at the time of drawing can be reduced.

Figure 25B:
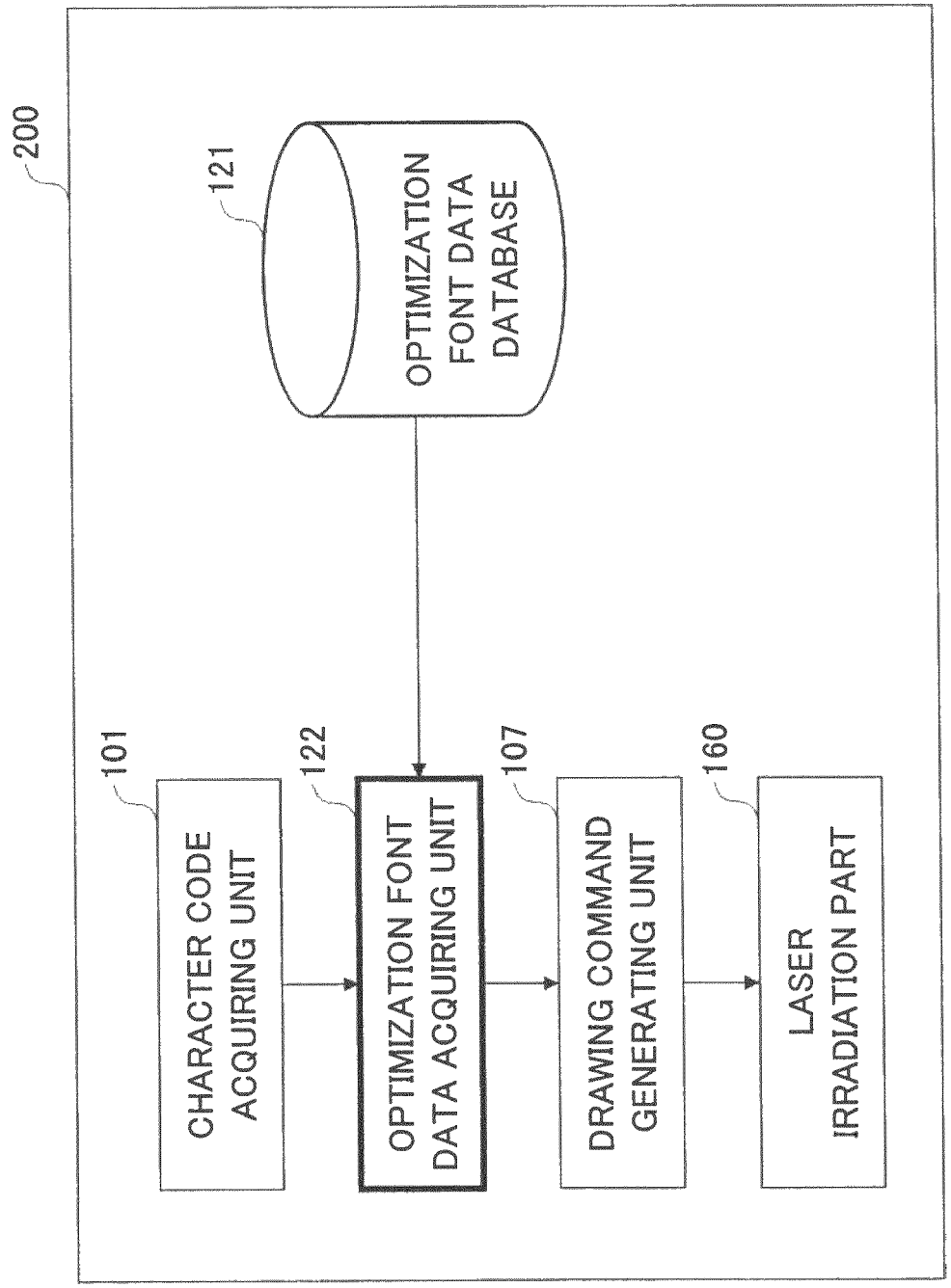

FIG. 25A illustrates the functional composition of a device 170 which generates the optimization font data, and FIG. 25B illustrates the functional composition of the laser irradiation device 200 of the embodiment 2 of the invention. In FIG. 25A and FIG. 25B, the elements which are the same as corresponding elements in FIG. 10 are designated by the same reference numerals, and a description thereof will be omitted.

The points different from FIG. 10 are that the device 170 in FIG. 25A includes an optimization font data generation unit 123 and an optimization font data database 121, and the laser irradiation device 200 in FIG. 25B includes an optimization font data acquiring unit 122. The device 170 which generates optimization font data uses a computer as well as the control device 100 as substance. As is apparent from FIG. 25A, the process to generate optimization font data is the same as that of the embodiment 1 in FIG. 10.

The optimization font data generation unit 123 generates the optimization font data in which an overlap between strokes is eliminated, in a reusable manner, and stores the optimization font data in the optimization font data database 121.

In this embodiment, the optimization font data database 121 is implemented in the hard disk drive 35. The optimization font data database 121 may be stored in a storage medium, or may be distributed via a network.

The optimization font data which are associated with respective character codes are stored in the optimization font data database 121, and the optimization font data acquiring unit 122 reads the optimization font data matched with a character code of concern from the optimization font data database 121.

FIG. 26A illustrates an example of optimization font data, and FIG. 26B illustrates an example of a drawing command which is generated from the optimization font data. The optimization font data correspond to those of FIG. 19D in which the control codes of "w" and "t" are eliminated. Alternatively, they may be the coordinates of line segments as in FIGS. 18B-18E.

The optimization font data generation unit 123 generates the optimization font data in the process which is the same as the process of generating the drawing command, from the coordinates of the line segment generated by the drawing order arranging unit 106 (which does not take into consideration the control code "w"). In the optimization font data of FIG. 26A, the order of drawing is optimized based on the coordinates of the line segment divided and shortened, in order to eliminate an overlap between strokes. The control codes "m" and "d" are the same as in the embodiment 1.

Because the optimization font data changes depending on the thickness of a line, it is preferred that the optimization font data is generated for each thickness of a line and stored beforehand in the hard disk drive 35. Thickness steps may be provided for a certain range of the thickness of a line and the optimization font data may be generated as the thicknesses t1-t2, t2-t3, .... Thereby, the capacity can be reduced.

Alternatively, the optimization font data database 121 or the optimization font data may be registered in the server, and it may be downloaded to the hard disk drive 35 before the time of drawing.

Similarly, the stroke font data is a scalable font, and the optimization font data changes with sizes of a character. For this reason, it becomes suitable to prepare optimization font data for each size of a character.

The drawing command generating unit 107 reads optimization font data for each character, and generates the drawing command of FIG. 26B. The drawing command of FIG. 26B is the same as that of FIG. 19D.

The drawing command generating unit 107 reads "w", which is a control code for stabilizing the drawing by causing the moved direction control mirror 13 to be stopped, from the hard disk drive 35 or the laser irradiation part 160, and generates a drawing command using the thickness "t" of the character and the control code "w".

In the laser irradiation part 160 of this embodiment, a drawing command can be generated by inserting the control code "w50" after "m" of the optimization font data.

Figure 27A:
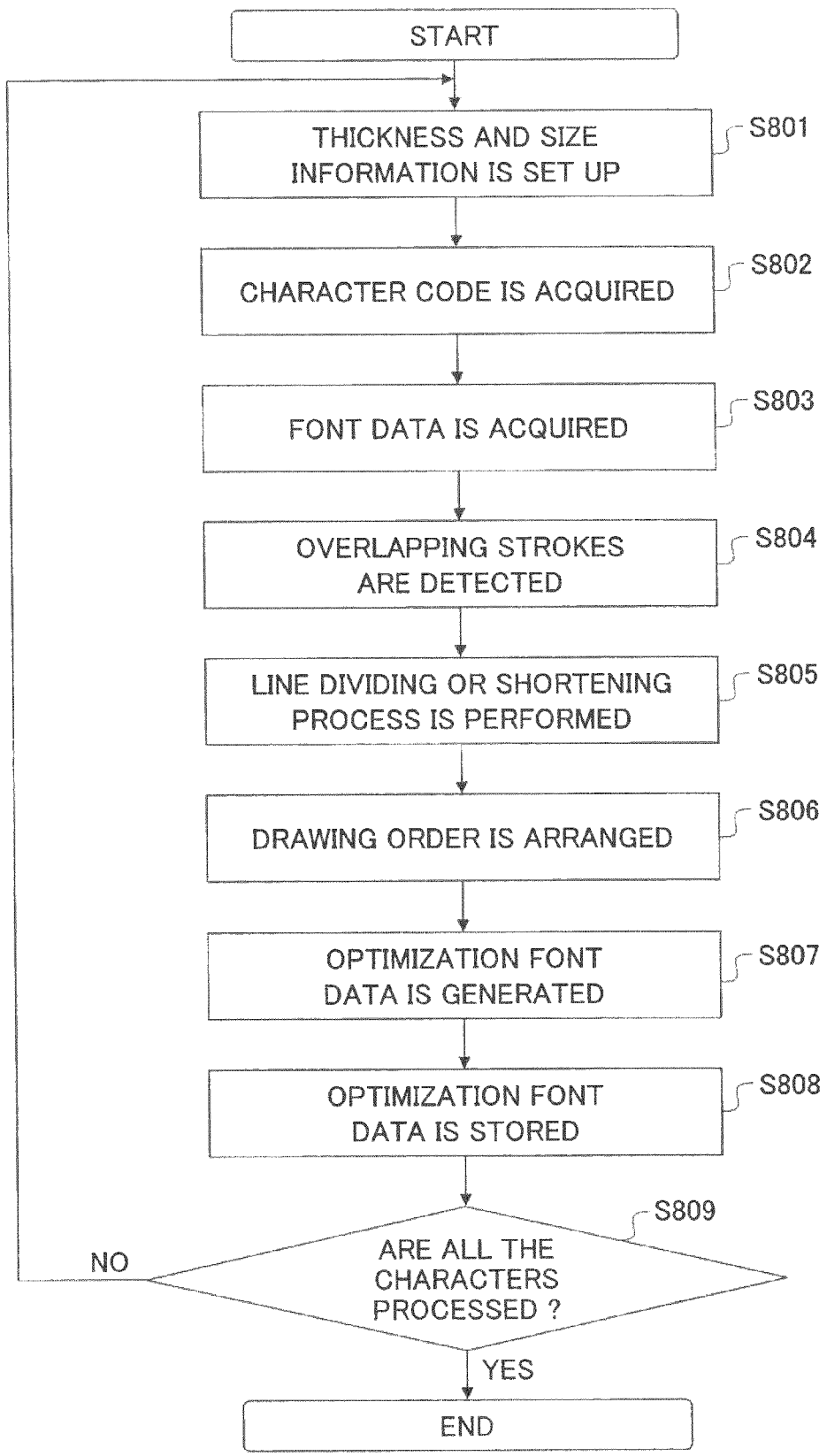
FIG. 27A and FIG. 27B are flowcharts for explaining the process to generate optimization font data, and the process to draw a character using the optimization font data, respectively.
Figure 27B:
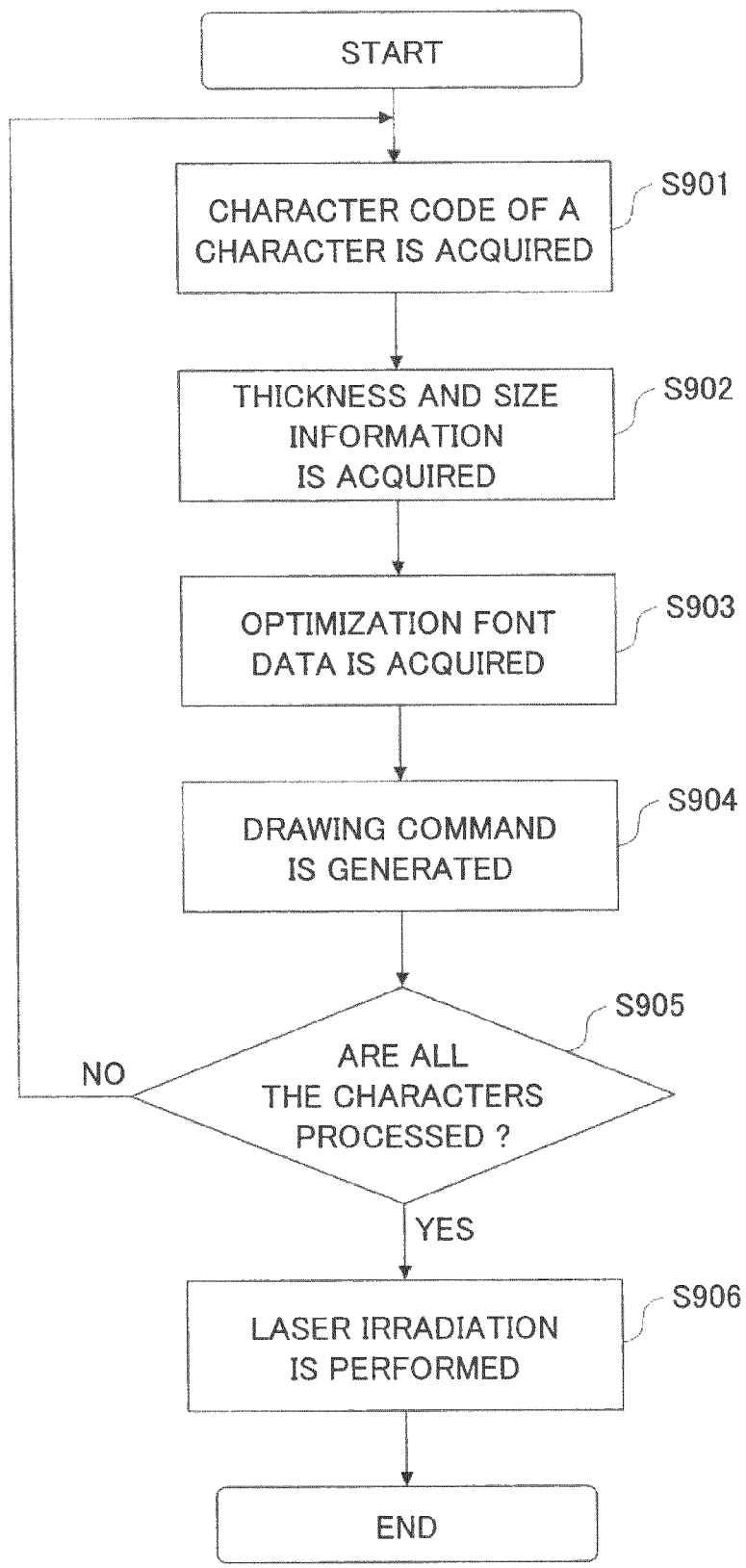

FIG. 27A is a flowchart for explaining the process to generate optimization font data, and FIG. 27B is a flowchart for explaining the process to draw a character using the optimization font data.

The process to generate optimization font data is the same as the process explained in the embodiment 1.

As illustrated in FIG. 27A, the thickness information and the size information are set up (S801), and the character code acquiring unit 101 acquires the character code of a target character (S802). The thickness information and the size information may be input by the user from the input device 36, and the character code may be read in accordance with the character code table.

Next, the font data acquiring unit 102 reads the font data matched with the character code (S803). The overlapping stroke computing unit 104 detects an overlap between strokes (S804).

Subsequently, the stroke dividing/shortening unit 105 divides or shortens a stroke (S805).

Subsequently, the drawing order arranging unit 106 arranges the drawing order (S806). The optimization font data generation unit 123 generates optimization font data based on the drawing order arranged by the drawing order arranging unit 106 (S807), and stores the optimization font data in the optimization font data database 121 (S808).

If all the characters are processed, the process is terminated (S809).

Next, the character drawing process by the laser irradiation device 200 will be described. As illustrated in FIG. 27B, the character code acquiring unit 101 acquires the character code of a character to be drawn (S901). The optimization font data acquiring unit 122 acquires the thickness of a character, and the information on a size (S902).

Next, the optimization font data acquiring unit 122 retrieves the optimization font data database 121 based on the character code, the thickness and the size of the character, and reads the optimization font data therefrom (S903). The drawing command generating unit 107 generates a drawing command as illustrated in FIG. 26B from the optimization font data (S904).

It is determined whether the drawing commands of all the characters to be drawn are generated (S905). If all the characters to be drawn are processed, the laser irradiation part 160 is caused to draw the characters on the rewritable medium 20 (S906).

In the laser irradiation device 200 of this embodiment, the optimization font data in which the overlap is eliminated and the drawing order is optimized, is stored beforehand, and the processing load at the time of drawing of characters can be reduced and the drawing time can be shortened.

Figure 28A:
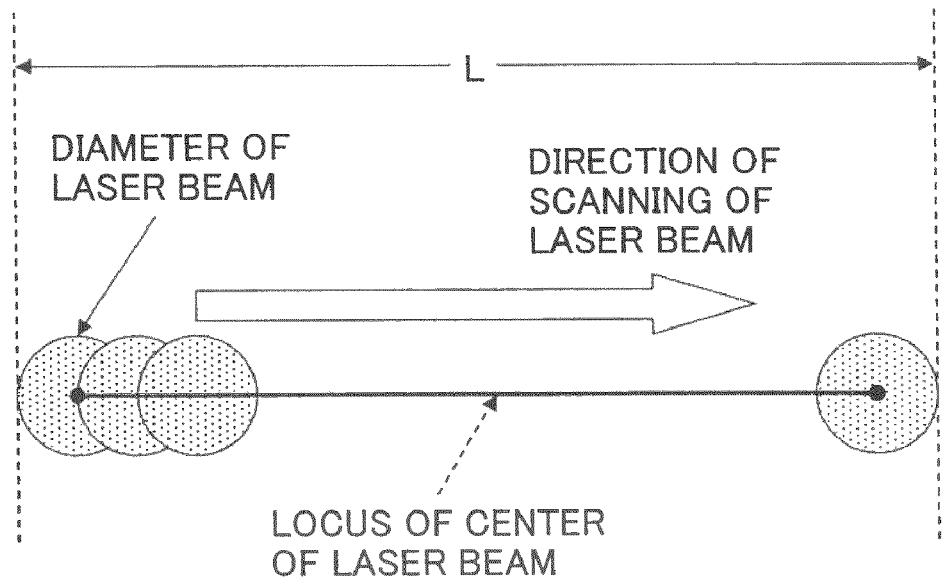
FIG. 28A, FIG. 28B, and FIG. 28C are diagrams for explaining an example of coloring of the endpoints of a line segment.
Figure 28B:
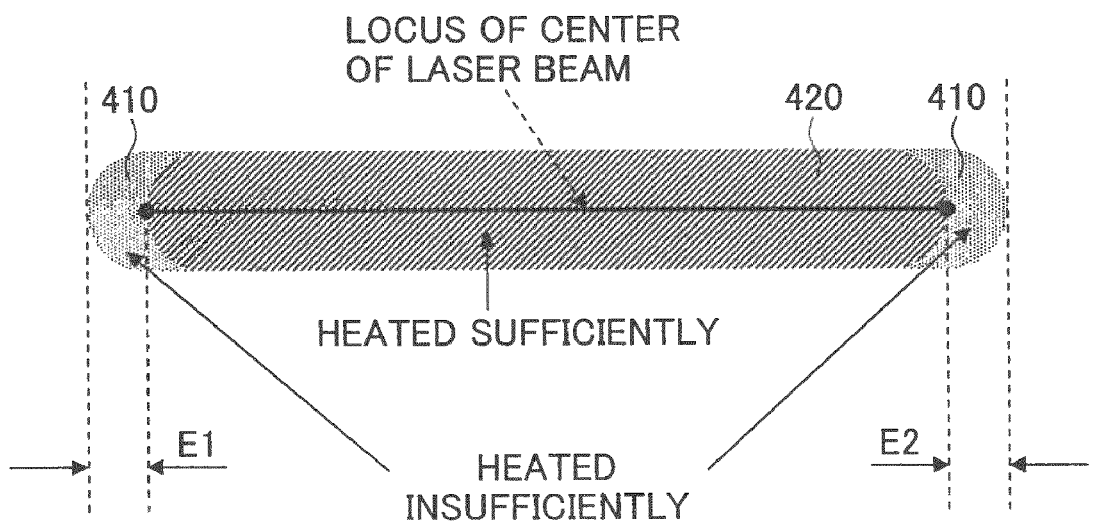
Figure 28C:
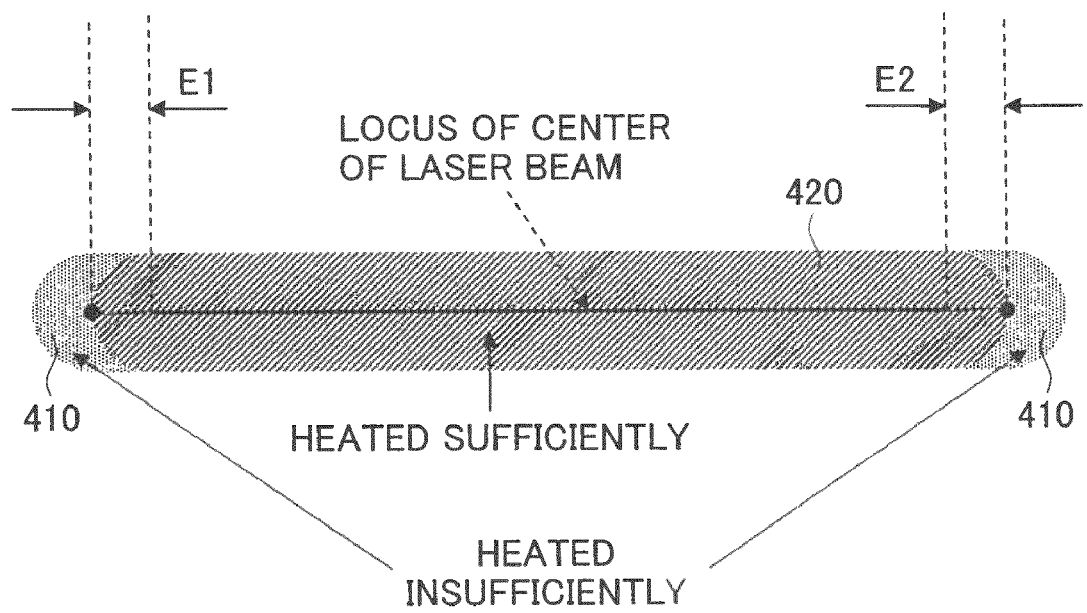

Next, a description will be given of embodiment 3 of the invention. In this embodiment, the configuration of endpoints of a line segment will be explained. FIGS. 28A-28C are diagrams for explaining coloring of the endpoints of a line segment.

FIG. 28A illustrates the relation between the center of a laser beam and the movement of the circle formed by the laser beam. FIG. 28B illustrates the relation between the locus of a laser beam and the temperature.

Even if the endpoint of a line segment has the slightly low temperature up sensitivity to the heat applied from the outside of rewritable medium 20 and applies heat by a laser beam, it may not immediately reach the coloring temperature. In this case, as illustrated in FIG. 28B, even if it is the area covered by the path of the laser beam, the area 410 near the endpoint of a line segment is not fully heated, and may not be colored.

In the case of FIG. 28A, a line segment being drawn in the horizontal direction is illustrated. However, there is an irradiation area for the path of a laser beam also in the surroundings of the central line, and it is expected that all the areas which the center of the laser beam passes through will be heated and the medium will be colored.

However, as illustrated in FIG. 28B, in order that, as for area 410 near the endpoint of a line segment, heat may escape in the direction where a laser beam does not hit, heating of a quantity required for coloring is not obtained.

On the other hand, because the area 420 inside a line segment is heated equally in the horizontal direction of a line segment, the outflow of heat will not arise in a horizontal direction and heating required for coloring as a result is obtained. Thus, by rewritable medium 20 with low temperature up sensitivity, only area 420 inside a line segment will color and a line segment will become short rather than the scanning distance of a laser beam. For example, even if the length of the line segment by font data is L, the colored length of a line segment will become shorter than L.

The laser irradiation device 200 of this embodiment extends the line part by moving the endpoint of a line segment, and corrects the length of the line segment. FIG. 28C illustrates an example of the coloring area at the time of moving the endpoint of a line segment. In the example of FIG. 28C, the position of the endpoint at the left-hand end of the line segment is shifted by E1, and the position of the endpoint at the right-hand end of the line segment is shifted by E2.

Although how much to set the amount of E1 and E2 is adjusted according to the temperature rising sensitivity of the rewritable medium 20 to the heat, the amount of E1 and E2 in the example of FIG. 28C is set to the half of the line width. Although the amount of E1 is equal to the amount of E2 in the example of FIG. 28C, the amount of E1 and the amount of E2 may differ from each other.

By moving the position of an endpoint, the length of the coloring area can be made equal to the length L of the line segment according to the font data.

Figure 29:
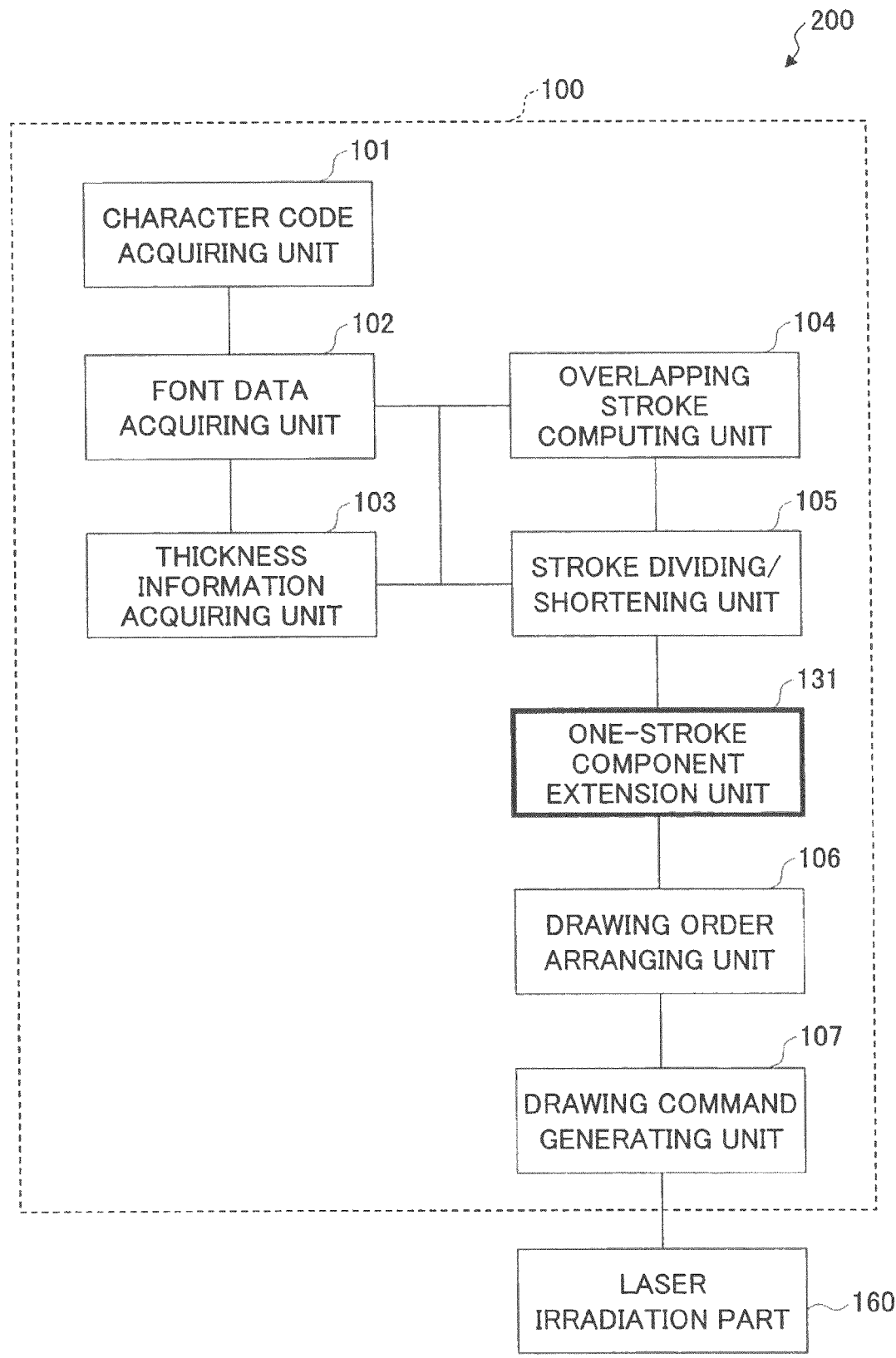
FIG. 29 is a block diagram illustrating the functional composition of a laser irradiation device of the embodiment 3 of the invention.

FIG. 29 is a block diagram illustrating the functional composition of the laser irradiation device 200 of this embodiment. In FIG. 29, the elements which are the same as corresponding elements in FIG. 10 are designated by the same reference numerals, and a description thereof will be omitted.

As illustrated in FIG. 29, the laser irradiation device 200 of this embodiment further includes a one-stroke component extension unit 131. The one-stroke component extension unit 131 moves the endpoint of a one-stroke component and extends the one-stroke component. The one-stroke component extension unit 131 specifies the endpoint of a one-stroke component and moves the position of the endpoint in the direction in which a line segment is extended.

Figure 30:
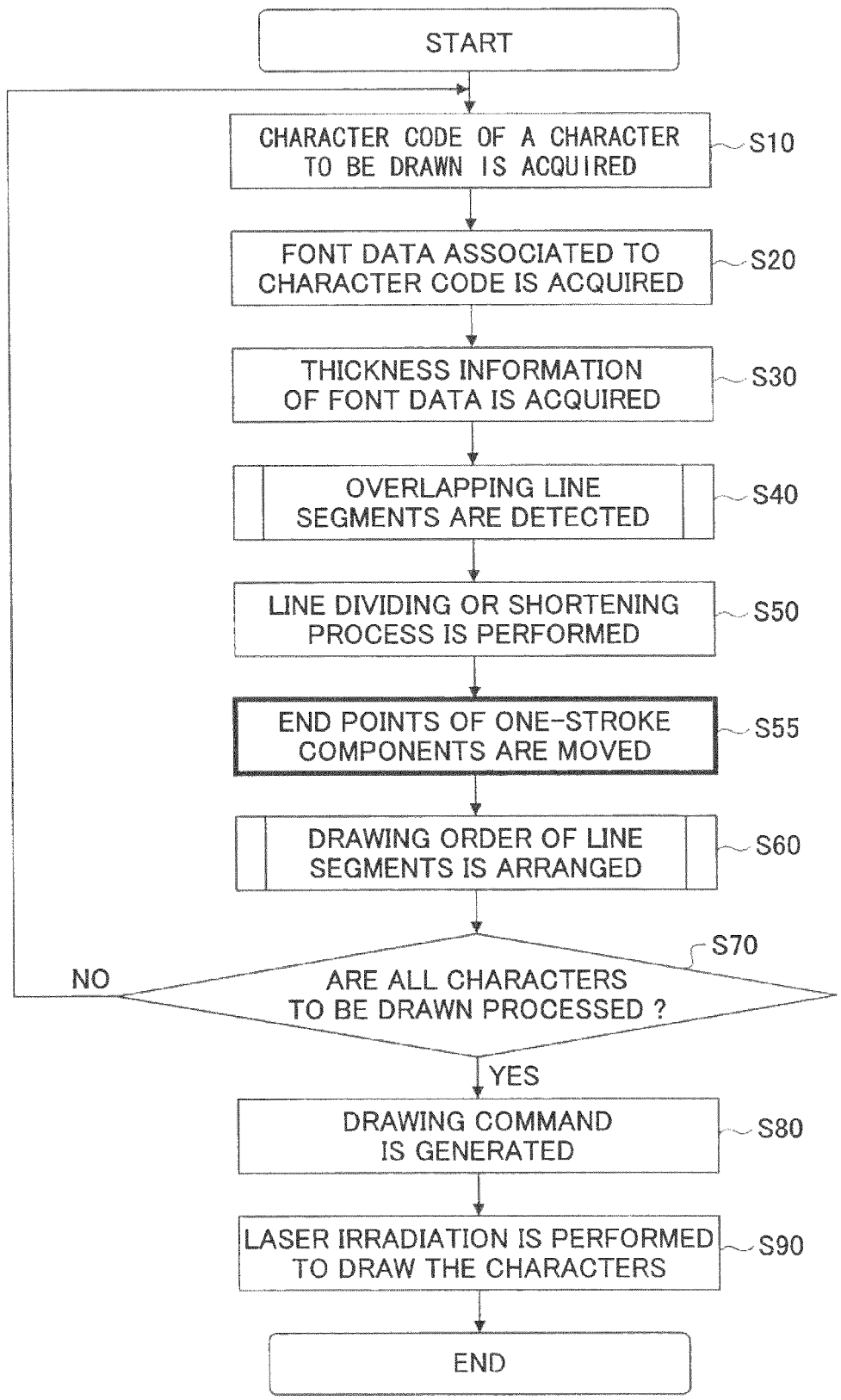
FIG. 30 is a flowchart for explaining a drawing command generating process including an endpoint extension process.

FIG. 30 is a flowchart for explaining a drawing command generation processing including the endpoint extension process. In FIG. 30, a description of the steps which are the same as corresponding steps in FIG. 20 will be omitted. In FIG. 30, the processing which extends the endpoint of a one-stroke component is added to step S55.

First, a one-stroke component group without an overlap between strokes is generated by the steps S10-S50 after the dividing/shortening process of line segments is performed.

Next, the one-stroke component extension unit 131 chooses one one-stroke component from the font data currently observed. In the original font data which is not divided into line segments, a one-stroke component of the font data is selected as the candidate one-stroke component.

When the candidate one-stroke component is not divided, the candidate one-stroke component is a one-stroke component in which the endpoint is to be moved. In this case, the one-stroke component may be shortened, or may not be shortened. For example, in FIG. 14B, the two line segments 51 and 52 form a one-stroke component, and the line segment 53 is a one-stroke component. Continuous "d" in the font data is one one-stroke component as mentioned above.

When the candidate one-stroke component is divided, two or more one-stroke components are generated, and each one-stroke component is a one-stroke component in which the endpoint is to be moved. For example, in FIG. 19C, each of line segment 91a, line segment 91b, line segment 92, and line segment 93a is a one-stroke component in which the endpoint is to be moved, respectively.

In the case of the character of "C" of FIG. 16, the line segment 56 is a one-stroke component in which the endpoint is to be moved, and the line segments 57-69 form a one-stroke component in which the endpoint is to be moved.

Figure 31:
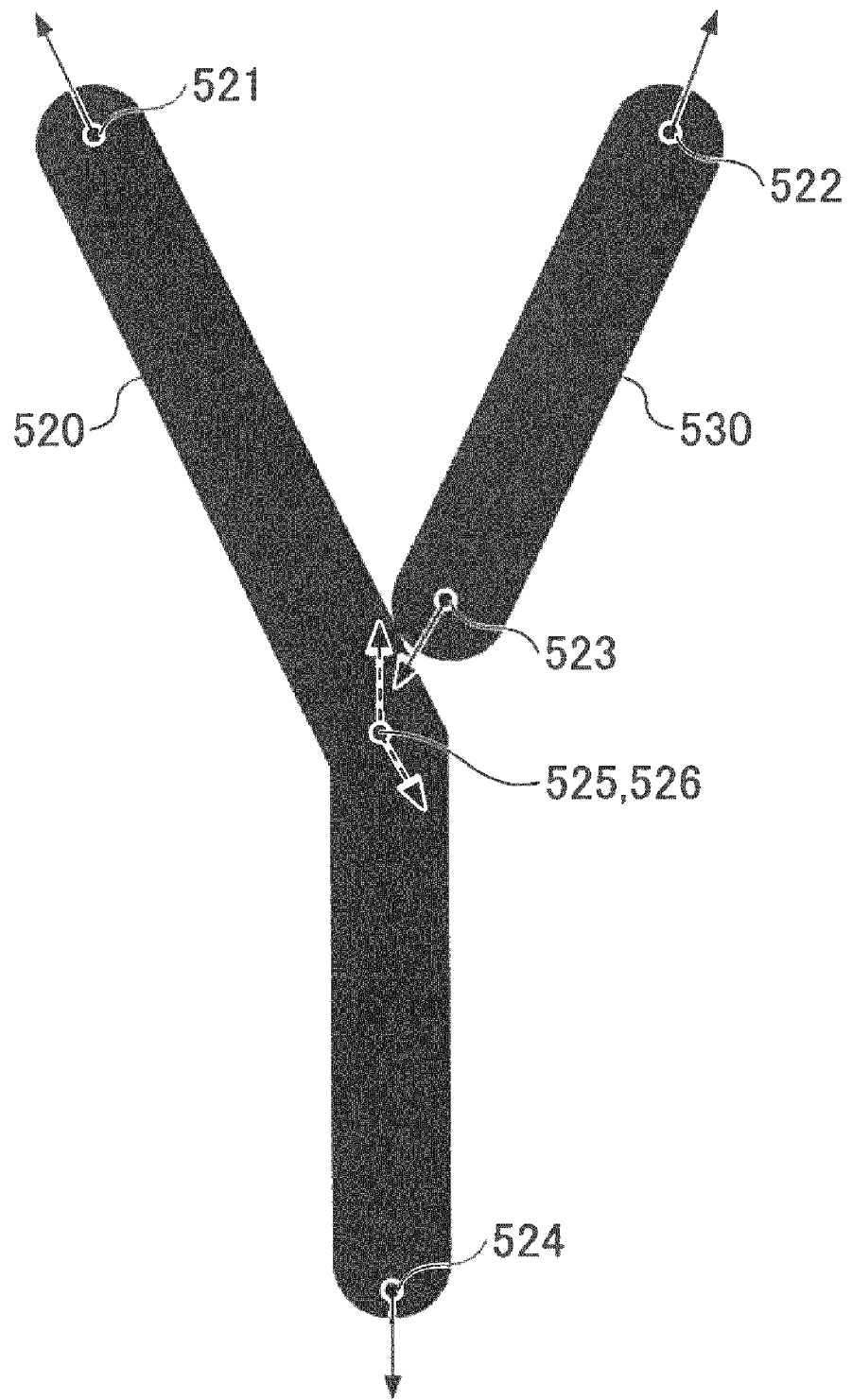
FIG. 31 is a diagram illustrating an example of a character "Y" produced as a result of line shortening of a line segment therein.

As illustrated in FIG. 31, the endpoint which is to be moved is specified. FIG. 31 illustrates an example of a character "Y" produced as a result of shortening of a line segment therein. The character "Y" as a result of the shortening process includes two one-stroke components 520 and 530.

Although the one-stroke component 520 includes two line segments, it is not necessary to move the endpoints 525, 526 where the endpoints of the two line segments overlap.

Figure 32A:
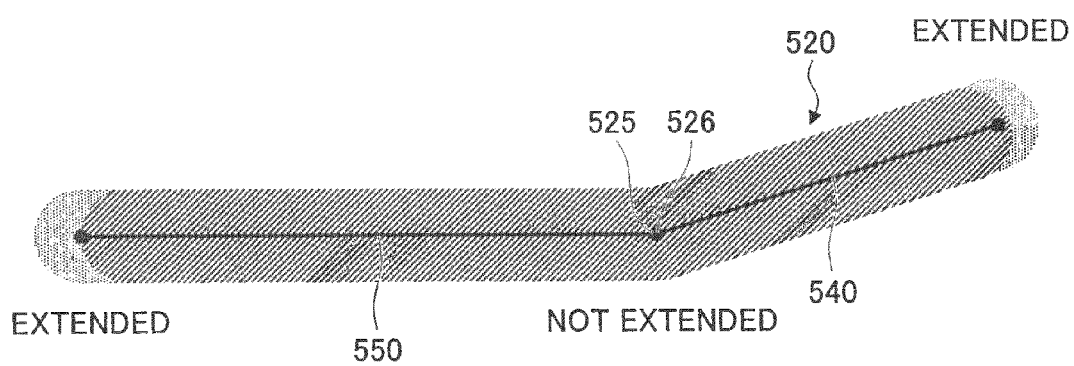
FIG. 32A, FIG. 32B, and FIG. 32C are diagrams for explaining an example of a line segment which is not extended in a one-stroke component.
Figure 32B:
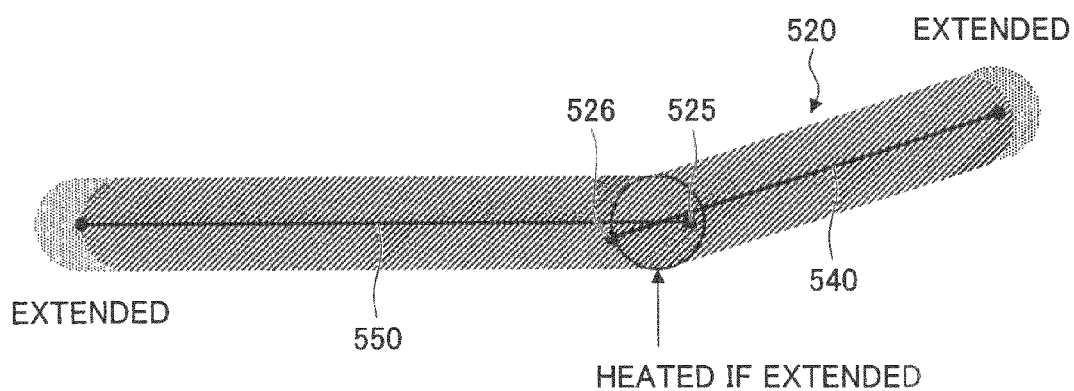

FIG. 32A and FIG. 32B are diagrams for explaining the endpoint which is not moved in the one-stroke component. If endpoints 525, 526 where line segments 540 and 550 overlap in the one-stroke component 520 of "Y" are extended, as illustrated in FIG. 32B, the overlapping area of the rewritable medium 20 around the extended line segments 540 and 550 will be excessively heated. Even if it is a non-rewritable medium, such as a thermal paper, a plastic, or a metal, the extension of the line segments 540, 550 makes the configuration of the character change.

For this reason, the one-stroke component extension unit 131 moves only the positions of the first endpoint and the last endpoint of the specified one-stroke component, as illustrated in FIG. 32A.

Figure 32C:
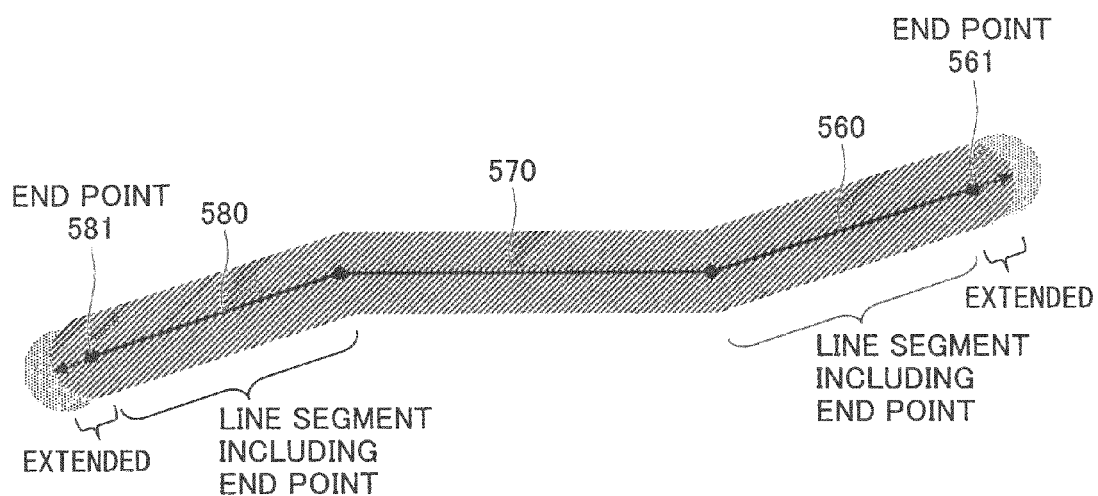

FIG. 32C illustrates an example of the extended the one-stroke component which is composed of three line segments 560-580. The one-stroke component extension unit 131 extends the both ends of line segments 560 and 580 of the detected one-stroke component (the positions of endpoints are moved). The amount of extension may be set the half of the line width.

According to the temperature rising sensitivity of the rewritable medium 20 to the heat, it is actually determined how much it should extend. For example, it can determine by comparing with length L of the line segment by font data the length of a line segment to which it actually colored. It is preferred for this value to make a user give laser irradiation device 200 as a parameter.

Specifically, the one-stroke component extension unit 131 detects the direction of the line segments 560 and 580. And the one-stroke component extension unit 131 determines the coordinates in the position about the half of the line width as direction of line segments 560 and 580 from endpoint 561, 581. These coordinates are set as new coordinates of endpoints 561 and 581.

The one-stroke component extension unit 131 terminates the extending processing if the extending processing for all the one-stroke components of the character currently observed is performed.

Referring back to FIG. 30, the laser irradiation device 200 performs the subsequent steps after step S60. The subsequent steps are the same as those of the embodiment 1.

Figure 33:
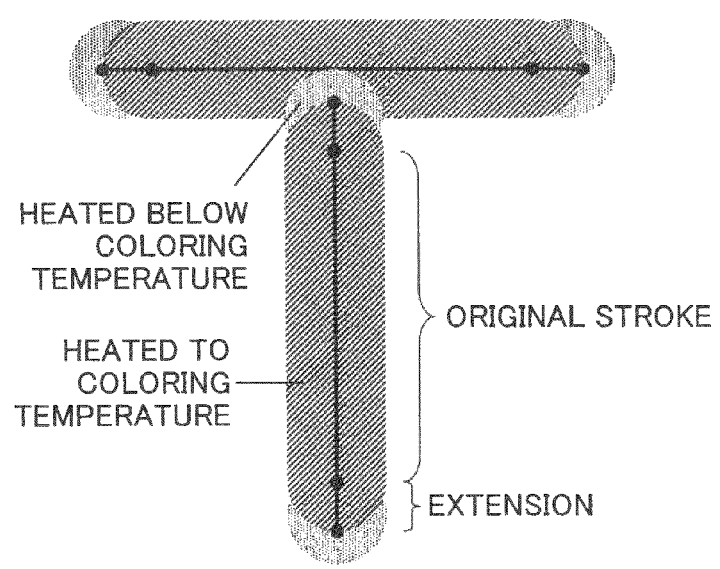
FIG. 33 is a diagram illustrating an example of a character in which an overlap between strokes is produced by extension of a stroke.

When performing this extending processing to the font data, an overlap between strokes may arise in the extended one-stroke component. FIG. 33 illustrates an example of the character in which an overlap between strokes arises by the extending processing.

As illustrated in FIG. 33, in the character "T", the stroke dividing/shortening part 105 cancels an overlap between strokes. However, the portion around the central part of the horizontal line of "T" which is twice irradiated by a laser beam arises as a result of the extending process by the one-stroke component extension unit 131.

However, because the extending processing is processing for canceling the unsuitable coloring of the medium due to inadequate heating, the portion of the medium which is irradiated by the laser beam twice is heated below the coloring temperature. For this reason, even if the portion which is irradiated twice by a laser beam arises by the extending processing, the temperature at which the rewritable medium 20 deteriorates is not reached.

Although processing which once extends the coordinate value of the one-stroke component divided, shortened and obtained has been performed in this embodiment, the coordinates which considered an extended part may be set as font data at the time of shortening and division in the stage (for example, after the dividing/shortening process) where the one-stroke component was obtained.

As explained above, the laser irradiation device 200 of this embodiment moves the endpoint of a one-stroke component in the direction of the line segment, and even if the temperature rising sensitivity of the rewritable medium 20 to the heat is low, it is possible to prevent the length of the one-stroke component from being reduced.

Next, a description will be given of embodiment 4 of the invention. In the embodiment 1, has been explained the example which generates a drawing command from the font data of a stroke font, the drawing command of laser irradiation device 200 is generable also from an outline font.

Generally the outline information using curvilinear information, including a Bezier curve etc., is stored in the font data of an outline font. Therefore, a character and a number can be drawn if a laser beam is glared according to outline information.

Figure 34A:
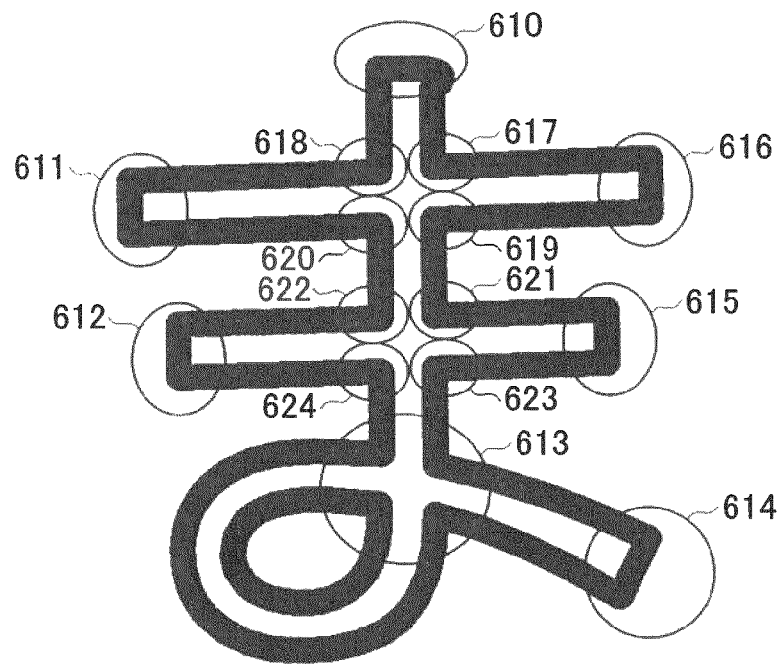
FIG. 34A and FIG. 34B are diagrams illustrating an example of a hiragana character which is drawn based on the font data of an outline font.

FIG. 34A illustrates an example of the hiragana character "ま" which drew as it is from the font data of the outline font. Although the hiragana character "ま" is drawn from appearance, if font data is drawn as it is from the outline font, the turn-back parts 610-624 will appear. The laser irradiation device 200 of this embodiment generates a drawing command, after performing an overlap solvent wiping removal to the font data of an outline font.

Figure 35:
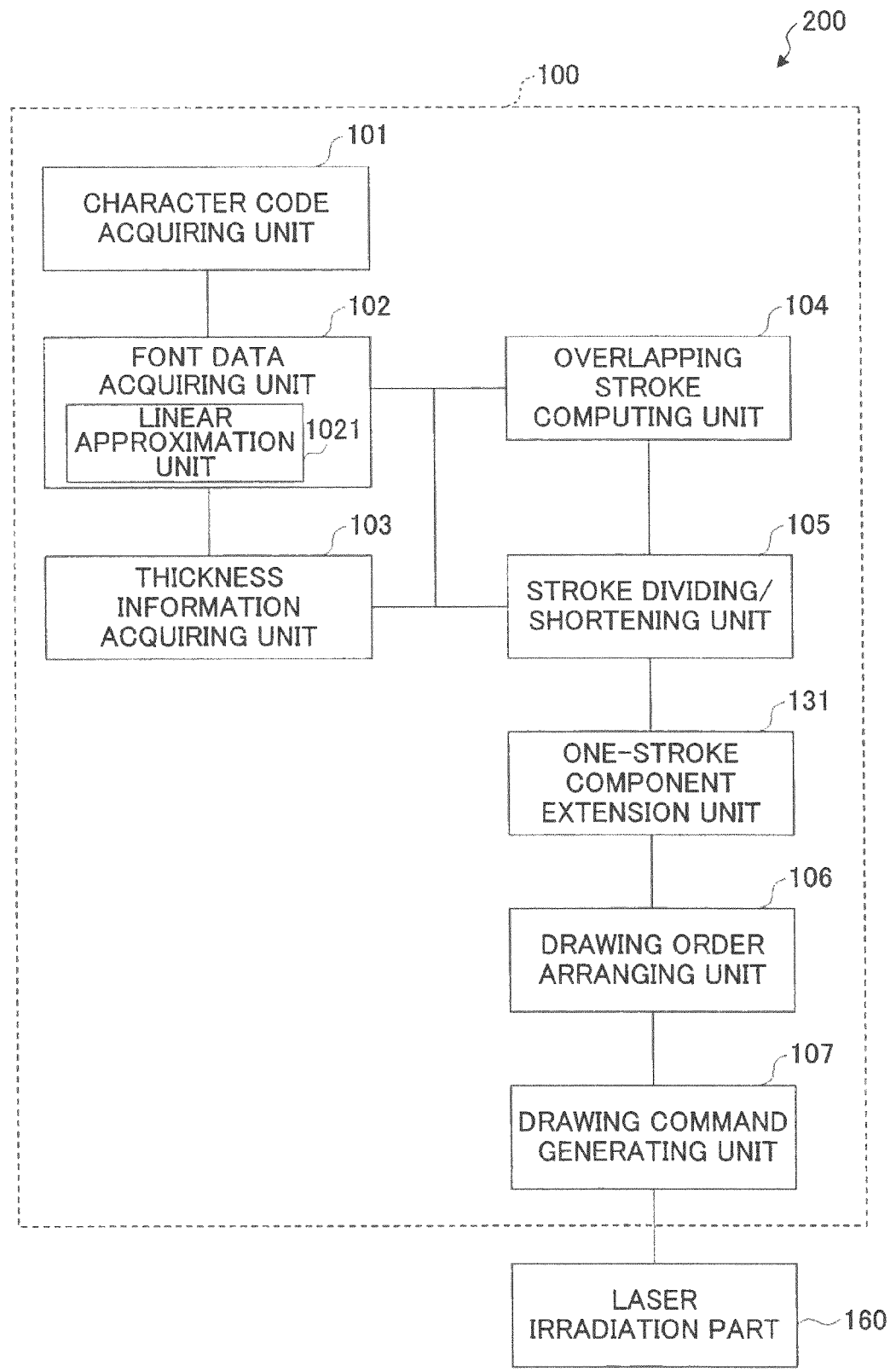
FIG. 35 is a block diagram illustrating the functional composition of a laser irradiation device of the embodiment 4 of the invention.

FIG. 35 illustrates the functional composition of the laser irradiation device 200 of this embodiment. In FIG. 35, the elements which are the same as in corresponding elements in FIG. 29 are designated by the same reference numerals, and a description thereof will be omitted.

The laser irradiation device 200 of FIG. 35 includes a linear approximation unit 1021. The linear approximation unit 1021 approximates the curve obtained from the font data of an outline font to a straight line.

FIGS. 36A-36D are diagrams for explaining an example of the process of linear approximation. In a Bezier curve, the curve is expressed by four control points P0-P3. In this embodiment, the control points P0 and P3 turn into the starting point and the final point of a Bezier curve, and call a baseline the straight line which connects the control points P0 and P3.

Figure 36A:
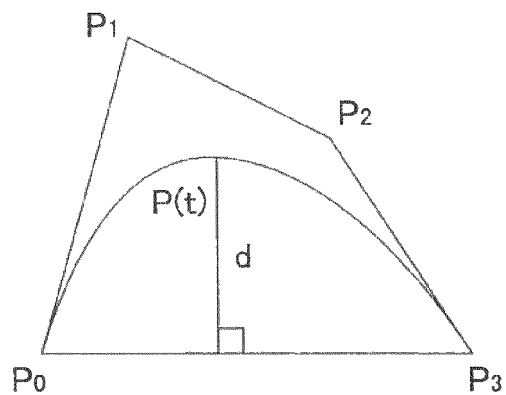
FIG. 36A, FIG. 36B, FIG. 36C, and FIG. 36D are diagrams for explaining an example of a linear approximation process.

First, as illustrated in FIG. 36A, the linear approximation unit 1021 determines the maximum distance d from the baseline P0-P3 to the Bezier curve P (t), i.e., the distance from the baseline P0-P3 to the peak of Bezier curve P (t). If the distance d is smaller than or equal to a predetermined tolerance δ, the baseline P0-P3 is considered as being the straight line itself to which interpolation approximation of the Bezier curve P (t) is performed. In this case, linear approximation is not performed.

Figure 36B:
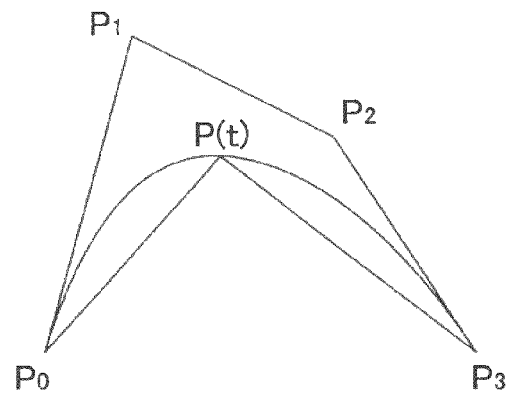

If the distance d is larger than the tolerance δ, the linear approximation unit 1021 performs interpolation approximation of the Bezier curve P (t) into the two line segments which link the division point and the starting point P0 and the final point P3 of the Bezier curve P (t), respectively as illustrated in FIG. 36B. By this interpolation approximation, the approximated line segments become better than the baseline are obtained.

Figure 36C:
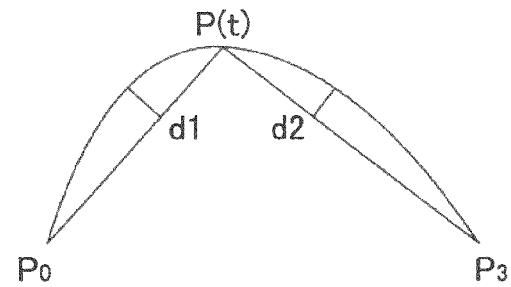

Next, as illustrated in FIG. 36C, the linear approximation unit 1021 finds the maximum distances d1 and d2 between the two straight lines and the Bezier curve P (t), respectively, and if the maximum distances are smaller than or equal to the tolerance δ, the interpolation approximation process is terminated.

Figure 36D:
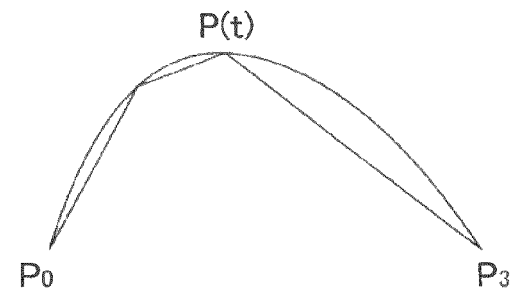

If the maximum distance d1 or d2 is above the tolerance δ, the linear approximation unit 1021 performs the linear interpolation into two more straight lines as illustrated in FIG. 36D.

The linear approximation unit 1021 performs the above process for each of the curves obtained from the font data of the outline font repeatedly until all the maximum distances between approximation straight line and Bezier curve P (t) are smaller than or equal to the tolerance δ. Thereby, the curve is approximated to a line segment and the line segments which constitute the character can be obtained.

If the line segments are obtained, the division and shortening processing which is the same as in the embodiment 1 is performed to cancel an overlap between the line segments. That is, the difference is only to use the outline information of the outline font in which the linear approximation is performed, instead of the font data of the stroke font.

For example, in the outline font of FIG. 34A, the outline is broke off at the turn-back parts 610-624, and the plural approximated line segments are inserted between the respective turn-back parts.

Figure 34B:
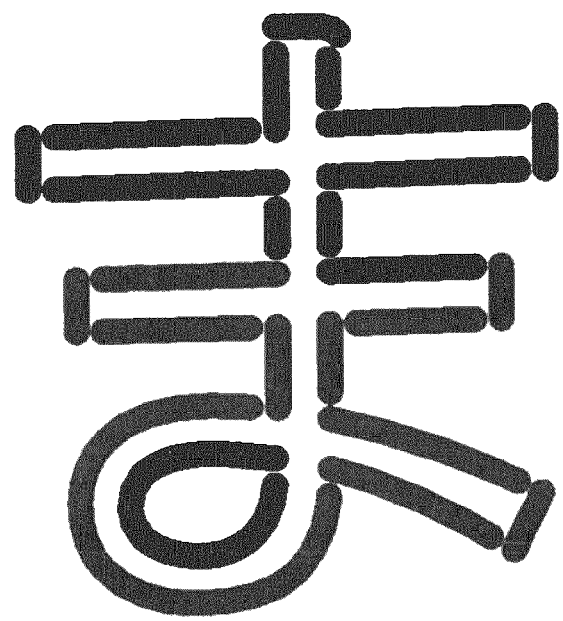

FIG. 34B illustrates an example of drawing of the hiragana character "ま" after the linear approximation is performed. In the case of FIG. 34A, the drawing line direction sharply changes at the turn-back parts 610-624, and the rewritable medium may be damaged by overheating. On the other hand, the font data of the outline font is approximated to the line segments in the case of FIG. 34B, and it is possible to prevent occurrence of the overheating of the medium by canceling the overlap between the line segments.

As is apparent from FIG. 34B, an "outline character" is obtained from the font data of the outline font. That is, when drawing a comparatively large character and number, expression of the character or the number can be diversified.

Figure 37A:
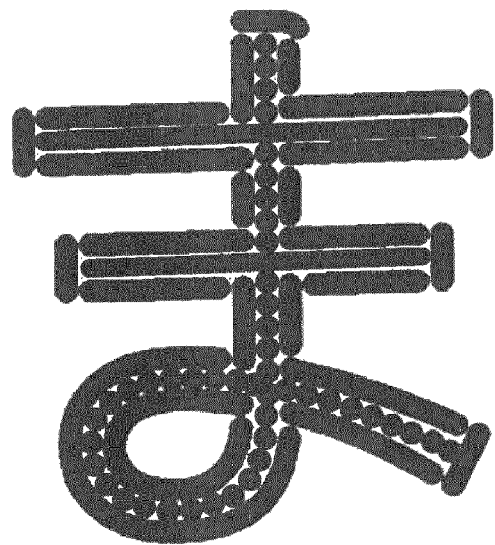
FIG. 37A and FIG. 37B are diagrams illustrating an example of an outline character the inside of which is smeared away, and an example of a reversed character, respectively.

Alternatively, the inside of the "outline character" illustrated in FIG. 34B may be smeared away. FIG. 37A illustrates an example of the outline character the inside of which is smeared away. That is, after the outline is drawn, the inside of the outline may be smeared away by drawing line segments in the inside so as not overlap in the transverse direction. Alternatively, the coordinates of the outline part are computed beforehand, and the inside of the outline may be smeared away, and after that the outline part may be drawn.

Figure 37B:
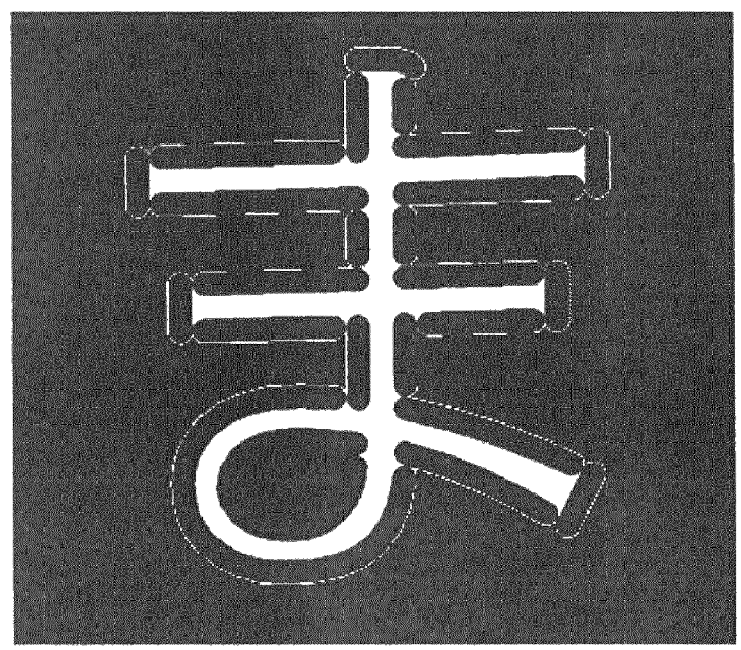

On the other hand, if the inside of the outline is not smeared away but the outside of the outline is smeared away, a reversed character is drawn. FIG. 37B illustrates an example of a reversed character. After the outline is drawn, the outside of the outline may be smeared away by drawing line segments so as not to overlap in the transverse direction. In the case of a reversed character, the line segments linking the endpoints of the outline part may be drawn in the transverse direction without drawing the outline.

As described in the foregoing, the laser irradiation device 200 of this embodiment can draw a character on the rewritable medium 20 by irradiation of a laser beam using the font data generated from the outline font. The outline character can be drawn easily.

In an embodiment of the invention, the one-stroke component extension unit 131 of the control device 100 is configured to move positions of two endpoints of the one-stroke component by a half the thickness of each line segment indicated by the thickness information.

In an embodiment of the invention, the drawing order arranging unit 106 of the control device 100 is configured to extract an endpoint of a second one-stroke component located at a predetermined distance from a final point of a second one-stroke component, and to change the drawing order of a starting point and a final point of the second one-stroke component if the endpoint of the second one-stroke component is a starting point.

In an embodiment of the invention, the drawing order arranging unit 106 of the control device 10 is configured to compute, for all respective combinations of the number of one-stroke components, contained in a drawing information of one line image, and a drawing direction of each one-stroke component, a sum of movement distances from a starting point of a one-stroke component to a final point of the one-stroke component without irradiation of a laser beam, and to determine one of the combinations with a smallest sum of movement distances as being the drawing order of the one-stroke components of the line image and the drawing direction of each one-stroke component.

According to the embodiments of the invention, at least one line segment of a pair of line segments whose drawing ranges mutually overlap is shortened or divided into line segment parts so as to make the drawing ranges do not mutually overlap. Hence, it is possible for the embodiments of the invention to eliminate a gap or overlap between strokes without depending on the size of characters and the thickness of strokes.

It is possible for the embodiments of the invention to avoid deteriorating of the character quality by preventing excessive heating of the medium by laser irradiation due to line thickening caused by an intersection, overlapping point, or turn-back point, and it is possible for the embodiments of the invention to avoid collapsing of the character image due to a gap between strokes. Furthermore, it is possible for the embodiments of the invention to avoid excessive heating of a rewritable medium by laser irradiation due to an intersection, overlapping point, or turn-back point by preventing an overlap between strokes, and thereby prevent remaining of non-erased portions and falling of the optical density of colored portions due to degradation of the rewritable medium by repeated rewriting.

Accordingly, it is possible the embodiments of the invention to provide a control device for controlling a laser irradiation device, which can eliminate the influences on the medium by excessive heating by laser irradiation, by taking into consideration of the thickness of strokes and the size of characters.

The present invention is not limited to the specifically disclosed embodiments, and variations and modifications may be made without departing from the scope of the present invention.

The present application is based on Japanese patent application No. 2008-208631, filed on Aug. 13, 2008, Japanese patent application No. 2009-152734, filed on Jun. 26, 2009, and Japanese patent application No. 2009-178744, filed on Jul. 31, 2009, the contents of which are incorporated herein by reference in their entirety.

What is claimed is:

1. A control device which controls a laser irradiation device to record visible information on a medium by irradiation of a laser beam, the control device comprising:
   a drawing information storage unit configured to store drawing information of line segments contained in line images of characters, numbers, and symbols;
   a drawing information acquiring unit configured to acquire, from the drawing information storage unit, drawing information of a line image as an object to be drawn;
   a thickness information acquiring unit configured to acquire thickness information which specifies a thickness of each line segment;
   an overlapping line segment detecting unit configured to detect a pair of line segments drawing ranges of which, inclusive of the line segment thickness, overlap each other, based on the thickness information and the drawing information; and
   a line dividing/shortening unit configured to divide or shorten at least one of the pair of line segments so that the drawing ranges of the pair of line segments do not overlap each other,
   wherein the overlapping line segment detecting unit comprises:
   an intersection detecting unit configured to detect an intersection of a pair of line segments,
   an altitude computing unit configured to compute an altitude from an endpoint of one line segment of the pair of line segments perpendicular to the other line segment of the pair of line segments,
   an altitude intersection determining unit configured to determine whether the altitude intersects the other line segment of the pair of line segments, and
   a distance detecting unit configured to detect, when the pair of line segments have an intersection, a distance between the intersection and the pair of line segments as being zero, detect a distance between an endpoint of one line segment of the pair of endpoints and an endpoint of the other line segment, and detect, when the altitude intersects the other line segment, a length of the altitude from the endpoint of one line segment of the pair of line segments to the other line segment.

2. The control device according to claim 1, wherein the line dividing/shortening unit is configured to determine which of the pair of line segments the drawing ranges of which overlap each other is to be shortened or divided, in accordance with a predetermined rule.

3. The control device according to claim 2, wherein the line dividing/shortening unit is configured to compute, for each line segment of the pair of line segments the drawing ranges of which overlap each other, an amount of change of a length of the line segment which is divided or shortened, based on an amount of overlap between the drawing ranges, computed based on coordinates and thickness information of endpoints of the pair of line segments, and the line dividing/shortening unit is configured to determine that one of the pair of line segments with a smaller amount of change of the length is to be divided or shortened.

4. The control device according to claim 1, further comprising a one-stroke component extension unit configured to move positions of two endpoints of a one-stroke component, which is drawn by continuing the irradiation of the laser beam, to points extended from a line segment containing the endpoints.

5. A laser irradiation device which is controlled by the control device according to claim 1, wherein the laser irradiation device comprises:
   a laser oscillator which emits a laser beam;
   a direction control mirror which changes a direction of irradiation of the laser beam; and
   a direction control motor which drives the direction control mirror.

6. A laser irradiation device which is controlled by the control device according to claim 1, wherein the laser irradiation device comprises an optimization font data database which stores optimization drawing information of line segments in which an overlap between the pair of line segments is canceled, the optimization drawing information being generated by the control device.

7. A recording method which controls a laser irradiation device to record visible information on a medium by irradiation of a laser beam, the recording method comprising:
   acquiring, by a drawing information acquiring unit of a control device, drawing information of a line image as an object to be drawn, from a drawing information storage unit of the control device which stores drawing information of line segments contained in line images of characters, numbers, and symbols;
   acquiring, by a thickness information acquiring unit of the control device, thickness information which specifies a thickness of each line segment;
   detecting, by an overlapping line segment detecting unit of the control device, a pair of line segments drawing ranges of which, inclusive of the line segment thickness, overlap each other, based on the thickness information and the drawing information; and
   dividing or shortening, by a line dividing/shortening unit of the control device, at least one of the pair of line segments so that the drawing ranges of the pair of line segments do not overlap each other,
   wherein the overlapping line segment detecting unit:
   detects an intersection of a pair of line segments,
   computes an altitude from an endpoint of one line segment of the pair of line segments perpendicular to the other line segment of the pair of line segments,
   determines whether the altitude intersects the other line segment of the pair of line segments, and
   detects, when the pair of line segments have an intersection, a distance between the intersection and the pair of line segments as being zero, detects a distance between an endpoint of one line segment of the pair of endpoints and an endpoint of the other line segment, and detects, when the altitude intersects the other line segment, a length of the altitude from the endpoint of one line segment of the pair of line segments to the other line segment.

8. The recording method according to claim 7, wherein the medium is a rewritable medium that enables erasing and rewriting of the visible information.

9. A computer-readable storage medium storing a computer-readable program which, when executed by a computer, causes the computer to perform a recording method which controls a laser irradiation device to record visible information on a medium by irradiation of a laser beam, the recording method comprising:
   acquiring, by a drawing information acquiring unit of a control device, drawing information of a line image as an object to be drawn, from a drawing information storage unit of the control device which stores drawing information of line segments contained in line images of characters, numbers, and symbols;
   acquiring, by a thickness information acquiring unit of the control device, thickness information which specifies a thickness of each line segment;
   detecting, by an overlapping line segment detecting unit of the control device, a pair of line segments drawing ranges of which, inclusive of the line segment thickness, overlap each other, based on the thickness information and the drawing information; and
   dividing or shortening, by a line dividing/shortening unit of the control device, at least one of the pair of line segments so that the drawing ranges of the pair of line segments do not overlap each other,
   wherein the overlapping line segment detecting unit:
   detects an intersection of a pair of line segments,
   computes an altitude from an endpoint of one line segment of the pair of line segments perpendicular to the other line segment of the pair of line segments,
   determines whether the altitude intersects the other line segment of the pair of line segments, and
   detects, when the pair of line segments have an intersection, a distance between the intersection and the pair of line segments as being zero, detects a distance between an endpoint of one line segment of the pair of endpoints and an endpoint of the other line segment, and detects, when the altitude intersects the other line segment, a length of the altitude from the endpoint of one line segment of the pair of line segments to the other line segment.

* * * * *